US012591339B2

(12) United States Patent
Kang et al.

(10) Patent No.: US 12,591,339 B2
(45) Date of Patent: Mar. 31, 2026

(54) ELECTRONIC DEVICE HAVING ULTRASONIC SENSOR FOR IDENTIFYING A TOUCH POSITION AND METHOD OF OPERATING THE SAME

(71) Applicant: Samsung Electronics Co., Ltd., Suwon-si (KR)

(72) Inventors: Kichang Kang, Suwon-si (KR); Pilgyu Sang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/938,863

(22) Filed: Nov. 6, 2024

(65) Prior Publication Data

US 2025/0138680 A1     May 1, 2025

Related U.S. Application Data

(63) Continuation of application No. PCT/KR2024/016926, filed on Oct. 31, 2024.

(30) Foreign Application Priority Data

Oct. 31, 2023     (KR) ........................ 10-2023-0148027
Jan. 31, 2024     (KR) ........................ 10-2024-0015196

(51) Int. Cl.
*G06F 3/043* (2006.01)
*G06F 3/041* (2006.01)

(52) U.S. Cl.
CPC ...... *G06F 3/0436* (2013.01); *G06F 3/041661* (2019.05); *G06F 2203/04104* (2013.01); *G06F 2203/04105* (2013.01)

(58) Field of Classification Search
CPC .................................................. G06F 3/0436
(Continued)

(56) References Cited

U.S. PATENT DOCUMENTS 9,367,178 B2     6/2016  Dahl
11,023,087 B2     6/2021  Yoo et al.
(Continued)

FOREIGN PATENT DOCUMENTS

CN           108227985 A       6/2018
KR     10-2015-0046924 A       5/2015
(Continued)

OTHER PUBLICATIONS

International Search Report dated Jan. 31, 2025, issued in an International Application No. PCT/KR2024/016926.

*Primary Examiner* — Long D Pham
(74) *Attorney, Agent, or Firm* — Jefferson IP Law, LLP

(57) ABSTRACT

An electronic device is provided. The electronic device includes a housing including a wall configured to define an outer surface of the electronic device, a sensor component including a first sensor and a second sensor, memory storing one or more computer programs, and one or more processors communicatively coupled to the sensor component, and the memory, wherein the first sensor and the second sensor are disposed to be in contact with an inner surface of the wall, wherein the one or more computer programs include computer-executable instructions that, when executed by the one or more processors individually or collectively, cause the electronic device to: transmit, via the first sensor, a first wave so that the first wave propagates toward the second sensor through the wall, transmit, via the second sensor, a second wave so that the second wave propagates toward the first sensor through the wall, receive, via the first sensor, the second wave transmitted from the second sensor and a first reflected wave corresponding to the first wave generated by a touch applied to an outer surface of the wall, receive, via the second sensor, the first wave transmitted from the first sensor and a second reflected wave corresponding to the second wave generated by a touch applied to the outer
(Continued)

surface of the wall, and identify a touch position on the basis of the first reflected wave and the second reflected wave based on the touch applied to the outer surface of the wall.

20 Claims, 30 Drawing Sheets

(58) Field of Classification Search
USPC ........................................................ 345/173
See application file for complete search history.

(56) References Cited

U.S. PATENT DOCUMENTS

| | | | |
|---|---|---|---|
| 11,231,816 | B2 | 1/2022 | Khajeh et al. |
| 11,334,196 | B2 | 5/2022 | Yip et al. |
| 11,599,225 | B2 | 3/2023 | Shim et al. |
| 2014/0267175 | A1 | 9/2014 | Hecht et al. |
| 2015/0109259 | A1 | 4/2015 | Hong et al. |
| 2015/0286341 | A1 | 10/2015 | Khuri-Yakub et al. |
| 2016/0246449 | A1 | 8/2016 | Jarske |
| 2016/0357279 | A1 | 12/2016 | Choi et al. |
| 2019/0042033 | A1 | 2/2019 | Yoo et al. |
| 2019/0220121 | A1 | 7/2019 | Kim et al. |
| 2020/0057503 | A1* | 2/2020 | Seomoon .............. G06F 3/0416 |
| 2020/0210002 | A1* | 7/2020 | Kim ........................ G06F 3/046 |
| 2022/0206630 | A1* | 6/2022 | Khajeh ................. G06F 3/0436 |

FOREIGN PATENT DOCUMENTS

| | | |
|---|---|---|
| KR | 10-2015-0049106 A | 5/2015 |
| KR | 10-2016-0142208 A | 12/2016 |
| KR | 10-2019-0014702 A | 2/2019 |
| KR | 10-2019-0088147 A | 7/2019 |

* cited by examiner

Figure 4:
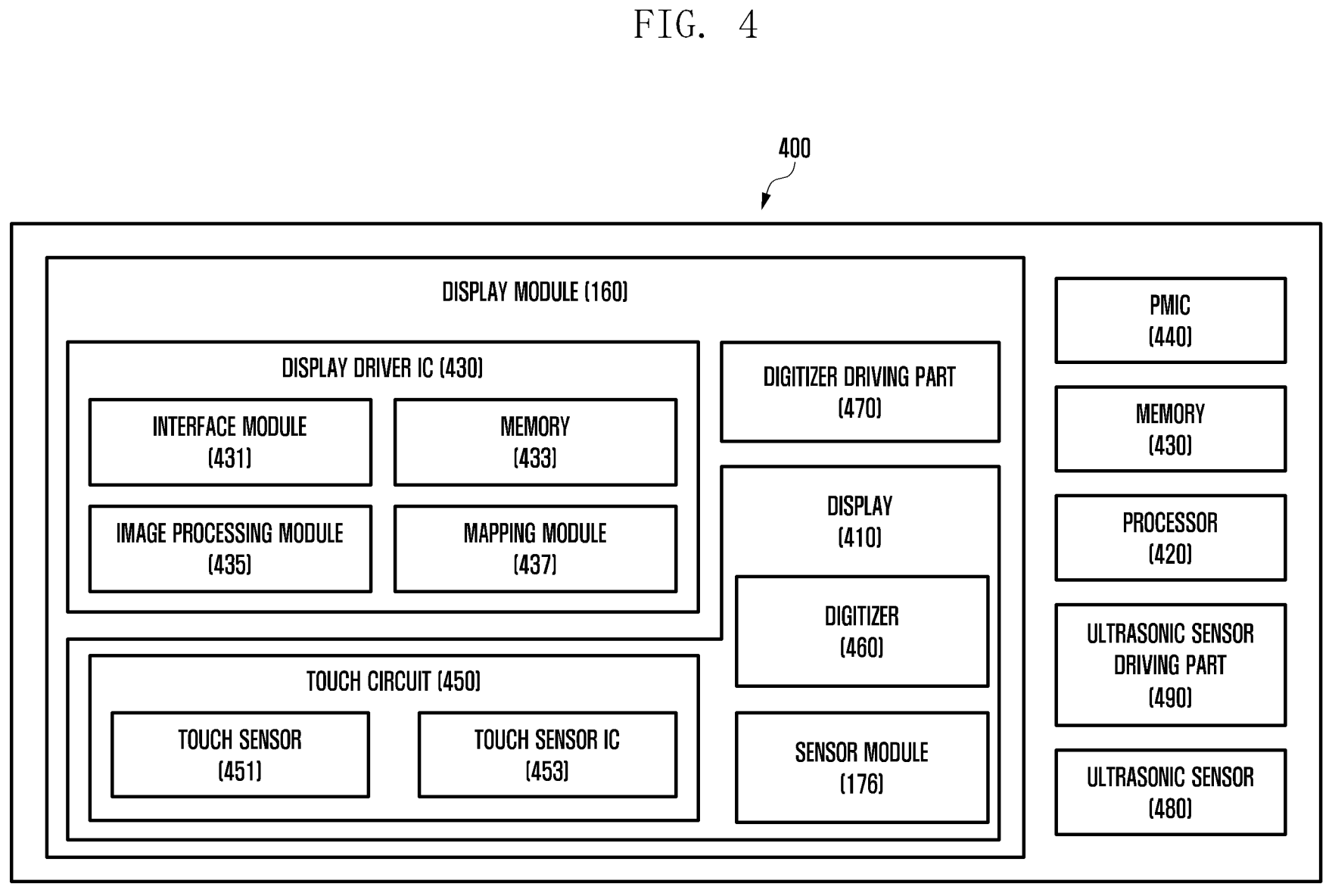

DISPLAY MODULE (160)

DISPLAY DRIVER IC (430)

INTERFACE MODULE
(431)

MEMORY
(433)

IMAGE PROCESSING MODULE
(435)

MAPPING MODULE
(437)

DIGITIZER DRIVING PART
(470)

DISPLAY
(410)

DIGITIZER
(460)

SENSOR MODULE
(176)

TOUCH CIRCUIT (450)

TOUCH SENSOR
(451)

TOUCH SENSOR IC
(453)

PMIC
(440)

MEMORY
(430)

PROCESSOR
(420)

ULTRASONIC SENSOR
DRIVING PART
(490)

ULTRASONIC SENSOR
(480)

FIRST ULTRASONIC SENSOR
Tx/Rx1
(Low frequency)

481

481 ⎫
   ⎬ 480
482 ⎭

SECOND ULTRASONIC SENSOR
Tx/Rx2
(High frequency)

482

621

510

620

622

[a]   810     CIRCLE

[b]   820     QUADRANGLE

[c]   830     IDT (Interdigital transducer)

[d]   840     Wedge transducer

1000

<Dispersion curves of aluminum>

1010

FIG. 15
1500
Lamb wave velocity : 2500 m/s
(1mm-aluminum, 1.4MHz)
1510
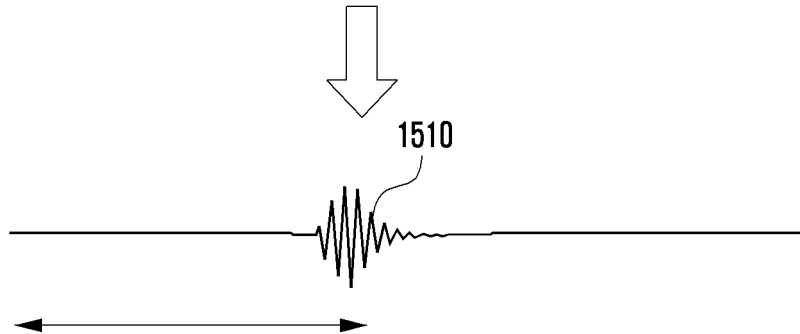
REFLECTED SIGNAL ARRIVAL TIME : 16$\mu s$

FIG. 17

FIG. 21
2100
< BACKGROUND SIGNAL MEASUREMENT >
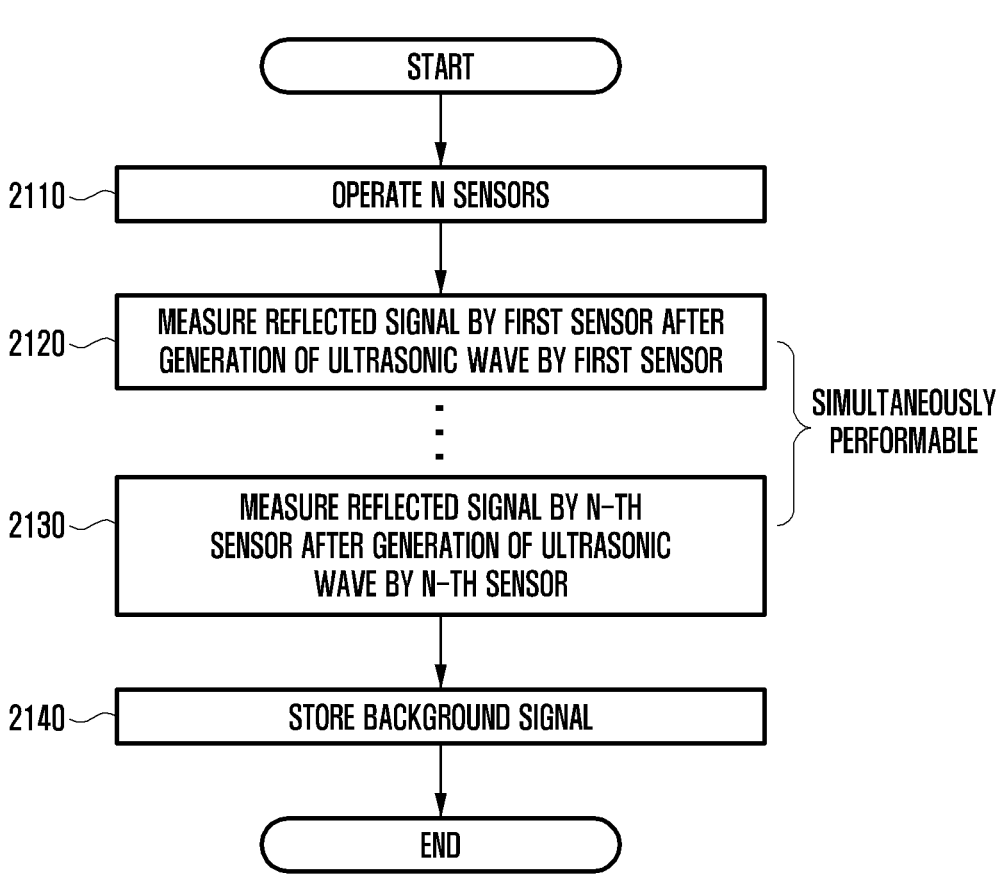
START
2110 — OPERATE N SENSORS
2120 — MEASURE REFLECTED SIGNAL BY FIRST SENSOR AFTER GENERATION OF ULTRASONIC WAVE BY FIRST SENSOR
⋮
2130 — MEASURE REFLECTED SIGNAL BY N-TH SENSOR AFTER GENERATION OF ULTRASONIC WAVE BY N-TH SENSOR
SIMULTANEOUSLY PERFORMABLE
2140 — STORE BACKGROUND SIGNAL
END

FIG. 23

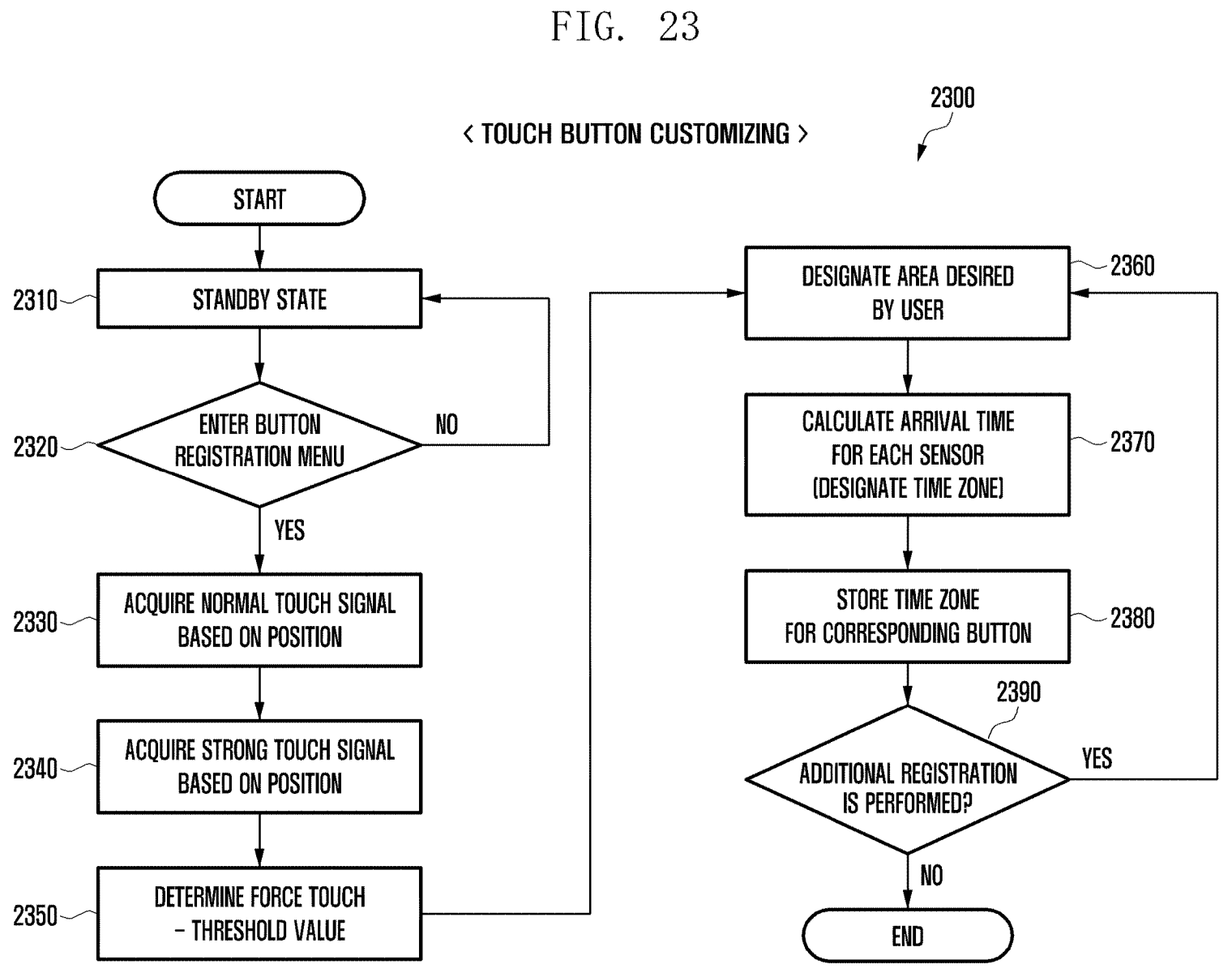

< TOUCH BUTTON CUSTOMIZING >

2300

START

STANDBY STATE — 2310

ENTER BUTTON REGISTRATION MENU — 2320

NO

YES

ACQUIRE NORMAL TOUCH SIGNAL BASED ON POSITION — 2330

ACQUIRE STRONG TOUCH SIGNAL BASED ON POSITION — 2340

DETERMINE FORCE TOUCH — THRESHOLD VALUE — 2350

DESIGNATE AREA DESIRED BY USER — 2360

CALCULATE ARRIVAL TIME FOR EACH SENSOR (DESIGNATE TIME ZONE) — 2370

STORE TIME ZONE FOR CORRESPONDING BUTTON — 2380

ADDITIONAL REGISTRATION IS PERFORMED? — 2390

YES

NO

END

< TOUCH BUTTON CUSTOMIZING UI >

< TOUCH BUTTON CUSTOMIZING UI >

FIG. 30

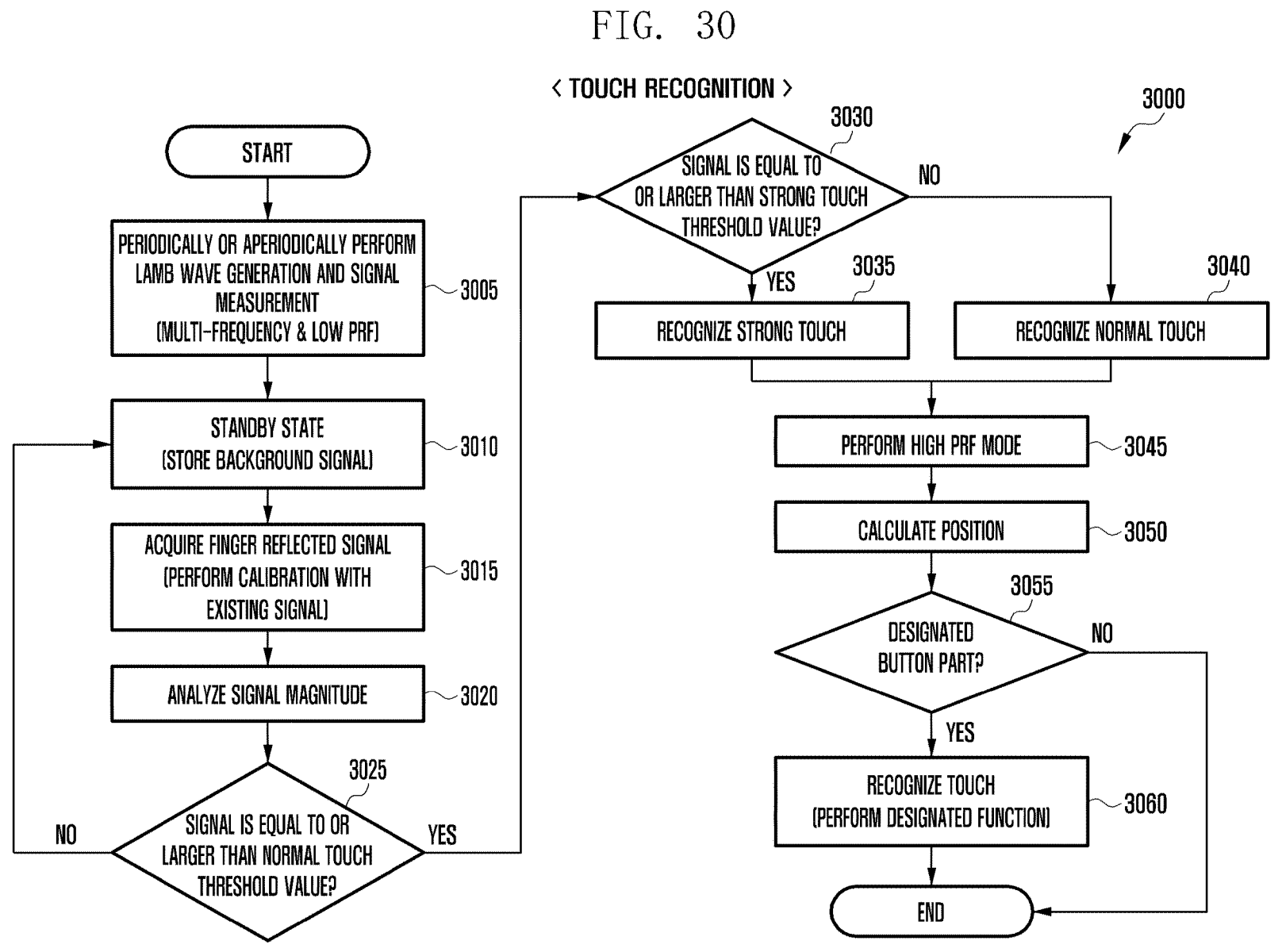

< TOUCH RECOGNITION >

3000

START

PERIODICALLY OR APERIODICALLY PERFORM LAMB WAVE GENERATION AND SIGNAL MEASUREMENT (MULTI-FREQUENCY & LOW PRF)     3005

STANDBY STATE (STORE BACKGROUND SIGNAL)     3010

ACQUIRE FINGER REFLECTED SIGNAL (PERFORM CALIBRATION WITH EXISTING SIGNAL)     3015

ANALYZE SIGNAL MAGNITUDE     3020

SIGNAL IS EQUAL TO OR LARGER THAN NORMAL TOUCH THRESHOLD VALUE?     3025

NO

YES

SIGNAL IS EQUAL TO OR LARGER THAN STRONG TOUCH THRESHOLD VALUE?     3030

NO

YES

RECOGNIZE STRONG TOUCH     3035

RECOGNIZE NORMAL TOUCH     3040

PERFORM HIGH PRF MODE     3045

CALCULATE POSITION     3050

DESIGNATED BUTTON PART?     3055

NO

YES

RECOGNIZE TOUCH (PERFORM DESIGNATED FUNCTION)     3060

END

ELECTRONIC DEVICE HAVING ULTRASONIC SENSOR FOR IDENTIFYING A TOUCH POSITION AND METHOD OF OPERATING THE SAME

CROSS-REFERENCE TO RELATED APPLICATION(S)

This application is a continuation application, claiming priority under § 365(c), of an International application No. PCT/KR2024/016926, filed on Oct. 31, 2024, which is based on and claims the benefit of a Korean patent application number 10-2023-0148027, filed on Oct. 31, 2023, in the Korean Intellectual Property Office, and of a Korean patent application number 10-2024-0015196, filed on Jan. 31, 2024, in the Korean Intellectual Property Office, the disclosure of each of which is incorporated by reference herein in its entirety.

TECHNICAL FIELD

The disclosure relates to an electronic device, which is capable of implementing a side key without a button, and a method of operating the same.

BACKGROUND ART

For example, an electronic device may mean a device, such as a household electrical appliance, an electronic notebook, a portable multimedia player, a mobile communication terminal, a tablet personal computer (PC), a video/audio device, a desktop/laptop computer, or a vehicle navigation system, that performs a designated function in accordance with an installed program. The electronic device (e.g., a smartphone, a mobile phone, or a tablet PC) may converge and provide various functions. For example, the electronic device provides various functions such as a telephone function or a multimedia file playing function. A side key may be disposed on a side surface of the electronic device (e.g., one side surface or two opposite surfaces) to perform functions, such as a function of adjusting a magnitude of telephone sound volume, a function of adjusting a magnitude of sound volume of multimedia file playing, or a function of turning on/off a screen while a function of the electronic device is performed. When a contact portion of the side key provided on the side surface of the electronic device is pressed, the contact portion of the side key is moved toward the inside of the electronic device. A switch module, which adjoins the contact portion of the side key, may be operated by the movement of the side key, such that an electrical signal may be generated. The generated electrical signal is transmitted to a processor mounted on a main printed circuit board, such that a function related to a side key input may be performed.

The electronic device (e.g., a smartphone, a mobile phone, or a tablet PC) may use various sensors to sense a user's biosignal (e.g., a touch signal corresponding to a finger touch) and perform a function by using the sensed biosignal (e.g., the touch signal corresponding to the finger touch). For example, the electronic device senses the user's touch by using a capacitive method, a pressure method, or an ultrasonic method. The electronic device may include a capacitive touch sensor, a pressure touch sensor, or an ultrasonic sensor configured to identify the user's touch by using ultrasonic waves. For example, the capacitive method senses a touch by using a change in capacitance made by the touch. For example, the pressure method senses a touch by using a change in resistance values in accordance with a change in pressure.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Solution

An ultrasonic sensor, which uses ultrasonic waves to identify a user's touch, may transmit ultrasonic waves (e.g., lamb waves) to a side surface bezel of a housing of an electronic device and receive reflected waves (e.g., reflected signals) of the ultrasonic waves (e.g., the lamb waves). The electronic device may sense a touch of the user's finger by using an ultrasonic sensor.

Aspects of the disclosure are to address at least the above-mentioned problems and/or disadvantages and to provide at least the advantages described below. Accordingly, an aspect of the disclosure is to provide an electronic device, in which a plurality of ultrasonic sensors is disposed inside a side surface bezel of a housing to define a plurality of touch keys (e.g., soft keys or buttonless keys), and a method of operating the same.

Another aspect of the disclosure is to provide an electronic device, in which a plurality of ultrasonic sensors may recognize touches on a plurality of touch keys (e.g., soft keys or buttonless keys) by generating ultrasonic waves (e.g., lamb waves) with different frequencies (e.g., center frequencies) and receiving reflected waves (e.g., reflected signals) based on the ultrasonic waves (e.g., the lamb waves), and a method of operating the same.

Another aspect of the disclosure is to provide an electronic device capable of determining at least one of the presence or absence of a touch, a touch length, touch strength, a single touch, and a multi-touch by using a plurality of touch keys (e.g., soft keys or buttonless keys), and a method of operating the same.

Another aspect of the disclosure is to provide an electronic device capable of registering (e.g., customizing) a plurality of touch keys (e.g., soft keys or buttonless keys) at positions desired by a user, and a method of operating the same.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a wall configured to define an outer surface of the electronic device, a sensor component including a first sensor and a second sensor, memory storing one or more computer programs, and one or more processors communicatively coupled to the sensor component, and the memory, wherein the first sensor and the second sensor are disposed to be in contact with an inner surface of the wall, wherein the one or more computer programs include computer-executable instructions that, when executed by the one or more processors individually or collectively, cause the electronic device to: transmit, via the first sensor, a first wave so that the first wave propagates toward the second sensor through the wall, transmit, via the second sensor, a second wave so that the second wave propagates toward the first sensor through the wall, receive, via the first sensor, the second wave transmitted from the second sensor and a first reflected wave corresponding to the first wave generated by a touch applied to an outer surface of the wall, receive, via the second sensor, the first wave transmitted from the first sensor and a second reflected wave corresponding to the second wave generated by a touch applied to the outer surface of the wall, and identify a touch position on a basis of the first reflected wave and the second reflected wave based on the touch applied to the outer surface of the wall.

In accordance with another aspect of the disclosure, a method performed by and electronic device is provided. The method including transmitting, by the electronic device via a first sensor of a sensor component, a first wave so that the first wave propagates toward a second sensor of the sensor component through a wall of a housing of the electronic device, transmitting, by the electronic device via the second sensor, a second wave so that the second wave propagates toward the first sensor through the wall, receiving, by the electronic device via the first sensor, the second wave transmitted from the second sensor, and a first reflected wave corresponding to the first wave generated by a touch applied to an outer surface of the wall, receiving, by the electronic device via the second sensor, the first wave transmitted from the first sensor, and a second reflected wave corresponding to the second wave generated by a touch applied to the outer surface of the wall, identifying a touch position on a basis of the first reflected wave and the second reflected wave based on the touch applied to the outer surface of the wall.

In accordance with another aspect of the disclosure, One or more non-transitory computer-readable storage media storing one or more computer programs including computer-executable instructions that, when executed by one or more processors of an electronic device individually or collectively, cause the electronic device to perform operations is provided. The operations including transmitting, by the electronic device via a first sensor, a first wave so that the first wave propagates toward the second sensor through the wall, transmitting, by the electronic device via the second sensor, a second wave so that the second wave propagates toward the first sensor through the wall, receiving, by the electronic device via the first sensor, the second wave transmitted from the second sensor and a first reflected wave corresponding to the first wave generated by a touch applied to an outer surface of the wall, receiving, by the electronic device via the second sensor the first wave transmitted from the first sensor and a second reflected wave corresponding to the second wave generated by a touch applied to the outer surface of the wall, identifying, by the electronic device via a touch position on a basis of the first reflected wave and the second reflected wave based on the touch applied to the outer surface of the wall.

The electronic device and the method of operating the same according to the embodiment of the disclosure may sense a touch of the user's finger by using the plurality of ultrasonic sensors.

In the electronic device and the method of operating the same according to the embodiment of the disclosure, the plurality of ultrasonic sensors may be disposed inside the side surface bezel of the housing to define the plurality of touch keys (e.g., the soft keys or the buttonless keys).

In the electronic device and the method of operating the same according to the embodiment of the disclosure, the plurality of ultrasonic sensors may recognize touches on the plurality of touch keys (e.g., the soft keys or the buttonless keys) by generating the ultrasonic waves (e.g., the lamb waves) with different frequencies (e.g., the center frequencies) and receiving the reflected waves (e.g., the reflected signals) based on the ultrasonic waves (e.g., the lamb waves).

The electronic device and the method of operating the same according to the embodiment of the disclosure may determine at least one of the presence or absence of a touch, a touch length, touch strength, a single touch, and a multi-touch by using the plurality of touch keys (e.g., the soft keys or the buttonless keys).

The electronic device and the method of operating the same according to the embodiment of the disclosure may register (e.g., customize) the plurality of touch keys (e.g., the soft keys and the buttonless keys) at the positions desired by the user.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 1 is a block diagram of an electronic device in a network environment according to an embodiment of the disclosure;

FIGS. 4 and 5 are block diagrams illustrating a configuration of an electronic device according to various embodiments of the disclosure;

FIGS. 14 and 15 are views illustrating that a position at which a user's finger touches a side surface bezel is determined on the basis of a time at which a reflected wave (e.g., a reflected signal) is received by (e.g., arrives at) an ultrasonic sensor according to various embodiments of the disclosure;

FIG. 17 is a view illustrating that a sensor area of a side surface bezel is divided and a plurality of touch keys (e.g., side keys, soft keys, or buttonless keys) is registered (e.g., customized) according to an embodiment of the disclosure;

FIG. 21 is a view illustrating a method of acquiring background signals (e.g., background signals) of a plurality of ultrasonic sensors according to an embodiment of the disclosure;

FIG. 23 is a view illustrating a method of dividing a sensor area of a side surface bezel and registering (e.g., customizing) a plurality of touch keys (e.g., side keys, soft keys, or buttonless keys) according to an embodiment of the disclosure;

FIG. 30 is a view illustrating a method of recognizing a touch by dividing a sensor area and using a plurality of touch keys (e.g., side keys, soft keys, or buttonless keys) according to an embodiment of the disclosure.

Throughout the drawings, like reference numerals will be understood to refer to like parts, components, and structures.

MODE FOR THE INVENTION

Figure 2:
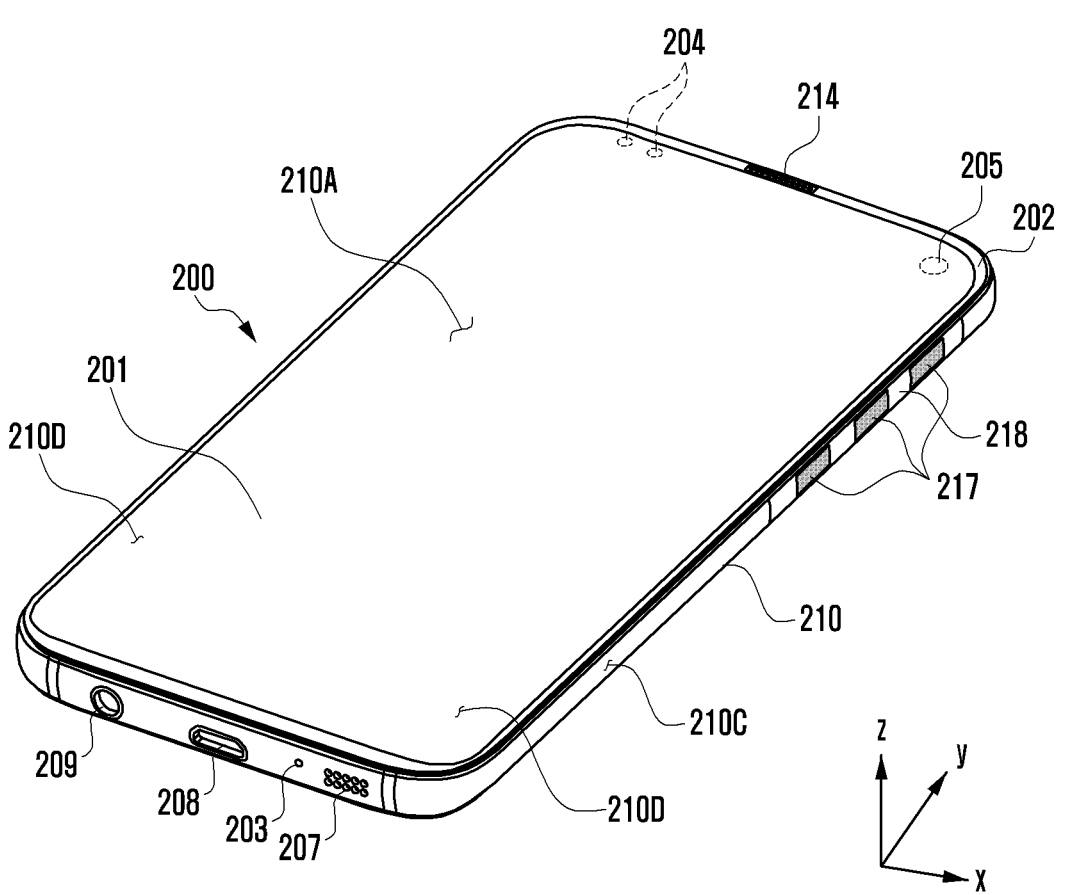
FIG. 2 is a perspective view of a front surface of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following descriptions and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1:
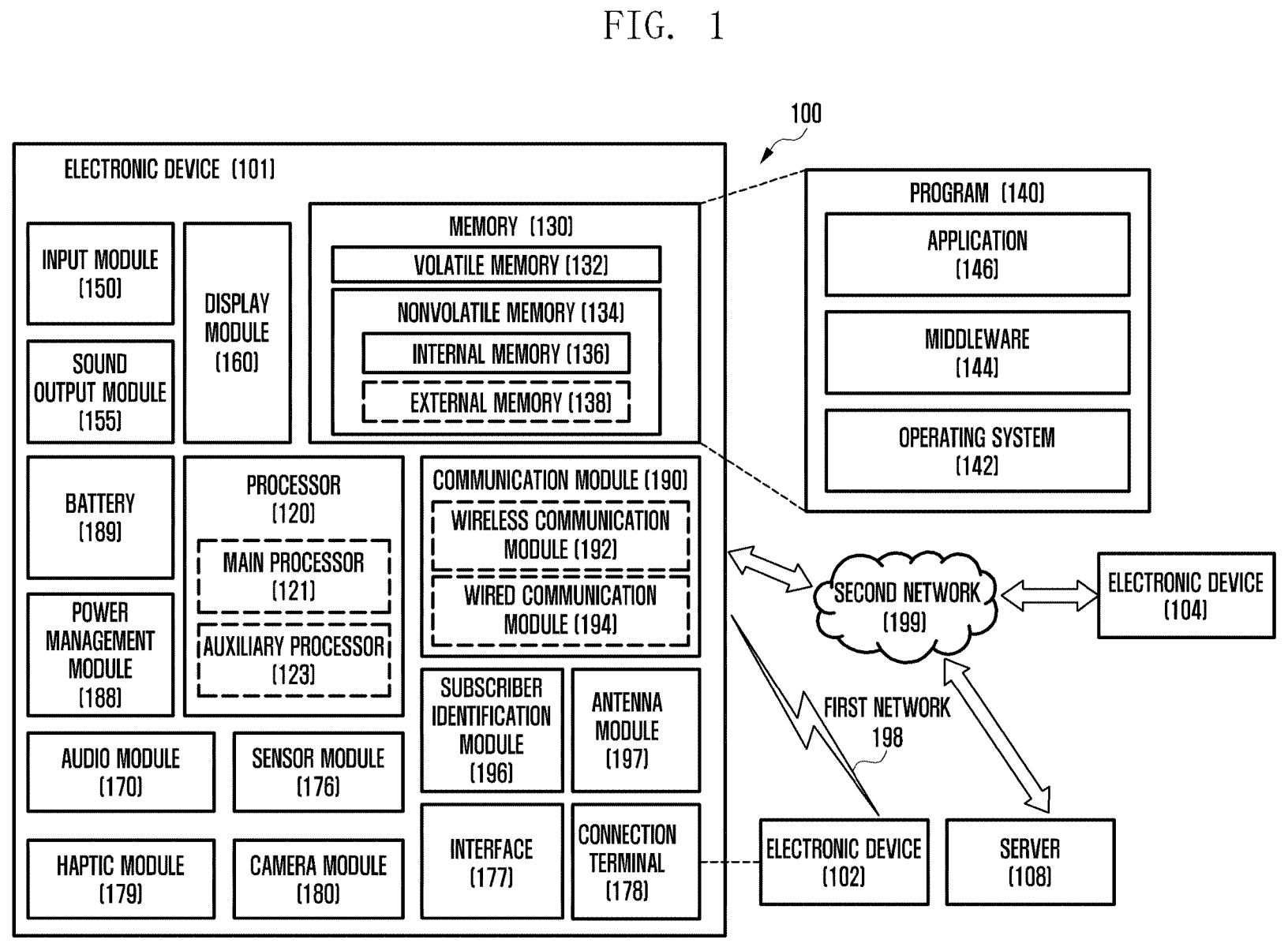

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and performs various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 is adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and includes, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 includes, for example, a microphone, a mouse, a keyboard, a key (e.g., a button), or a digital pen (e.g., a stylus pen).

The sound output module 155 may output sound signals to the outside of the electronic device 101. The sound output module 155 includes, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 includes, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 includes, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 includes, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 includes, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 includes, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 includes, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5$^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4$^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, is selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mm Wave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 and 104, or the server 108. For example, if the electronic device 101 should perform a function or a service automatically, or in response to a request from a user or another device, the electronic device 101, instead of, or in addition to, executing the function or the service, requests the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

According to the embodiment, the display module 160 illustrated in FIG. 1 is described as having the foldable display or the flexible display. However, the disclosure is not limited thereto. The display module 160 may also include a bar-type display or a flat plate-shaped (plate type) display.

According to the embodiment, the display module 160 illustrated in FIG. 1 may include a flexible display having a screen (e.g., a display screen) constituted to be folded or unfolded.

According to the embodiment, the display module 160 illustrated in FIG. 1 may include the flexible display slidably disposed and configured to provide the screen (e.g., the display screen).

According to the embodiment, the electronic device 101 illustrated in FIG. 1 may include a sensor component 480 (e.g., a first ultrasonic sensor 481 and a second ultrasonic sensor 482 in FIG. 4) configured to identify a user's touch by using ultrasonic waves, and a sensor component driving part (e.g., a sensor component driving part 490 in FIG. 4) configured to operate the sensor component 480 (e.g., a plurality of ultrasonic sensors).

According to the embodiment, the sensor component driving part 490 may be disposed and embedded in the sensor component 480.

According to the embodiment, the sensor component driving part 490 may be disposed as a component provided separately from the sensor component 480.

Figure 5:
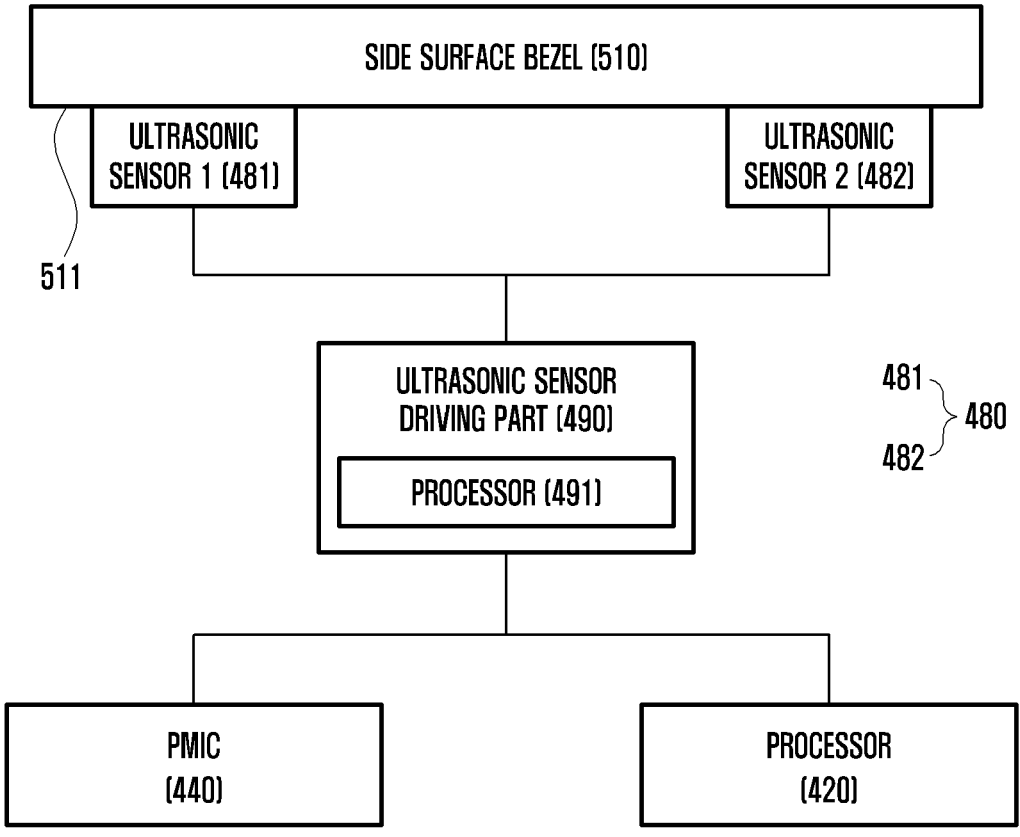

For example, the sensor component driving part 490 includes a processor (e.g., a processor 491 in FIG. 5 or an ultrasonic sensor driving part) configured to operate the first ultrasonic sensor (e.g., the first ultrasonic sensor 481 in FIG. 5) and the second ultrasonic sensor (e.g., the second ultrasonic sensor 482 in FIG. 5). The electronic device 101 including the sensor component 480 (e.g., the plurality of ultrasonic sensors) and the sensor component driving part 490 (e.g., the ultrasonic sensor driving part) may include a sidewall (e.g., a side surface bezel 218 in FIG. 2 or a side surface bezel 510 in FIG. 5) configured to define an outer surface of the electronic device 101. For example, the electronic device 101 operates to sense a touch of the user's finger by transmitting an ultrasonic wave (e.g., lamb wave) to a side surface (e.g., the side surface bezel 218 in FIG. 2 or the side surface bezel 510 in FIG. 5) of a housing (e.g., a housing 210 in FIG. 2) of the electronic device 101 and receiving a reflected wave (e.g., a reflected signal) of the ultrasonic wave (e.g., the lamb wave).

FIG. 2 is a perspective view of a front surface of the electronic device according to an embodiment of the disclosure.

Figure 3:
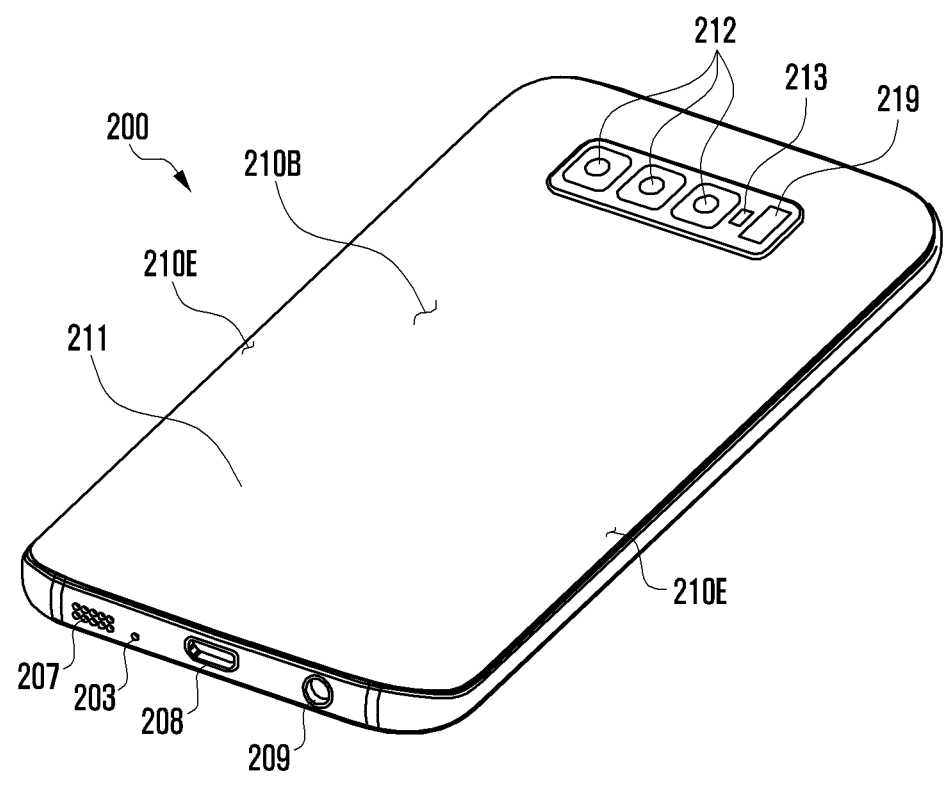
FIG. 3 is a perspective view of a rear surface of an electronic device according to an embodiment of the disclosure.

FIG. 3 is a perspective view of a rear surface of the electronic device according to an embodiment of the disclosure.

Referring to FIGS. 2 and 3, an electronic device 200 (e.g., the electronic device 101 in FIG. 1) according to the embodiments of the disclosure may include a first surface (or a front surface) 210A, a second surface (or a rear surface) 210B, and the housing 210. A display 201 (e.g., the display 410 in FIG. 4) may be disposed in a space defined by the housing 210. The housing 210 may include a side surface 210C that surrounds a space between the first surface 210A and the second surface 210B.

According to the embodiment, the housing 210 may be a structure that defines some of the first surface 210A, the second surface 210B, and the side surface 210C.

According to the embodiment, at least a part of the first surface 210A may be defined by a substantially transparent front surface plate 202 (e.g., a glass or polymer plate including various coating layers).

According to the embodiment, the second surface 210B may be defined by a substantially opaque rear surface plate 211. For example, the rear surface plate 211 is made of coated or tinted glass, ceramic, polymer, metal (e.g., aluminum, stainless steel, titanium, or magnesium), or a combination of at least two of the above materials. However, the disclosure is not limited thereto. The rear surface plate 211 may be made of transparent glass.

According to the embodiment, the side surface 210C may be defined by the side surface bezel 218 (e.g., the side surface bezel 510 in FIG. 5) (e.g., a side surface bezel structure, a side surface of the housing, or a lateral member) coupled to the front surface plate 202 and the rear surface plate 211 and including metal (e.g., aluminum, stainless steel, or titanium) and/or polymer.

According to the embodiment, the rear surface plate 211 and the side surface bezel 218 (e.g., the side surface bezel structure, the side surface of the housing, or the lateral member) may be integrated and include the same material (e.g., a metallic material such as aluminum).

According to the embodiment, the front surface plate 202 may include two first areas 210D extending seamlessly while being bent from the first surface 210A toward the rear surface plate 211. The two first areas 210D may be disposed at two opposite ends of long edges of the front surface plate 202.

According to the embodiment, the rear surface plate 211 may include two second areas 210E extending seamlessly while being bent from the second surface 210B toward the front surface plate 202.

According to the embodiment, the front surface plate 202 (or the rear surface plate 211) may include only one of the first areas 210D (or the second areas 210E).

According to the embodiment, some of the first areas 210D or the second areas 210E may be excluded. In the embodiments, when viewed from the side surface of the electronic device 200, the side surface bezel 218 (e.g., the side surface bezel structure, the side surface of the housing, or the lateral member) may have a first thickness (or width) at the side surface side at which the first areas 210D or the second areas 210E are excluded, the side surface bezel structure 218 may have a second thickness at the side surface side at which the first areas 210D or the second areas 210E are included, and the second thickness is smaller than the first thickness.

According to the embodiment, the electronic device 200 may include at least one of the display 201 (e.g., the display module 160 in FIG. 1 or the display 410 in FIG. 4), a sound input device 203 (e.g., the input module 150 in FIG. 1), sound output devices 207 and 214 (e.g., the sound output module 155 in FIG. 1), sensor modules 204 and 219 (e.g., the sensor module 176 in FIG. 1), the sensor component 480 (e.g., the plurality of ultrasonic sensors) (e.g., the sensor module 176 in FIG. 1 or the sensor component 480 in FIG. 4 (e.g., the plurality of ultrasonic sensors)), camera modules 205 and 212 (e.g., the camera module 180 in FIG. 1), a flash 213, a touch key 217 (e.g., a side key, a soft key, or a buttonless key), an indicator (not illustrated), and connector holes 208 and 209.

According to the embodiment, in the electronic device 200, a physical button may be substituted with the touch key 217 (e.g., the side key, the soft key, or the buttonless key).

According to the embodiment, the display 201 may be visually recognized through an upper end portion of the front surface plate 202.

According to the embodiment, at least a part of the display 201 may be visible through the front surface plate 202 that defines the first area 210D of the side surface 210C and the first surface 210A. The display 201 may be coupled to or disposed adjacent to a touch sensing circuit, a pressure sensor configured to measure intensity (pressure) of touch, and/or a digitizer configured to detect a stylus pen that operates in a magnetic field manner.

According to the embodiment, at least a part of each of the sensor modules 204 and 219 and/or at least a part of the touch key 217 (e.g., the side key, the soft key, or the buttonless key) may be disposed in the first area 210D and/or the second area 210E.

According to the embodiment, at least one of a sensor module 204, camera modules 205 (e.g., image sensors), an audio module 214, and the sensor component 480 (e.g., the plurality of ultrasonic sensors) may be included in a rear surface of a screen display area of the display 201.

According to the embodiment, the display 201 may be coupled to or disposed adjacent to the touch sensing circuit, the pressure sensor configured to measure intensity (pressure) of touch, and/or the digitizer configured to detect the stylus pen that operates in a magnetic field manner.

According to the embodiment, at least a part of each of the sensor modules 204 and 219 and/or at least a part of the touch key 217 (e.g., the side key, the soft key, or the buttonless key) may be disposed in the first areas 210D and/or the second areas 210E.

According to the embodiment, the sound input device 203 may include a microphone.

According to the embodiment, the input device 203 may include a plurality of microphones disposed to detect a direction of a sound. The sound output devices 207 and 214 may include an external speaker 207 and a telephone receiver (e.g., the audio module 214). In any embodiment, the sound input device 203 (e.g., a microphone), the sound output devices 207 and 214, and the connector holes 208 and 209 may be disposed in an internal space of the electronic device 200 and exposed to an external environment through at least one hole formed in the housing 210. In any embodiment, the hole formed in the housing 210 may be used in common for the sound input devices 203 (e.g., the microphone) and the sound output devices 207 and 214. In any embodiment, the sound output devices 207 and 214 may include speakers (e.g., piezoelectric speakers) that operate without holes formed in the housing 210.

According to the embodiment, the sensor modules 204 and 219 (e.g., the sensor module 176 in FIG. 1) may generate electrical signals or data values corresponding to the internal operating state of the electronic device 200 or the external environment state. For example, the sensor modules 204 and 219 includes a first sensor module 204 (e.g., a proximity sensor) disposed on the first surface 210A of the housing 210 and/or a second sensor module 219 (e.g., an HRM sensor) disposed on the second surface 210B of the housing 210. For example, the second sensor module 219 further includes a fingerprint sensor.

According to the embodiment, the sensor component 480 (e.g., the plurality of ultrasonic sensors) may be embedded in the display 201 or may be disposed on the first surface (e.g., the rear surface) of the display 201 (e.g., below the display 201 based on a z-axis). At least a part of the sensor component 480 (e.g., the plurality of ultrasonic sensors) may be disposed in the first area 210D.

According to the embodiment, a processor (e.g., the processor 120 in FIG. 1) of the electronic device 200 may perform fingerprint recognition by using the sensor component 480 (e.g., the plurality of ultrasonic sensors). For example, in case that an application program, which requires user certification (e.g., fingerprint recognition), is executed, the processor 120 determines that the fingerprint recognition is initiated. In case that the sensor component 480 (e.g., the plurality of ultrasonic sensors) is in a deactivated state, the processor 120 may send (e.g., transmit) a control signal, which instructs the sensor component 480 (e.g., the plurality of ultrasonic sensors) to switch to an active state, to the sensor component 480 (e.g., the plurality of ultrasonic sensors) on the basis of the initiation determination of the fingerprint recognition.

According to the embodiment, the sensor component 480 (e.g., the plurality of ultrasonic sensors) may detect an operating state of the electronic device 200 (e.g., the electronic device 101 in FIG. 1) or an external environment state and provide the detected information to the processor 120.

According to the embodiment, the sensor component 480 (e.g., the plurality of ultrasonic sensors) may acquire the user's bio-information (e.g., fingerprint information) by scanning an external object (e.g., the finger) being in contact with the sensor component 480. For example, the sensor component 480 (e.g., the plurality of ultrasonic sensors) acquires the user's fingerprint information through the fingerprint recognition based on an ultrasonic method. The sensor component 480 (e.g., the plurality of ultrasonic sensors) may collect information (e.g., fingerprint information) related to a shape of the external object on the basis of the ultrasonic wave reflected by the display 201 and/or the external object (e.g., the finger) and received.

The electronic device 200 may further include at least one of various non-illustrated other sensor modules, e.g., a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, and an illuminance sensor.

According to the embodiment, the camera modules 205 and 212 may include a first camera module 205 disposed on the first surface 210A of the electronic device 200, and a second camera module 212 disposed on the second surface 210B. The flash 213 may be disposed at the periphery of the camera modules 205 and 212. The camera modules 205 and 212 may include one or a plurality of lenses, an image sensor, and/or an image signal processor. For example, the flash 213 includes a light-emitting diode or a xenon lamp.

According to the embodiment, the first camera module 205 may be disposed under a display panel of the display 201 in an under-display camera (UDC) manner.

According to the embodiment, the two or more lenses (wide angle and telephoto lenses) and the image sensors may be disposed on one surface of the electronic device 200.

According to the embodiment, a plurality of first camera modules 205 may be disposed, in an under-display camera (UDC) manner, on the first surface (e.g., a surface on which the screen is displayed) of the electronic device 200.

According to the embodiment, the touch key 217 (e.g., the side key, the soft key, or the buttonless key) may be disposed on the side surface 210C of the housing 210.

According to the embodiment, the electronic device 200 may not include some of or all the above-mentioned touch keys 217 (e.g., the side keys, the soft keys, or the buttonless keys). The touch key 217 (e.g., the side key, the soft key, or the buttonless key), which is not included, may be implemented in another form such as a soft key on the display 201.

According to the embodiment, the touch key 217 (e.g., the side key, the soft key, or the buttonless key) may be implemented by using a pressure sensor included in the display 201.

According to the embodiment, the connector holes 208 and 209 may include a first connector hole 208 capable of accommodating a connector (e.g., a USB connector) for transmitting or receiving electric power and/or data to or from the external electronic device, and/or a second connector hole 209 (e.g., an earphone jack) capable of accommodating a connector for transmitting or receiving an audio signal to or from the external electronic device. The first connector hole 208 may include a universal serial bus (USB) A type port or a USB C type port. In case that the first connector hole 208 supports the USB C type, the electronic device 200 (e.g., the electronic device 101 in FIG. 1) may support USB PD (power delivery) charging.

According to the embodiment, some of the first camera modules 205 among the camera modules 205 and 212 and/or some of the sensor modules 204 among the sensor modules 204 and 219 may be disposed to be visually recognized through the display 201.

According to the embodiment, in case that the first camera module 205 is disposed in an under-display camera (UDC) manner, the first camera module 205 may not be visually recognized from the outside.

According to the embodiment, the first camera module 205 may be disposed to overlap the display area, and the screen may be displayed even in the display area corresponding to the first camera module 205. Some of the sensor modules 204 may be disposed in the internal space of the electronic device to perform the functions thereof without being visually exposed through the front surface plate 202.

According to the embodiment, the electronic device 200 illustrated in FIG. 2 may include the ultrasonic sensor (e.g., the sensor component 480 in FIG. 4 (e.g., the plurality of ultrasonic sensors)) configured to identify the user's touch by using the ultrasonic wave, and the sensor component driving part (e.g., the sensor component driving part 490 in FIGS. 4 and 5) configured to operate the sensor component 480 (e.g., the plurality of ultrasonic sensors).

According to the embodiment, at least a part of the side surface bezel 218 (e.g., the side surface bezel structure, the side surface of the housing, or the lateral member) disposed on the side surface of the housing 210 may be used as a sensor area (e.g., a sensor area 620 in FIG. 6) (e.g., a touch area, a touch plate, or a sensor plate) for sensing a touch.

For example, at least a part of the side surface bezel 218 (e.g., the side surface bezel structure, the side surface of the housing, or the lateral member) disposed on the side surface of the housing 210 is used as the sensor area 620 for sensing a touch without disposing a separate component for sensing a touch.

For example, the plurality of ultrasonic sensors (e.g., the sensor component 480 in FIG. 4 (e.g., the plurality of ultrasonic sensors)) is disposed in an interior of (e.g., inside) the side surface bezel 218 (e.g., the side surface bezel structure, the side surface of the housing, or the lateral member) of the housing 210. The plurality of ultrasonic sensors (e.g., the sensor component 480 in FIG. 4 (e.g., the plurality of ultrasonic sensors)) may be disposed to correspond to the sensor area (e.g., the sensor area 620 in FIG. 6) (e.g., the touch area, the touch plate, or the sensor plate) and divide the sensor area (e.g., the sensor area 620 in FIG. 6) (e.g., the touch area, the touch plate, or the sensor plate) into a plurality of areas so that the plurality of areas operate as the plurality of touch keys 217 (e.g., the side keys, the soft keys, or the buttonless keys).

According to the embodiment, the electronic device 200 including the sensor component 480 (e.g., the plurality of ultrasonic sensors) and the sensor component driving part 490 (e.g., the ultrasonic sensor driving part) may sense a touch of the user's finger by transmitting the ultrasonic wave (e.g., the lamb wave) to the side surface bezel 218 (e.g., the side surface bezel structure, the side surface of the housing, or the lateral member) of the housing 210 and receiving the reflected wave (e.g., the reflected signal) of the ultrasonic wave (e.g., the lamb wave).

FIGS. 4 and 5 are block diagrams illustrating a configuration of the electronic device according to various embodiments of the disclosure.

Referring to FIGS. 4 and 5, an electronic device 400 (e.g., the electronic device 101 in FIG. 1 or the electronic device 200 in FIGS. 2 and 3) according to the embodiment of the disclosure may include the display module 160 (e.g., the display module 160 in FIG. 1), a processor 420 (e.g., the processor 120 in FIG. 1), memory 433 (e.g., the memory 130 in FIG. 1), a power management integrated circuit (PMIC) 440 (e.g., the power management module 188 in FIG. 1), the sensor component 480 (e.g., the plurality of ultrasonic sensors), and the sensor component driving part 490 (e.g., the ultrasonic sensor driving part). For example, the sensor component 480 (e.g., the plurality of ultrasonic sensors) is used to identify the user's touch.

According to the embodiment, the sensor component driving part 490 may be disposed and embedded in the sensor component 480.

According to the embodiment, the sensor component driving part 490 may be disposed as a component provided separately from the sensor component 480.

For example, the sensor component driving part 490 includes the processor 491 (e.g., the ultrasonic sensor driving part) configured to operate the first ultrasonic sensor 481 and the second ultrasonic sensor 482.

FIG. 5 illustrates the sensor component 480 (e.g., the plurality of ultrasonic sensors), which is disposed in an interior 511 of (e.g., inside) the side surface bezel 510 (e.g., the side surface bezel 218 in FIG. 2) of the housing (e.g., the housing 210 in FIG. 2), the sensor component driving part 490 (e.g., the ultrasonic sensor driving part) configured to operate the sensor component 480 (e.g., the plurality of ultrasonic sensors), the PMIC 440 configured to supply electric power, and the processor 420 configured to control the operation of the sensor component driving part 490 (e.g., the ultrasonic sensor driving part) according to an embodiment of the disclosure.

Referring to FIG. 5, the display module 160 may include a display driver IC 430 (e.g., a display driving part) configured to operate the display 410 (e.g., the display 201 in FIG. 2), a touch circuit 450 configured to detect a touch on the display 410, a digitizer 460, and a digitizer driving part 470. Hereinafter, the display driver IC 430 may be referred to as a 'DDIC'.

According to the embodiment, the DDIC 430 may include an interface module 431, memory 433 (e.g., a buffer memory), an image processing module 435, or a mapping module 437.

According to the embodiment, the DDIC 430 may receive image information, which includes image data or image control signals corresponding to an instruction for controlling the image data, from another component of the electronic device (e.g., the electronic device 101 in FIG. 1 or the electronic device 200 in FIG. 2) through the interface module 431.

According to the embodiment, the image information may be received from the processor 420 (e.g., the main processor 121 in FIG. 1) (e.g., an application processor) or the auxiliary processor (e.g., the auxiliary processor 123 in FIG. 1) (e.g., a graphic processing device) that operates independently of the function of the main processor 121.

According to the embodiment, the DDIC 430 may communicate with the touch circuit 450 or the sensor module 176 through the interface module 431. In addition, the DDIC 430 may store at least a part of the received image information in the memory 433. For example, the DDIC 430 stores at least a part of the received image information in the memory 433 on a frame-by-frame basis.

According to the embodiment, the image processing module 435 may perform pre-processing or post-process (e.g., adjustment of resolution, brightness, or size) on at least some of the image data on the basis of at least some of the properties of the image data or the properties of the display 410.

According to the embodiment, the mapping module 437 may use the image processing module 435 to generate voltage values or current values corresponding to the image data that have been subjected to the pre-processing or post-process. According to the embodiment, for example, the generation of voltage values or current values is performed on the basis of at least some of attributes (e.g., the arrangement of pixels (RGB stripes or pentile structures) or sizes of subpixels) of pixels of the display 410.

According to the embodiment, for example, at least some of the pixels of the display 410 operate on the basis of at least some of the voltage values or current values, such that visual information (e.g., texts, images, or icons) corresponding to the image data is displayed on the display 410.

According to the embodiment, the touch circuit 450 may include a touch sensor 451 (e.g., a touch screen), and a touch sensor IC (touch fingerprint sensor integrated circuit) 453.

According to the embodiment, the touch circuit 450 may detect a touch input or a hovering input related to a particular position on the display 410. The touch sensor IC 453 may control the touch sensor 451 (e.g., the touch screen) to detect the touch input or the hovering input. For example, the touch sensor IC 453 detects a touch input or hovering input by measuring changes in signals (e.g., voltages, light amount, resistance, or charge quantities) related to a particular position of the display 410. The touch sensor IC 453 may provide the processor 420 with information about the detected touch input or hovering input (e.g., positions, areas, pressures, or times) (e.g., transmit the information to the processor 420 or input the information to the processor 420).

According to the embodiment, the touch sensor 451 (e.g., the touch screen) may be applied in an add-on manner in which the touch sensor 451 is separately manufactured and separately disposed on an upper portion of (e.g., above) the display 410.

According to the embodiment, the touch sensor 451 (e.g., the touch screen) may be applied in an on-cell manner in which the touch sensor 451 on the upper portion of the display 410.

According to the embodiment, the touch sensor 451 (e.g., the touch screen) may be applied in an in-cell manner in which the touch sensor 451 is disposed together with a pixel of the display 410.

According to the embodiment, at least a part of the touch circuit 450 (e.g., the touch sensor IC 453) may be included as a part of the DDIC 430 or the display 410.

According to the embodiment, at least a part of the touch circuit 450 (e.g., the touch sensor IC 453) may be included as a part of another component (e.g., the auxiliary processor 123) disposed outside the display module 160.

According to the embodiment, the display module 160 may further include at least one sensor (e.g., a fingerprint sensor, an iris sensor, a pressure sensor, or an illuminance sensor) of the sensor module 176 or a control circuit for the sensor. In this case, at least one sensor or the control circuit for the sensor may be embedded in a part of the display module 160 (e.g., the display 410 or the DDIC 430) or a part of the touch circuit 450.

For example, in case that the sensor module 176 embedded in the display module 160 includes a pressure sensor, the pressure sensor may acquire (e.g., receive) pressure information related to the touch input through a partial or entire area of the display 410.

According to the embodiment, the touch sensor 451 or the sensor module 176 may be disposed between the pixels of the pixel layer of the display 410 or disposed above or below the pixel layer.

According to the embodiment, the display module 160 may include the digitizer 460 configured to detect the input (e.g., the touch input or the hovering input) of the electronic pen (e.g., the stylus pen). For example, the digitizer driving part 470 configured to operate the digitizer 460 is included as a constituent element of the display module 160. For example, the digitizer driving part 470 configured to operate the digitizer 460 is included as a constituent element provided separately from the display module 160. For example, the digitizer 460 converts analog coordinates (e.g., positions) of the electronic pen (e.g., the stylus pen) into digital coordinate data. The digitizer 460 may transmit the digital coordinate data to the processor (e.g., the processor 120 in FIG. 1) and/or the DDIC 430.

According to the embodiment, the processor 420 (e.g., the processor 120 in FIG. 1) may acquire (e.g., receive) the digital coordinate data inputted from the digitizer 460. The processor 420 may detect the input (e.g., the touch input or the hovering input) through the electronic pen (e.g., the stylus pen) on the basis of the digital coordinate data. For example, the digitizer 460 includes a plurality of x-axis channels and a plurality of y-axis channels. The processor 420 may sense the position of the electronic pen (e.g., the stylus pen) by using sensing signals (e.g., electromagnetic resonance (EMR) signals) received from the x-axis channels and the y-axis channels disposed in the digitizer 460. For example, the plurality of x-axis channels and the plurality of y-axis channels may be sequentially arranged in the digitizer 460, and the processor 420 senses the position of the electronic pen (e.g., the stylus pen) by using the sensing signals received from the plurality of continuous channels (e.g., three adjacent channels).

According to the embodiment, the digitizer 460 may not be visible from the outside because of the display 410, the electronic components, and mechanisms.

For example, the digitizer 460 is disposed integrally with the display 410 having a flat plate shape or disposed adjacent to the display 410 having a flat plate shape. For example, in case that the digitizer 460 is applied to the display 410 having a flat plate shape, the digitizer 460 includes a single electromagnetic resonance (EMR) sheet (or an EMR film). The plurality of x-axis channels and the plurality of y-axis channels for detecting the position of the electronic pen may be disposed on the single EMR sheet.

For example, the digitizer 460 is disposed integrally with a flexible display (e.g., a rollable display or a foldable display) or disposed adjacent to the flexible display. For example, the digitizer 460 is disposed on a lower portion of (e.g., below) the display 410 (e.g., the display 201 in FIG. 2) in the z-axis direction (e.g., the z-axis direction in FIG. 2).

For example, the digitizer 460 is disposed on the lower portion of (e.g., below) the bar-type display (e.g., the display 201 in FIG. 2).

According to the embodiment, the electronic device 400 may include the sensor component 480 (e.g., the plurality of ultrasonic sensors) configured to identify the user's touch by using the ultrasonic wave, and the sensor component driving part 490 (e.g., the ultrasonic sensor driving part) configured to operate the sensor component 480 (e.g., the plurality of ultrasonic sensors).

According to the embodiment, at least a part of the side surface bezel 510 (e.g., the side surface bezel 218 in FIG. 2) (e.g., the side surface bezel structure, the side surface of the housing, or the lateral member) disposed on the side surface of the housing (e.g., the housing 210 in FIG. 2) of the electronic device 400 (e.g., the electronic device 101 in FIG. 1 or the electronic device 200 in FIG. 2) may be used as the sensor area (e.g., the sensor area 620 in FIG. 6) (e.g., the touch area, the touch plate, or the sensor plate). For example, the plurality of sensor components 480 (e.g., the plurality of ultrasonic sensors) is disposed in the interior 511 of (e.g., inside) the side surface bezel 218 or 510 (e.g., the side surface bezel structure, the side surface of the housing, or the lateral member) of the housing 210 of the electronic device 200 or 400. The plurality of sensor components 480 (e.g., the plurality of ultrasonic sensors) may be disposed to correspond to the sensor area (e.g., the sensor area 620 in FIG. 6) (e.g., the touch area, the touch plate, or the sensor plate). For example, the plurality of sensor components 480 (e.g., the plurality of ultrasonic sensors) is disposed in the interior 511 of (e.g., inside) of the side surface bezel 218 or 510 (e.g., the side surface bezel structure, the side surface of the housing, or the lateral member) of the housing 210.

According to the embodiment, at least a part of a bottom surface (e.g., a second surface 210b of the rear surface plate 211 in FIG. 3) of the housing 210 may be used as the sensor area (e.g., the sensor area 620 in FIG. 6) (e.g., the touch area, the touch plate, or the sensor plate).

For example, the plurality of sensor components 480 (e.g., the plurality of ultrasonic sensors) is disposed in the interior of (e.g., inside) the bottom surface (e.g., the second surface 210b of the rear surface plate 211 in FIG. 3) of the housing 210 of the electronic device 200 or 400.

For example, the sensor component 480 (e.g., the plurality of ultrasonic sensors) includes the first ultrasonic sensor 481 and the second ultrasonic sensor 482. The disclosure is not limited thereto. The sensor components 480 (e.g., the plurality of ultrasonic sensors) may include three or more ultrasonic sensors.

For example, the first ultrasonic sensor 481 and the second ultrasonic sensor 482 is disposed to adjoin the interior 511 (e.g., the inner side) of the side surface bezel 218 or 510 (e.g., the side surface bezel structure, the side surface of the housing, or the lateral member) of the housing 210.

For example, the plurality of sensor components 480 (e.g., the plurality of ultrasonic sensors) is disposed to adjoin the interior (e.g., the inner side) of the bottom surface (e.g., the second surface 210b of the rear surface plate 211 in FIG. 3) of the housing 210.

For example, the ultrasonic wave (e.g., vibration) generated by the first ultrasonic sensor 481 and the second ultrasonic sensor 482 is transmitted, as the lamb wave, to the side surface bezel 218 or 510.

For example, the ultrasonic wave (e.g., vibration) generated by the first ultrasonic sensor 481 and the second ultrasonic sensor 482 is transmitted, as the lamb wave, to the bottom surface (e.g., the second surface 210b of the rear surface plate 211 in FIG. 3) of the housing 210.

Figure 6:
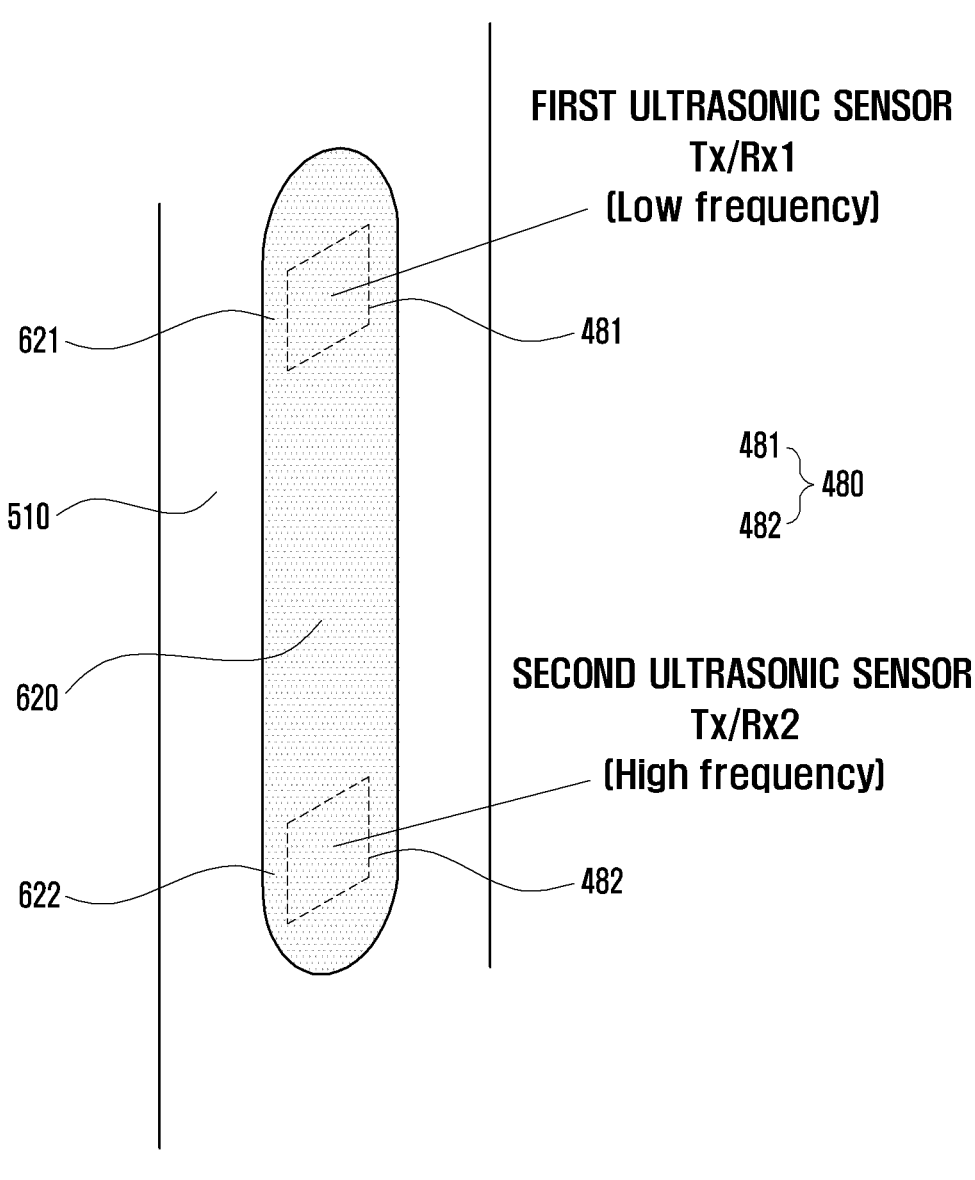
FIG. 6 is a view illustrating that a plurality of ultrasonic sensors is disposed to correspond to a sensor area according to an embodiment of the disclosure.

FIG. 6 is a view illustrating that the plurality of ultrasonic sensors is disposed to correspond to the sensor area according to an embodiment of the disclosure.

Referring to FIG. 6, at least a part of the housing (e.g., the side surface bezel 510 of the housing 210 in FIG. 2 (e.g., the side surface bezel 218 in FIG. 2 or the side surface bezel 510 in FIG. 5)) of the electronic device (e.g., the electronic device 101 in FIG. 1, the electronic device 200 in FIG. 2, or the electronic device 400 in FIG. 4) may be formed by the sensor area 620 (e.g., the touch area, the touch plate, or the sensor plate).

According to the embodiment, at least a part of the side surface bezel 218 or 510 may be used as the sensor area 620 (e.g., the touch area, the touch plate, or the sensor plate).

According to the embodiment, the entire side surface bezel 218 or 510 may be used as the sensor area 620 (e.g., the touch area, the touch plate, or the sensor plate).

For example, at least a part of the side surface bezel 218 or 510 is used as a plurality of touch keys (e.g., buttons, side key buttons, or soft buttons).

According to the embodiment, at least a part of the bottom surface (e.g., the second surface 210b of the rear surface plate 211 in FIG. 3) of the housing 210 may be used as the sensor area 620 (e.g., the touch area, the touch plate, or the sensor plate).

According to the embodiment, the entire bottom surface (e.g., the second surface 210b of the rear surface plate 211 in FIG. 3) of the housing 210 may be used as the sensor area 620 (e.g., the touch area, the touch plate, or the sensor plate).

For example, at least a part of the bottom surface (e.g., the second surface 210b of the rear surface plate 211 in FIG. 3) of the housing 210 is used as the plurality of touch keys (e.g., the buttons, the side key buttons, or the soft buttons).

According to the embodiment, the first ultrasonic sensor 481 and the second ultrasonic sensor 482 may be disposed in (e.g., the interior 511 in FIG. 5 of) the side surface bezel 218 or 510 (e.g., the side surface bezel structure, the side surface of the housing, or the lateral member) and disposed at a predetermined distance (e.g., spaced apart from each other).

For example, the first ultrasonic sensor 481 is disposed at a position corresponding to a first portion 621 of the sensor area 620 (e.g., the touch area, the touch plate, or the sensor plate) in (e.g., the interior 511 in FIG. 5 of) the side surface bezel 218 or 510 (e.g., the side surface bezel structure, the side surface of the housing, or the lateral member). The first ultrasonic sensor 481 may be disposed on the first portion 621 and provided to adjoin the interior (e.g., the interior 511 in FIG. 5) (e.g., the inner side) of the side surface bezel 218 or 510 (e.g., the side surface bezel structure, the side surface of the housing, or the lateral member). Because the first ultrasonic sensor 481 is disposed (e.g., positioned) in the interior (e.g., the interior 511 in FIG. 5) of (e.g., inside) the side surface bezel 218 or 510 (e.g., the side surface bezel structure, the side surface of the housing, or the lateral member), the arrangement of the first ultrasonic sensor 481 may not be visible from the outside of the electronic device.

For example, the second ultrasonic sensor 482 is disposed at a position corresponding to a second portion 622 of the sensor area 620 (e.g., the touch area, the touch plate, or the sensor plate) in (e.g., the interior 511 in FIG. 5 of) the side surface bezel 218 or 510 (e.g., the side surface bezel structure, the side surface of the housing, or the lateral member). The second ultrasonic sensor 482 may be disposed on the second portion 622 and provided to adjoin the interior (e.g., the interior 511 in FIG. 5) (e.g., the inner side) of the side surface bezel 218 or 510 (e.g., the side surface bezel structure, the side surface of the housing, or the lateral member). Because the second ultrasonic sensor 482 is disposed (e.g., positioned) in the interior (e.g., the interior 511 in FIG. 5) of (e.g., inside) the side surface bezel 218 or 510 (e.g., the side surface bezel structure, the side surface of the housing, or the lateral member), the arrangement of the second ultrasonic sensor 482 may not be visible from the outside of the electronic device.

According to the embodiment, the first ultrasonic sensor 481 and the second ultrasonic sensor 482 may be disposed in the interior of (e.g., inside) the bottom surface (e.g., the second surface 210b of the rear surface plate 211 in FIG. 3) of the housing 210 and disposed at a predetermined distance (e.g., spaced apart from each other).

For example, the first ultrasonic sensor 481 is disposed at the position corresponding to the first portion 621 of the sensor area 620 (e.g., the touch area, the touch plate, or the sensor plate) in the interior of (e.g., inside) the bottom surface (e.g., the second surface 210b of the rear surface plate 211 in FIG. 3) of the housing 210. The first ultrasonic sensor 481 may be disposed on the first portion 621 and provided to adjoin the interior (e.g., the inner side) of the bottom surface (e.g., the second surface 210b of the rear surface plate 211 in FIG. 3) of the housing 210. Because the first ultrasonic sensor 481 is disposed (e.g., positioned) in the interior of (e.g., inside) of the bottom surface (e.g., the second surface 210b of the rear surface plate 211 in FIG. 3) of the housing 210, the arrangement of the first ultrasonic sensor 481 may not be visible from the outside of the electronic device.

For example, the second ultrasonic sensor 482 is disposed at the position corresponding to the second portion 622 of the sensor area 620 (e.g., the touch area, the touch plate, or the sensor plate) in the interior of (e.g., inside) the bottom surface (e.g., the second surface 210b of the rear surface plate 211 in FIG. 3) of the housing 210. The second ultrasonic sensor 482 may be disposed on the second portion 622 and provided to adjoin the interior (e.g., the inner side) of the bottom surface (e.g., the second surface 210b of the rear surface plate 211 in FIG. 3) of the housing 210. Because the second ultrasonic sensor 482 is disposed (e.g., positioned) in the interior of (e.g., inside) of the bottom surface (e.g., the second surface 210b of the rear surface plate 211 in FIG. 3) of the housing 210, the arrangement of the second ultrasonic sensor 482 may not be visible from the outside of the electronic device.

According to the embodiment, data (e.g., instructions) for executing application programs related to the touch sensing using the ultrasonic sensor (e.g., the sensor component 480 in FIG. 4 (e.g., the plurality of ultrasonic sensors)) may be stored in the memory (e.g., the memory 130 in FIG. 1 or the memory 433 in FIG. 4).

According to the embodiment, the memory (e.g., the memory 130 in FIG. 1 or the memory 433 in FIG. 4) (e.g., the memory 130 in FIG. 1) may store various data (e.g., instructions) to be used by at least one constituent element (e.g., the processor 420, the display 410, and/or the sensor component 480 (e.g., the plurality of ultrasonic sensors)) of the electronic device 400. For example, the data includes information for operating the sensor component 480 (e.g., the plurality of ultrasonic sensors) and information related to background noise of the ultrasonic sensor. For example, the information related to the background noise of the ultrasonic sensor is acquired when the electronic device (e.g., the electronic device 101 in FIG. 1, the electronic device 200 in FIG. 2, or the electronic device 400 in FIG. 4) initially operates. For example, the information related to the background noise of the ultrasonic is acquired by a background noise scanning process performed before registering the plurality of touch keys (e.g., the plurality of touch keys 217 in FIG. 2, the soft keys, or the buttonless keys) (e.g., customizing the plurality of touch keys).

According to the embodiment, the first ultrasonic sensor 481 may generate a first ultrasonic wave (e.g., vibration) with a first frequency (e.g., a low frequency) and output the first ultrasonic wave to the side surface bezel 218 or 510 (e.g., the side surface bezel structure, the side surface of the housing, or the lateral member) of the housing 210 or the bottom surface of the housing 210. The first ultrasonic wave (e.g., vibration) transmitted to the side surface bezel 218 or 510 (e.g., the side surface bezel structure, the side surface of the housing, or the lateral member) or the bottom surface of the housing 210 may be transmitted, as a first lamb wave, to the side surface bezel 218 or 510 of the housing 210 or the bottom surface of the housing 210. For example, the first ultrasonic sensor 481 generates the first ultrasonic wave (e.g., vibration) with the first frequency (e.g., the low frequency) lower than that of the second ultrasonic sensor 482. For example, the first ultrasonic sensor 481 receives a first reflected wave based on a first lamb wave with the first frequency. The first ultrasonic sensor 481 may receive a second transmitted wave based on a second lamb wave with a second frequency.

According to the embodiment, the second ultrasonic sensor 482 may generate a second ultrasonic wave (e.g., vibration) with the second frequency (e.g., a high frequency) and output the second ultrasonic wave to the side surface bezel 218 or 510 (e.g., the side surface bezel structure, the side surface of the housing, or the lateral member) of the housing 210 or the bottom surface of the housing 210. The second ultrasonic wave (e.g., vibration) transmitted to the side surface bezel 218 or 510 (e.g., the side surface bezel structure, the side surface of the housing, or the lateral member) or the bottom surface of the housing 210 may be transmitted, as a second lamb wave, to the side surface bezel 218 or 510 of the housing 210 or the bottom surface of the housing 210. For example, the second ultrasonic sensor 482 generates the second ultrasonic wave (e.g., vibration) with the second frequency (e.g., the high frequency) higher than that of the first ultrasonic sensor 481. For example, the second ultrasonic sensor 482 receives a second reflected wave based on the second lamb wave with the second frequency. The second ultrasonic sensor 482 may receive the first transmitted wave based on the first lamb wave with the first frequency.

According to the embodiment, when the second ultrasonic sensor 482 outputs the second lamb wave, the time (e.g., the arrival time of the signal or the receiving time of the signal) at which the first ultrasonic sensor 481 receives the second transmitted wave based on the second lamb wave may be identified. It is possible to sense a position touched by the finger by using the first reflected wave and the second transmitted wave received by the first ultrasonic sensor 481.

According to the embodiment, when the first ultrasonic sensor 481 outputs the first lamb wave, the time (e.g., the arrival time of the signal or the receiving time of the signal) at which the second ultrasonic sensor 482 receives the first transmitted wave based on the first lamb wave may be identified. It is possible to sense a position touched by the finger by using the second reflected wave and the first transmitted wave received by the second ultrasonic sensor 482.

According to the embodiment, it is possible to sense the position touched by the finger by using the first reflected wave and the second transmitted wave received by the first ultrasonic sensor 481 and the second reflected wave and the first transmitted wave received by the second ultrasonic sensor 482. The sensing precision may increase as the signals received by the first ultrasonic sensor 481 and the signals received by the second ultrasonic sensor 482 increase.

The electronic device 200 or 400 according to the embodiment of the disclosure may include a wall (e.g., the side surface bezel 218 in FIG. 2 or the side surface bezel 510 in FIG. 6) configured to define an outer surface of the electronic device 200 or 400, and the housing (e.g., the housing 210 in FIG. 2).

According to the embodiment, the sensor component (e.g., the sensor component 480 in FIGS. 4 and 5) may include a first sensor (e.g., the first ultrasonic sensor 481 in FIG. 5) and a second sensor (e.g., the second ultrasonic sensor 482 in FIG. 5).

For example, the first sensor (e.g., the first ultrasonic sensor 481) and the second sensor (e.g., the second ultrasonic sensor 482) is disposed to be in contact with an inner surface of the wall (e.g., the side surface bezel 218 in FIG. 2 or the side surface bezel 510 in FIG. 6).

For example, the first sensor (e.g., the first ultrasonic sensor 481) transmits a first wave (e.g., the first lamb wave) so that the first wave (first lamb wave) propagates toward the second sensor 482 through the wall (e.g., the side surface bezel 218 in FIG. 2 or the side surface bezel 510 in FIG. 6).

For example, the second sensor (e.g., the second ultrasonic sensor 482) transmits a second wave (e.g., the second lamb wave) so that the second wave (second lamb wave) propagates toward the first sensor (e.g., the first ultrasonic sensor 481) through the wall (e.g., the side surface bezel 218 in FIG. 2 or the side surface bezel 510 in FIG. 6).

For example, the first sensor (e.g., the first ultrasonic sensor 481) receives the second wave (e.g., the second lamb wave) transmitted from the second sensor (e.g., the second ultrasonic sensor 482). The first sensor (e.g., the first ultrasonic sensor 481) may receive the first reflected wave corresponding to the first wave (e.g., the second lamb wave) generated by a touch applied to an outer surface of the wall (e.g., the side surface bezel 218 in FIG. 2 or the side surface bezel 510 in FIG. 6).

For example, the second sensor (e.g., the second ultrasonic sensor 482) receives the first wave (e.g., the first lamb wave) transmitted from the first sensor (e.g., the first ultrasonic sensor 481). The second sensor (e.g., the second ultrasonic sensor 482) may receive the second reflected wave corresponding to the second wave (e.g., the first lamb wave) generated by a touch applied to the outer surface of the wall (e.g., the side surface bezel 218 in FIG. 2 or the side surface bezel 510 in FIG. 6).

For example, when executed by the processor (e.g., the processor 420 in FIGS. 4 and 5), the memory (e.g., the memory 433 in FIG. 4) stores instructions for operating the electronic device 200 or 400.

For example, when the instructions are executed by the processor 420, the electronic device 200 or 400 identifies a touch position on the basis of the first reflected wave and the second reflected wave based on the touch applied to the outer surface of the wall (e.g., the side surface bezel 218 in FIG. 2 or the side surface bezel 510 in FIG. 6).

For example, when the instructions are executed by the processor 420, the electronic device 200 or 400 identifies the touch pressure on the basis of the first reflected wave and the second reflected wave based on the touch applied to the outer surface of the wall (e.g., the side surface bezel 218 in FIG. 2 or the side surface bezel 510 in FIG. 6).

For example, when the instructions are executed by the processor 420, the electronic device 200 or 400 identifies a touch gesture and a touch input time on the basis of the first reflected wave and the second reflected wave based on the touch applied to the outer surface of the wall (e.g., the side surface bezel 218 in FIG. 2 or the side surface bezel 510 in FIG. 6).

For example, the first sensor (e.g., the first ultrasonic sensor 481) transmits the first wave (e.g., the first lamb wave) with the first frequency (e.g., a relatively low frequency relative to the second frequency).

For example, the second sensor (e.g., the second ultrasonic sensor 482) transmits the second wave (e.g., the second lamb wave) with the second frequency. The second sensor (e.g., the second ultrasonic sensor 482) may transmit the second frequency (e.g., a relatively high frequency relative to the first frequency) different from the first frequency.

For example, the sensor component (e.g., the sensor component 480 in FIG. 5) includes the processor (e.g., the processor 491 in FIG. 5) configured to operate the first sensor 481 and the second sensor 482.

Figure 7:
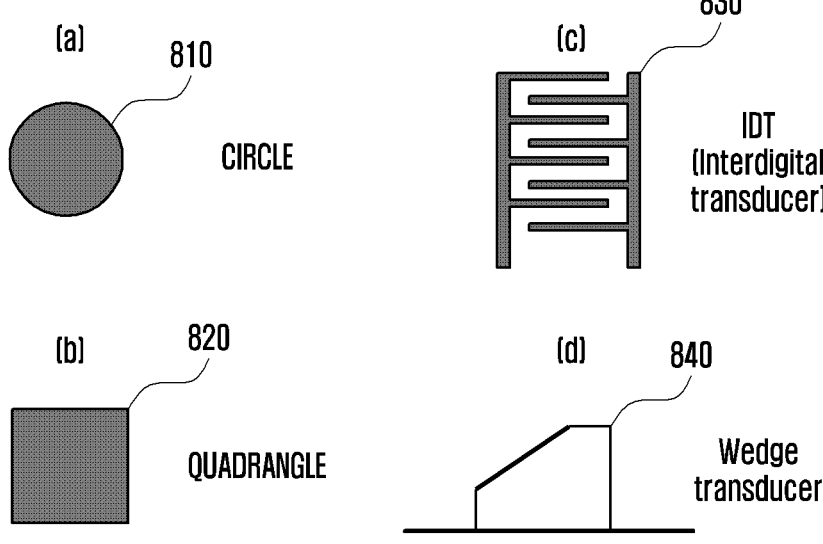
FIG. 7 is a view illustrating examples of ultrasonic sensors configured to generate lamb waves according to an embodiment of the disclosure.

FIG. 7 is a view illustrating examples of the ultrasonic sensors configured to generate lamb waves according to an embodiment of the disclosure.

Referring to FIGS. 6 and 7, according to the embodiment, a circular ultrasonic sensor 810 (e.g., the plurality of ultrasonic sensors 481 and 482) may be disposed on the side surface bezel (the side surface bezel 218 in FIG. 2 or the side surface bezel 510 in FIG. 5) of the electronic device (e.g., the electronic device 101 in FIG. 1, the electronic device 200 in FIG. 2, or the electronic device 400 in FIG. 4) of the disclosure.

According to the embodiment, a quadrangular ultrasonic sensor 820 (e.g., the plurality of ultrasonic sensors 481 and 482) may be disposed on the side surface bezel (the side surface bezel 218 in FIG. 2 or the side surface bezel 510 in FIG. 5) of the electronic device (e.g., the electronic device 101 in FIG. 1, the electronic device 200 in FIG. 2, or the electronic device 400 in FIG. 4) of the disclosure.

According to the embodiment, an inter-digital transducer (IDT) ultrasonic sensor 830 (e.g., the plurality of ultrasonic sensors 481 and 482) may be disposed on the side surface bezel (the side surface bezel 218 in FIG. 2 or the side surface bezel 510 in FIG. 5) of the electronic device (e.g., the electronic device 101 in FIG. 1, the electronic device 200 in FIG. 2, or the electronic device 400 in FIG. 4) of the disclosure.

According to the embodiment, a wedge-shaped ultrasonic sensor 840 (e.g., the plurality of ultrasonic sensors 481 and 482) may be disposed on the side surface bezel (the side surface bezel 218 in FIG. 2 or the side surface bezel 510 in FIG. 5) of the electronic device (e.g., the electronic device 101 in FIG. 1, the electronic device 200 in FIG. 2, or the electronic device 400 in FIG. 4) of the disclosure.

Figure 8:
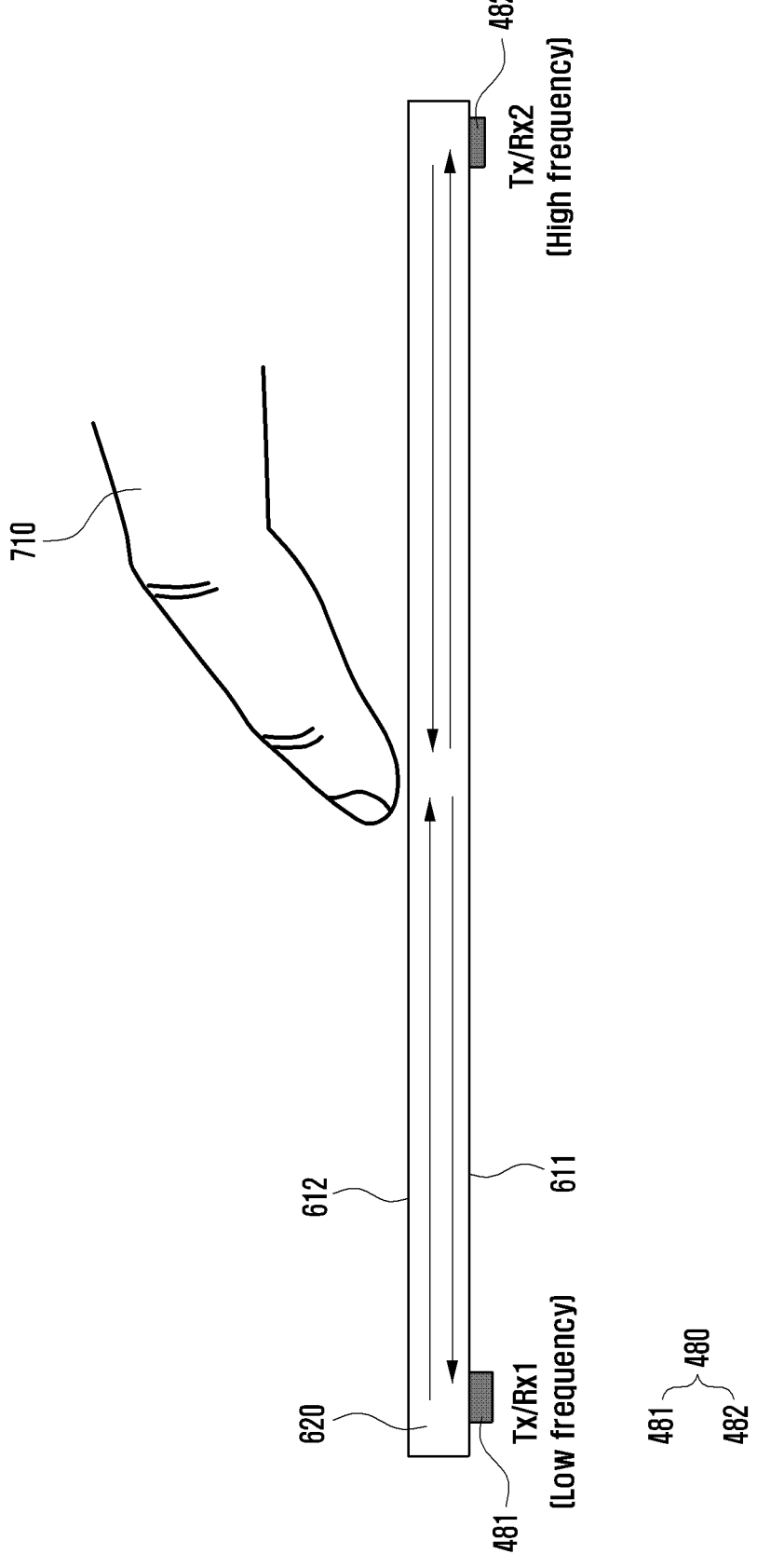
FIG. 8 is a view illustrating a method of sensing a touch by using a plurality of ultrasonic sensors according to an embodiment of the disclosure.

FIG. 8 is a view illustrating a method of sensing a touch by using the plurality of ultrasonic sensors according to an embodiment of the disclosure.

Figure 9:
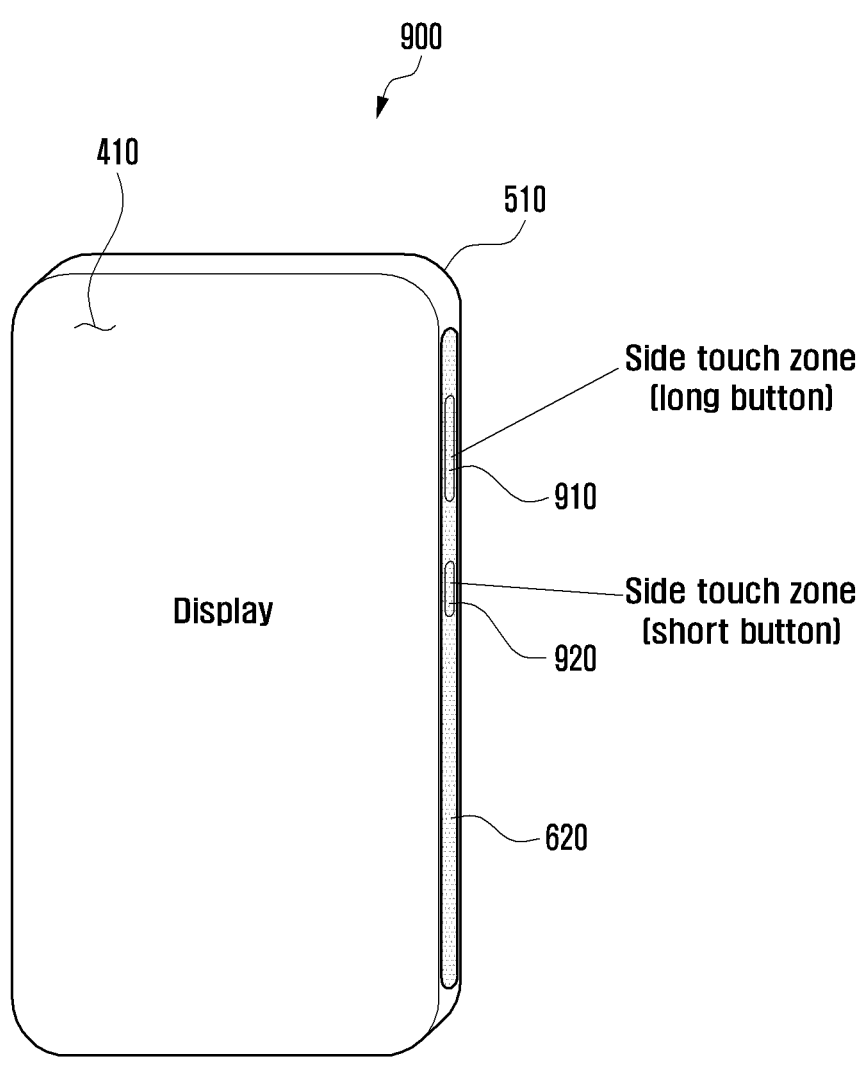
FIG. 9 is a view illustrating that a sensor area (e.g., a touch area, a touch plate, or a sensor plate) is divided into a plurality of areas to define a plurality of touch keys (e.g., soft keys or buttonless keys) according to an embodiment of the disclosure.

FIG. 9 is a view illustrating that the sensor area (e.g., a touch area, a touch plate, or a sensor plate) is divided into a plurality of areas to define a plurality of touch keys (e.g., soft keys or buttonless keys) according to an embodiment of the disclosure.

Referring to FIGS. 8 and 9, according to the embodiment, the first ultrasonic sensor 481 and the second ultrasonic sensor 482 may be disposed to adjoin an interior 611 (e.g., an inner surface) of the sensor area 620 (e.g., the touch area, the touch plate, or the sensor plate).

According to the embodiment, the sensor component 480 (e.g., the plurality of ultrasonic sensors) may transmit the ultrasonic wave (e.g., the lamb wave) to the side surface bezel 218 (e.g., the side surface bezel structure, the side surface of the housing, or the lateral member) of the housing 210 and receive the reflected wave (e.g., the reflected signal) of the ultrasonic wave (e.g., the lamb wave). For example, the processor (e.g., the processor 120 in FIG. 1 or the processor 420 in FIG. 4) senses a touch of the user's finger on the basis of the received reflected wave (e.g., the reflected signal). For example, the processor 120 or 420 determines at least one of the presence or absence of a touch, a touch position, a touch length, a touch strength, a single touch, and a multi-touch on the basis of the received reflected wave (e.g., the reflected signal).

According to the embodiment, the first ultrasonic sensor 481 and the second ultrasonic sensor 482 may generate the ultrasonic waves (e.g., the lamb waves) with different frequencies (e.g., center frequencies).

For example, the first ultrasonic sensor 481 generates the first ultrasonic wave (e.g., the first lamb wave) with the first frequency (e.g., the first center frequency or the low frequency).

For example, the second ultrasonic sensor 482 generates the second ultrasonic wave (e.g., the second lamb wave) with the second frequency (e.g., the second center frequency or the high frequency) higher than the first frequency (e.g., the first center frequency or the low frequency).

For example, the first ultrasonic sensor 481 generates the first ultrasonic wave (e.g., the first lamb wave) with the first frequency (e.g., the first center frequency or the low frequency), and the second ultrasonic sensor 482 generates the second ultrasonic wave (e.g., the second lamb wave) with the second frequency (e.g., the second center frequency or the high frequency), such that the interference therebetween is eliminated (e.g., substantially eliminated or the interference therebetween may be reduced).

According to the embodiment, the first ultrasonic wave (e.g., the first lamb wave) with the first frequency generated by the first ultrasonic sensor 481 and the second ultrasonic wave (e.g., the second lamb wave) with the second frequency generated by the second ultrasonic sensor 482 may be different in frequencies and thus have different velocities.

For example, the first ultrasonic sensor 481 generates the first ultrasonic wave (e.g., the first lamb wave) with the center frequency of about 800 kHz, such that the first ultrasonic wave (e.g., the first lamb wave) is transmitted to a plate having a thickness of about 1 mm and made of an aluminum material. In this case, the first ultrasonic wave (e.g., the first lamb wave) may move at a first velocity (e.g., a velocity of about 2,180 m/s) in the sensor area 620. For example, in case that the user's finger 710 touches an outer surface 612 of the sensor area 620 (e.g., the outer surface of the side surface bezel), the first reflected wave (e.g., the first reflected signal) of the first ultrasonic wave (e.g., the first lamb wave) also moves at the first velocity (e.g., the velocity of about 2,180 m/s) in the sensor area 620. The first ultrasonic sensor 481 may transmit the first ultrasonic wave (e.g., the first lamb wave) and then receive the first reflected wave (e.g., the reflected signal).

For example, the second ultrasonic sensor 482 generates the second ultrasonic wave (e.g., the second lamb wave) with the center frequency of about 1.4 MHz, such that the second ultrasonic wave (e.g., the second lamb wave) may be transmitted to the plate having a thickness of about 1 mm and made of an aluminum material. In this case, the second ultrasonic wave (e.g., the second lamb wave) may move at a second velocity (e.g., a velocity of about 2,500 m/s) in the sensor area 620. For example, in case that the user's finger 710 touches the outer surface 612 of the sensor area 620 (e.g., the outer surface of the side surface bezel), the second reflected wave (e.g., the second reflected signal) of the second ultrasonic wave (e.g., the second lamb wave) also moves at the second velocity (e.g., the velocity of 2,500 m/s) in the sensor area 620. The second ultrasonic sensor 482 may transmit the second ultrasonic wave (e.g., the second lamb wave) and then receive the second reflected wave (e.g., the reflected signal).

For example, the first frequency of the first ultrasonic wave and the first reflected wave (e.g., the first reflected wave) and the second frequency of the second ultrasonic wave and the second reflected wave (e.g., the second reflected wave) are different from each other, such that the first ultrasonic sensor 481 and the second ultrasonic sensor 482 distinguish between the received first reflected wave (e.g., the first reflected signal) and the received second reflected wave (e.g., the second reflected signal).

For example, the first velocity of the first ultrasonic wave and the first reflected wave (e.g., the first reflected wave) and the second velocity of the second ultrasonic wave and the second reflected wave (e.g., the second reflected wave) are different from each other, such that the processor (e.g., the processor 120 in FIG. 1 or the processor 420 in FIG. 4) calculates a complementary distance between the first ultrasonic sensor 481 and the second ultrasonic sensor 482.

According to the embodiment, the sensor area 620 (e.g., the touch area, the touch plate, or the sensor plate) may be divided into a plurality of areas, and the plurality of areas may operate as a plurality of touch keys 910 and 920 (e.g., a plurality of side keys, a plurality of touch keys, or a plurality of soft keys) (e.g., the plurality of touch keys 217 in FIG. 2, the soft keys, or the buttonless keys).

According to the embodiment, the plurality of touch keys 910 and 920 (e.g., the plurality of side keys, the plurality of touch keys, or the plurality of soft keys) may include a first touch key 910 configured to perform a first operation (e.g., an operation based on a long button touch), and a second touch key 920 configured to perform a second operation (e.g., an operation based on a short button touch).

For example, the first touch key 910 configured to perform the first operation (e.g., the operation based on the long button touch) is used as the touch key (the side key, the soft key, or the buttonless key) for performing a press operation, a release operation, a long press operation, or a single press operation.

For example, the second touch key 920 configured to perform the second operation (e.g., the operation based on the short button touch) is used as the touch key (the side key, the soft key, or the buttonless key) for performing a press operation, a release operation, a short press operation, or a double press operation.

For example, the first touch key 910 configured to perform the first operation (e.g., the operation based on the long button touch) is defined as an up area, and the second touch key 920 configured to perform the second operation (e.g., the operation based on the short button touch) may be defined as a down area, such that the operation of the touch key (the side key, the soft key, or the buttonless key) may be performed.

For example, a first swipe is recognized in case that a touch is initiated on the first touch key 910 and the touch moves to the second touch key 920, and an operation of the first swipe is performed.

For example, a second swipe is recognized in case that a touch is initiated on the second touch key 920 and the touch moves to the first touch key 910, and an operation of the second swipe is performed.

For example, the electronic device 200 or 400 customizes the plurality of touch keys (the side keys, the soft keys, or the buttonless keys) related to a position or operation desired by the user.

The disclosure is not limited thereto. The plurality of touch keys 910 and 920 (e.g., the plurality of side keys, the plurality of touch keys, or the plurality of soft keys) may include three or more touch keys. For example, the plurality of touch keys includes a first touch key for performing a first operation (e.g., a home button operation), a second touch key for performing a second operation (e.g., a volume-down operation), and a third touch key for performing a third operation (e.g., a volume-up operation).

Figure 10:
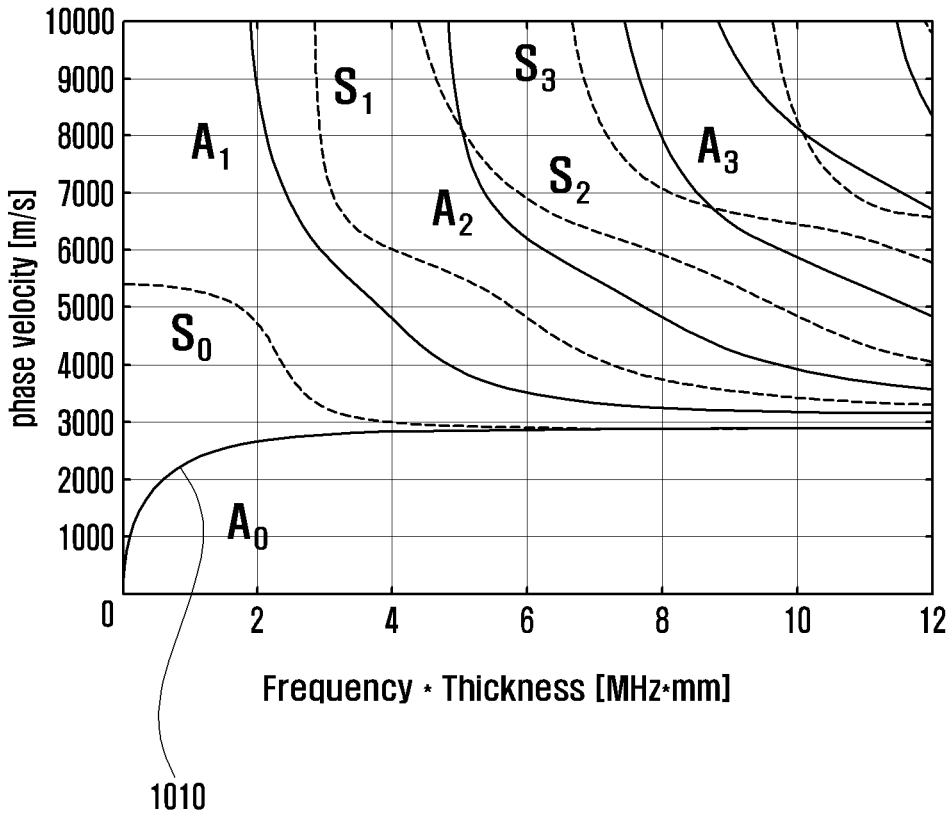
FIG. 10 is a view illustrating modes applied to a plurality of ultrasonic sensors according to an embodiment of the disclosure.

FIG. 10 is a view 1000 illustrating modes applied to the plurality of ultrasonic sensors according to an embodiment of the disclosure.

FIG. 10 illustrates dispersion curves of the ultrasonic waves (e.g., the lamb waves) on the aluminum plate having a thickness of about 1 mm. In FIG. 10, the y-axis (e.g., the vertical axis) may indicate phase velocities of the ultrasonic waves, and the x-axis (e.g., the horizontal axis) may indicate frequencies [MHz] of the ultrasonic waves and thicknesses of the plate on which the transmitted ultrasonic waves propagate.

Referring to FIG. 10, the electronic device (e.g., the electronic device 101 in FIG. 1, the electronic device 200 in FIG. 2, or the electronic device 400 in FIG. 4) according to the embodiment of the disclosure may select a mode of the ultrasonic sensor (e.g., the sensor component 480 in FIGS. 5, 6, and 8 (e.g., the plurality of ultrasonic sensors)) and operate the sensor component 480 (e.g., the plurality of ultrasonic sensors).

For example, the ultrasonic wave (e.g., the lamb wave) generated by the sensor component 480 (e.g., the plurality of ultrasonic sensors) propagates in various modes (e.g., modes A0 to A3 and modes S0 to S3) and has dispersion properties. A movement velocity of the ultrasonic wave (e.g., the lamb wave) may vary depending on the frequency of the ultrasonic wave (e.g., the lamb wave) generated by the sensor component 480 (e.g., the plurality of ultrasonic sensors) and a material and thickness of a medium (e.g., the side surface bezel 218 in FIG. 2 or the side surface bezel 510 in FIGS. 5 and 6) through which the ultrasonic wave (e.g., the lamb wave) moves.

For example, the electronic device 101, 200, or 400 according to the embodiment of the disclosure uses the A0 mode 1010 most suitable for the touch sensing operation using the sensor component 480 (e.g., the plurality of ultrasonic sensors) among various modes (e.g., modes A0 to A3 and modes S0 to S3). The A0 mode 1010 may be characterized by having the largest out-of-displacement when the ultrasonic wave (e.g., the lamb wave) moves along the side surface bezel 218 or 510. Because the material and thickness of the side surface bezel 218 or 510 are fixed, the velocities of the respective modes may be determined when the frequency of the ultrasonic wave (e.g., the lamb wave) is determined. In this case, the first frequency (e.g., the first center frequency) of the first ultrasonic wave (e.g., the first lamb wave) generated by the first ultrasonic sensor 481 and the second frequency (e.g., the second center frequency) of the second ultrasonic wave (e.g., the second lamb wave) generated by the second ultrasonic sensor 482 may be determined on the basis of a material and thickness of the side surface bezel 218 or 510 and a length of the sensor area (e.g., the sensor area 620 in FIGS. 6 and 8).

Figure 11:
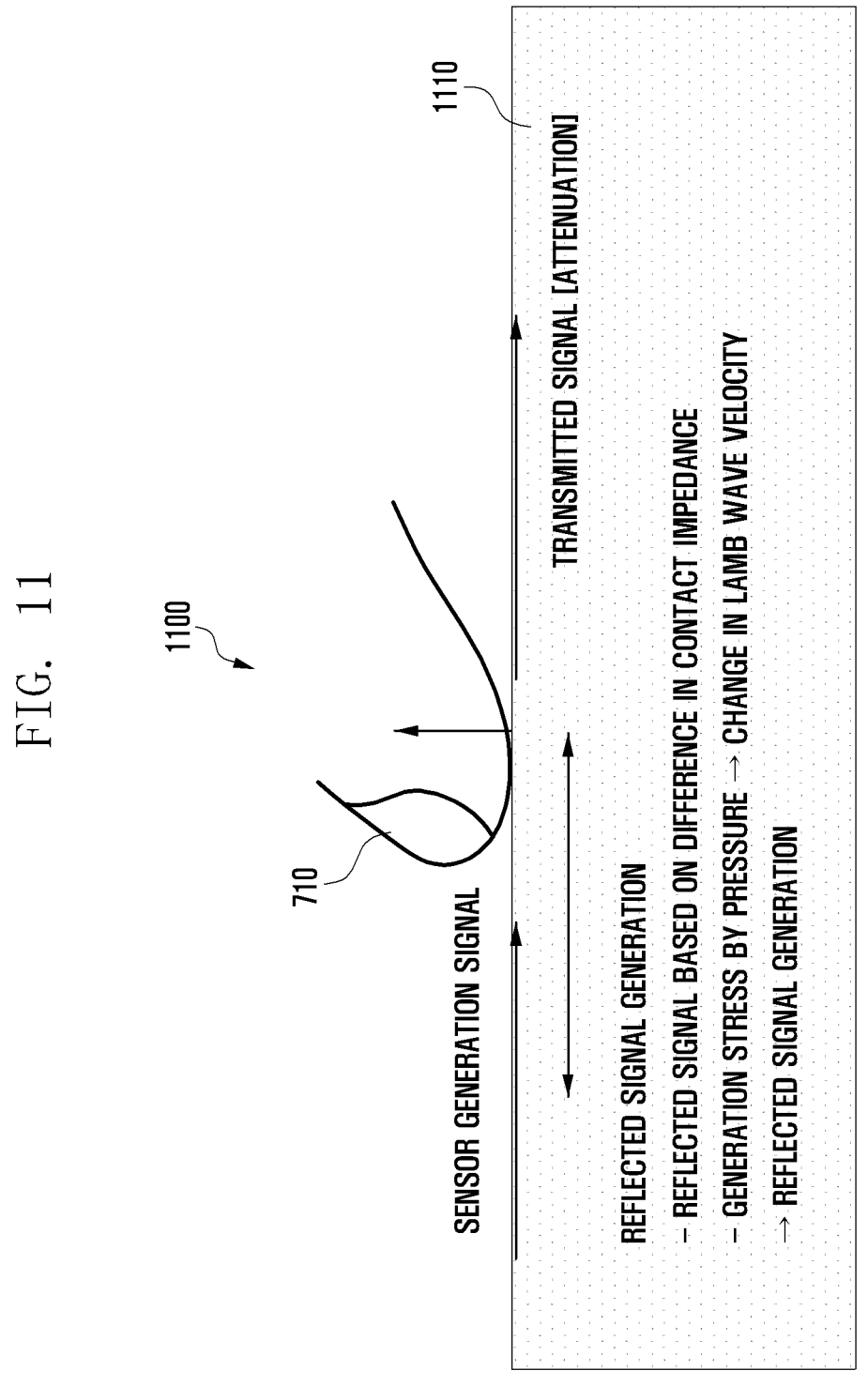
FIG. 11 is a view illustrating data of ultrasonic waves (e.g., lamb waves) that may be acquired when a user's finger touches a side surface bezel according to an embodiment of the disclosure.

FIG. 11 is a view 1100 illustrating data of the ultrasonic waves (e.g., the lamb waves) that may be acquired when the user's finger touches the side surface bezel according to an embodiment of the disclosure.

Referring to FIG. 11, when the user's finger 710 touches the touch area (e.g., the sensor area 620 in FIGS. 6 and 8) of a side surface bezel 1110 (e.g., the side surface bezel 218 in FIG. 2 or the side surface bezel 510 in FIGS. 5 and 6), the electronic device (e.g., the electronic device 101 in FIG. 1, the electronic device 200 in FIG. 2, or the electronic device 400 in FIG. 4) according to the embodiment of the disclosure may acquire data of the ultrasonic wave (e.g., the lamb wave) by using the ultrasonic sensor (e.g., the sensor component 480 in FIGS. 6 and 8 (e.g., the plurality of ultrasonic sensors)).

According to the embodiment, the first ultrasonic sensor (e.g., the first ultrasonic sensor 481 in FIGS. 6 and 8) may apply the first ultrasonic wave (e.g., the first lamb wave) with the first frequency to the side surface bezel 1110. The first ultrasonic sensor 481 may receive the first reflected wave (e.g., the first reflected signal) based on the first ultrasonic wave (e.g., the first lamb wave). For example, the first ultrasonic sensor 481 transmits the first ultrasonic wave (e.g., the first lamb wave) with the first frequency (e.g., the center frequency of about 800 kHz or the low frequency) and receive the first reflected wave (e.g., the first reflected signal) with the first frequency (e.g., the center frequency of about 800 kHz or the low frequency). The first reflected wave (e.g., the first reflected signal) may be generated by a difference in contact impedance made by a touch of the finger. In addition, stress may be applied to the plate pressed by the finger, the velocity of the first lamb wave may be changed by the stress of the plate, and the first reflected wave (e.g., the first reflected signal) may be generated. The first reflected wave (e.g., the first reflected signal) may be received by the first ultrasonic sensor 481.

For example, the first ultrasonic sensor 481 receives the second transmitted wave (e.g., the second transmitted signal) based on the second ultrasonic wave (e.g., the second lamb wave) of the center frequency (high frequency) of about 1.4 MHz transmitted by the second ultrasonic sensor 482. When the touch of the finger is inputted, the second ultrasonic wave (e.g., the second lamb wave) transmitted from the second ultrasonic sensor 482 may be attenuated, but the second transmitted wave (e.g., the second transmitted signal), which passes through the portion touched by the finger, may be received by the first ultrasonic sensor 481. The second reflected wave (e.g., the second reflected signal) may be generated by a difference in contact impedance made by a touch of the finger. In addition, stress may be applied to the plate pressed by the finger, the velocity of the second lamb wave may be changed by the stress of the plate, and the second reflected wave (e.g., the second reflected signal) may be generated. The second reflected wave (e.g., the second reflected signal) may be received by the second ultrasonic sensor 482.

According to the embodiment, the second ultrasonic sensor (e.g., the second ultrasonic sensor 482 in FIGS. 6 and 8) may apply the second ultrasonic wave (e.g., the second lamb wave) with the second frequency different from the first frequency to the side surface bezel 1110. The second ultrasonic sensor 482 may receive the second reflected wave (e.g., the second reflected signal) based on the second ultrasonic wave (e.g., the second lamb wave). For example, the second ultrasonic sensor 482 transmits the second ultrasonic wave (e.g., the second lamb wave) with the second frequency (e.g., the center frequency of about 1.4 MHz or the high frequency) and receive the second reflected wave (e.g., the second reflected signal) with the second frequency (e.g., the center frequency of about 1.4 MHz or the high frequency). For example, the second ultrasonic sensor 482 receives the first transmitted wave (e.g., the first transmitted signal) based on the first ultrasonic wave (e.g., the first lamb wave) with the center frequency (low frequency) of about 800 kHz transmitted from the first ultrasonic sensor 481. When the touch of the finger is inputted, the first ultrasonic wave (e.g., the first lamb wave) transmitted from the first ultrasonic sensor 481 may be attenuated, but the first transmitted wave (e.g., the first transmitted signal), which passes through the portion touched by the finger, may be received by the second ultrasonic sensor 482.

For example, an effect of attenuating the transmitted signal is made by energy propagating to the finger 710, but the presence or absence of a touch may be determined by the reflected wave (e.g., the reflected signal) of the ultrasonic wave (e.g., the lamb wave). The electronic device 101, 200, or 400 detects a change made by a touch of the finger 710 on the basis of the first reflected wave (e.g., the first reflected signal) and the second reflected wave (e.g., the second reflected signal) received by the first ultrasonic sensor 481 and the second ultrasonic sensor 482. The first ultrasonic sensor 481 may generate the first ultrasonic wave (e.g., the first lamb wave) of the first frequency (e.g., the first center frequency), and the second ultrasonic sensor 482 generates the second ultrasonic wave (e.g., the second lamb wave) of the second frequency (e.g., the second center frequency), such that the presence or absence of a touch may be determined on the basis of the first reflected wave (e.g., the first reflected signal) and the second reflected wave (e.g., the second reflected signal).

The side surface bezel 1110 (e.g., the side surface bezel 218 in FIG. 2 or the side surface bezel 510 in FIGS. 5 and 6) of the electronic device 101, 200, or 400 has a bar shape, such that the side surface bezel 1110 may be converted into a one-dimensional axis. The first ultrasonic sensor 481 and the second ultrasonic sensor 482 may be disposed at two opposite ends of the sensor area 620 of the side surface bezel 1110 (e.g., the first portion (first side) and the second portion (second side) of the sensor area). For example, the first ultrasonic sensor 481 is disposed on the first portion (e.g., the first portion 621 in FIG. 6) of the sensor area 620. For example, the second ultrasonic sensor 482 is disposed on the second portion (e.g., the second portion 622 in FIG. 6) of the sensor area 620. In this case, the first ultrasonic sensor 481 and the second ultrasonic sensor 482 may operate while generating the ultrasonic wave (e.g., the lamb wave) with a pulse-echo shape.

Figure 12:
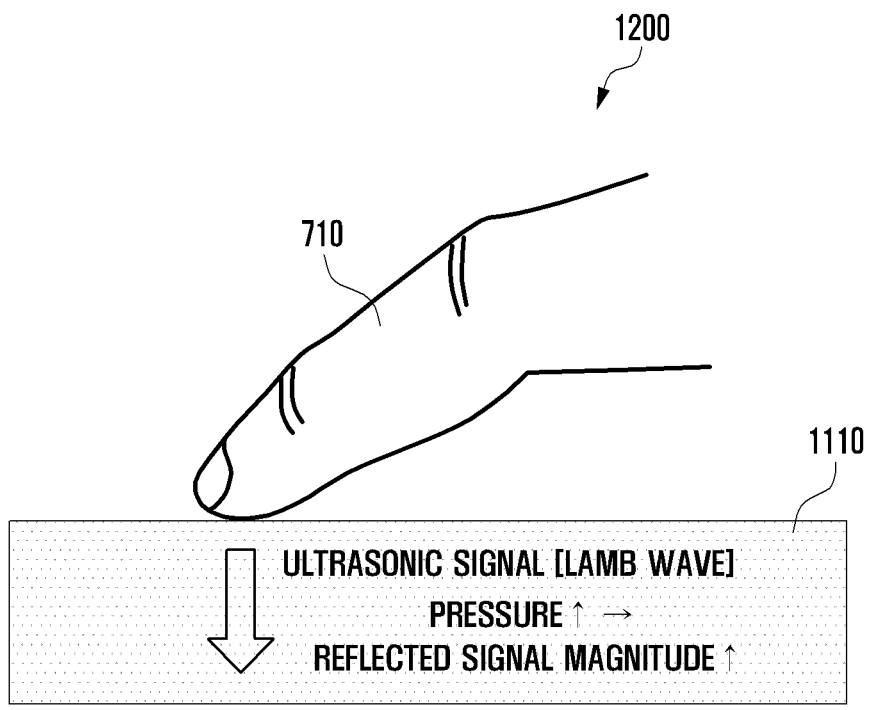
FIGS. 12 and 13 are views illustrating that a normal touch and a strong touch (e.g., a force touch) are distinguished on the basis of reflected signals of ultrasonic signals according to various embodiments of the disclosure.
Figure 13:
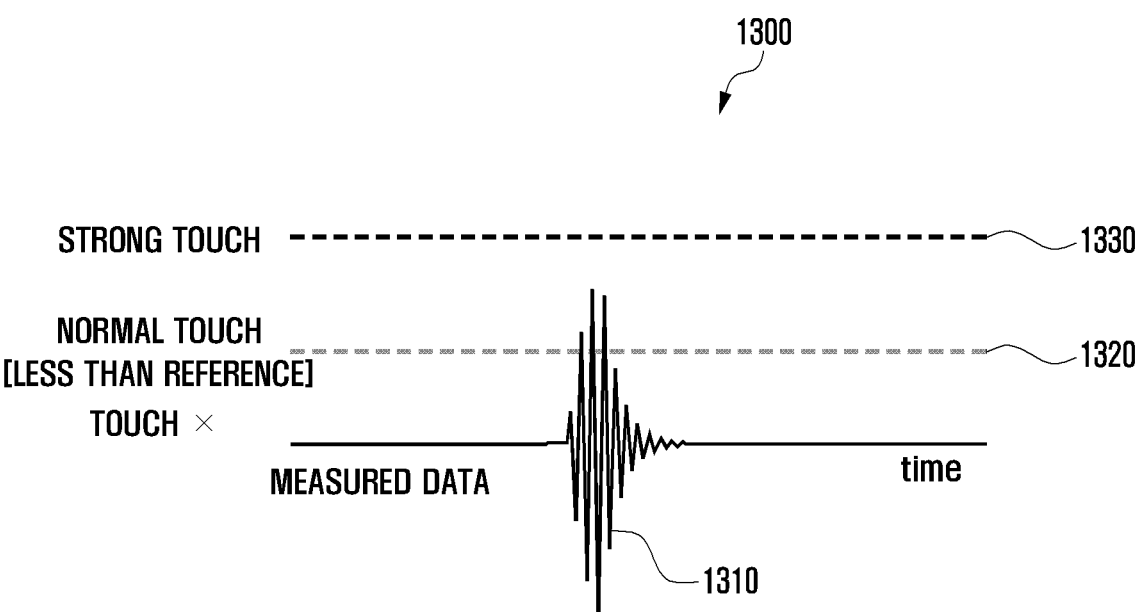

FIGS. 12 and 13 are views illustrating that a normal touch and a strong touch (e.g., a force touch) are distinguished on the basis of reflected signals of ultrasonic signals.

FIG. 12 illustrates (1200) that a signal magnitude (e.g., signal intensity or signal strength) of the reflected wave (e.g., the reflected signal) varies depending on a pushing pressure of the finger 710 according to an embodiment of the disclosure. FIG. 13 illustrates (1300) a normal touch (e.g., a general touch) and a strong touch (e.g., a force touch) are determined on the basis of the signal magnitude (e.g., the signal intensity or the signal strength) of the reflected wave (e.g., the reflected signal) according to an embodiment of the disclosure.

Referring to FIGS. 12 and 13, the signal magnitude (e.g., the signal intensity or the signal strength) of the reflected wave (e.g., the reflected signal) may vary depending on the pushing pressure of the finger 710 (1200). The electronic device (e.g., the electronic device 101 in FIG. 1, the electronic device 200 in FIG. 2, or the electronic device 400 in FIG. 4) according to the embodiment of the disclosure may determine whether a touch on the touch area (e.g., the sensor area 620 in FIGS. 6 and 8) of the side surface bezel 1110 is the normal touch (e.g., the general touch) or the strong touch (e.g., the force touch) on the basis of a measured data value 1310 (e.g., a reflected wave magnitude, signal intensity, or signal strength) of the reflected wave (e.g., the reflected signal) (1300).

For example, when the measured data value 1310 (e.g., the reflected wave magnitude, the signal intensity, or the signal strength) of the reflected wave (e.g., the reflected signal) reaches a normal touch reference value 1320 (e.g., is equal to or larger than the normal touch reference value 1320) and is smaller than a strong touch reference value 1330, the electronic device 101, 200, or 400 determines that the touch on the touch area (e.g., the sensor area 620 in FIGS. 6 and 8) of the side surface bezel 1110 is the normal touch (e.g., the general touch).

For example, when the measured data value 1310 (e.g., the reflected wave magnitude, the signal intensity, or the signal strength) of the reflected wave (e.g., the reflected signal) exceeds the normal touch reference value 1320 and reaches the strong touch reference value 1330 (e.g., is equal to or larger than the strong touch reference value 1330), the electronic device 101, 200, or 400 determines that the touch on the touch area (e.g., the sensor area 620 in FIGS. 6 and 8) of the side surface bezel 1110 is the strong touch (e.g., the force touch).

According to the embodiment, the electronic device 101, 200, or 400 of the disclosure may provide a buttonless touch key (the side key, the soft key, or the buttonless key) and prevent an abnormal touch caused by inadvertent contact of the user.

For example, when the measured data value 1310 (e.g., the reflected wave magnitude, the signal intensity, or the signal strength) of the reflected wave (e.g., the reflected signal) cannot reach the normal touch reference value 1320 (e.g., the measured data value 1310 is smaller than the normal touch reference value 1320), the electronic device 101, 200, or 400 of the disclosure determines that the touch is an abnormal touch caused by inadvertent contact of the user.

When the measured data value 1310 (e.g., the reflected wave magnitude, the signal intensity, or the signal strength) of the reflected wave (e.g., the reflected signal) cannot reach the normal touch reference value 1320 (e.g., the measured data value 1310 is smaller than the normal touch reference value 1320), the electronic device 101, 200, or 400 of the disclosure may determine that no touch is made on the touch area (e.g., the sensor area 620 in FIGS. 6 and 8) of the side surface bezel 1110.

Because the lamb wave, among the ultrasonic waves, has low attenuation properties, the lamb wave may be advantageous in determining the presence or absence of a touch even when traveling long distances.

The electronic device 101, 200, or 400 may acquire background signals (e.g., reference signals or background signal) of the first ultrasonic sensor 481 and the second ultrasonic sensor 482 at the time of registering (e.g., customizing) the touch key (the side key, the soft key, or the buttonless key).

It is possible to determine the presence or absence of a touch, the normal touch (e.g., the general touch), and the strong touch (e.g., the force touch) by applying the background signal (e.g., the reference signal or the background signal) of each of the first ultrasonic sensor 481 and the second ultrasonic sensor 482.

Figure 14:
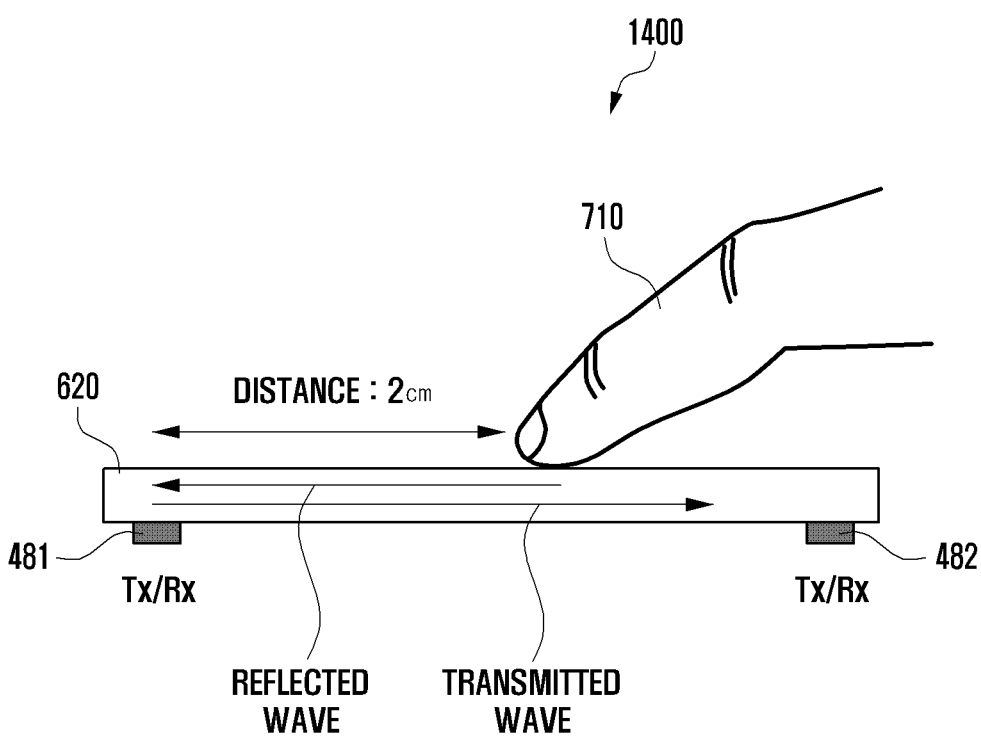

FIGS. 14 and 15 are views illustrating that a position at which the user's finger touches the side surface bezel is determined on the basis of the time at which a reflected wave (e.g., a reflected signal) is received by (e.g., arrives at) the ultrasonic sensor according to various embodiments of the disclosure.

With reference to FIGS. 14 and 15, the finger 710 may touch the aluminum plate, which has a thickness of about 1 mm, at a distance (e.g., a position) spaced apart from the first ultrasonic sensor 481 or the second ultrasonic sensor 482 by about 2 cm (1400). In this case, the electronic device (e.g., the electronic device 101 in FIG. 1, the electronic device 200 in FIG. 2, or the electronic device 400 in FIG. 4) may determine the presence or absence of a touch and a touch position on the basis of the time at which a reflected wave 1510 (e.g., a reflected signal) of the ultrasonic wave (e.g., the lamb wave) with a center frequency of about 1.4 MHz is received by (e.g., arrives at) the first ultrasonic sensor 481 or the second ultrasonic sensor 482 (1500). For example, a stainless steel plate or a titanium plate is applied instead of the aluminum plate. The titanium plate may have a smaller thickness than the aluminum plate when the strength remains the same. When the titanium plate is applied, ultrasonic properties (e.g., velocity) may be improved in comparison with the case in which the aluminum plate is applied.

According to the embodiment, because a distance between the second ultrasonic sensor 482 and the finger 710 is about 2 cm, a total movement distance of the ultrasonic wave (e.g., the lamb wave) may be about 4 cm. In this case, when the ultrasonic wave (e.g., the lamb wave) moves at a velocity of about 2,500 m/s in the sensor area 620 (e.g., the sensor area 620 in FIGS. 6 and 8) of the side surface bezel (e.g., the side surface bezel 510 in FIGS. 6 and 9), the arrival time (e.g., the receiving time) of the reflected wave (e.g., the reflected signal) received by the second ultrasonic sensor 482 may be about 16 us. The arrival time (e.g., the receiving time) of the reflected wave (e.g., the reflected signal) received by the second ultrasonic sensor 482 may vary depending on the distance.

Figure 16:
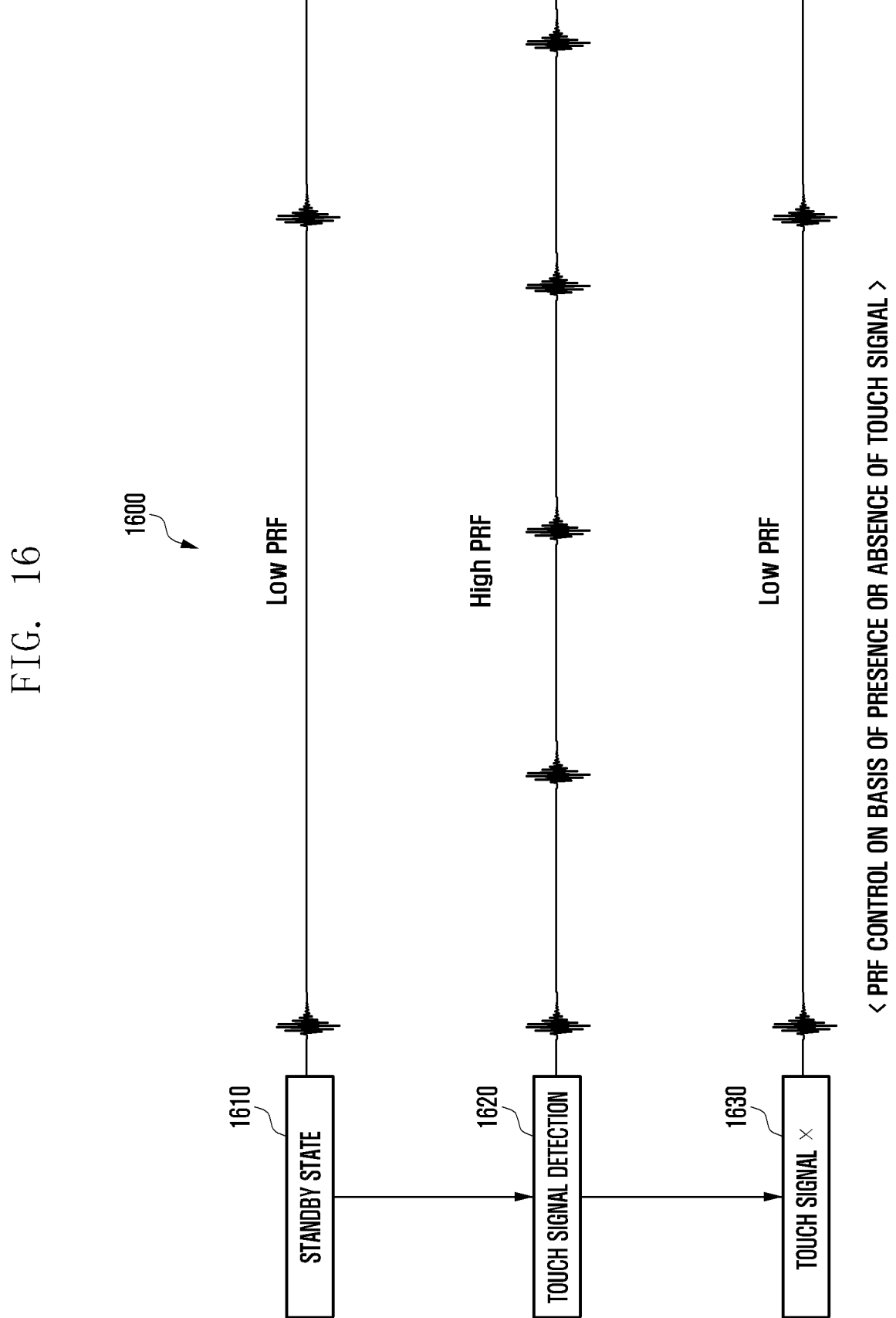
FIG. 16 is a view illustrating that a pulse repetition frequency (PRF) is controlled on the basis of a presence or absence of a touch according to an embodiment of the disclosure.

FIG. 16 is a view 1600 illustrating that a pulse repetition frequency (PRF) is controlled on the basis of the presence or absence of a touch according to an embodiment of the disclosure.

Referring to FIGS. 14, 15, and 16, the arrival time (e.g., the receiving time) at which the reflected wave (e.g., the reflected signal) arrives at the first ultrasonic sensor 481 or the second ultrasonic sensor 482 may vary depending on the movement distance of the signal, such that the presence or absence of a touch may be determined.

According to the embodiment, the electronic device (e.g., the electronic device 101 in FIG. 1, the electronic device 200 in FIG. 2, or the electronic device 400 in FIG. 4) may determine a position at which the finger (e.g., the finger 710 in FIG. 14) touches the sensor area (e.g., the sensor area 620 in FIGS. 6 and 8) of the side surface bezel (e.g., the side surface bezel 510 in FIGS. 6 and 9).

For example, the first ultrasonic sensor 481 receives the first reflected wave (e.g., the first reflected signal). The electronic device 101, 200, or 400 may subtract a first background signal (e.g., a first reference signal or a first background signal) of the first ultrasonic sensor 481 from the first reflected wave (e.g., the first reflected signal) received by the first ultrasonic sensor 481. The second ultrasonic sensor 482 may receive the second reflected wave (e.g., the second reflected signal). The electronic device 101, 200, or 400 may subtract a second background signal (e.g., a second reference signal or a second background signal) of the second ultrasonic sensor 482 from the second reflected wave (e.g., the second reflected signal) received by the second ultrasonic sensor 482.

The electronic device 101, 200, or 400 may acquire first signal data by subtracting the first background signal (e.g., the first reference signal or the first background signal) from the first reflected wave (e.g., the first reflected signal). The electronic device 101, 200, or 400 may acquire second signal data by subtracting the second background signal (e.g., the second reference signal or the second background signal) from the second reflected wave (e.g., the second reflected signal). The electronic device 101, 200, or 400 may determine the position at which the finger 710 touches the sensor area 620 of the side surface bezel 510 on the basis of the first signal data and the second signal data.

For example, the position at which the finger (e.g., the finger 710 in FIG. 14) touches the sensor area 620 of the side surface bezel 510 is determined on the basis of the receiving time (e.g., the arrival time) of the first reflected wave (e.g., the first reflected signal) received by the first ultrasonic sensor 481 and the receiving time (e.g., the arrival time) of the second reflected wave (e.g., the second reflected signal) received by the second ultrasonic sensor 482.

According to the embodiment, the electronic device (e.g., the electronic device 101 in FIG. 1, the electronic device 200 in FIG. 2, or the electronic device 400 in FIG. 4) according to the embodiment of the disclosure may control an operation of the first ultrasonic sensor 481 and an operation of the second ultrasonic sensor 482 on the basis of the presence or absence of a touch.

According to the embodiment, the electronic device 101, 200, or 400 may control the first ultrasonic sensor 481 and the second ultrasonic sensor 482 in the pulse repetition frequency (PRF) manner on the basis of the presence or absence of a touch.

The high pulse repetition frequency (PRF) may mean that a time axis interval between pulses is relatively short (e.g., a narrow or short interval). The low pulse repetition frequency (PRF) may mean that a time axis interval between pulses is relatively long (e.g., a large or long interval). As the pulse repetition frequency (PRF) increases, the signal is transmitted and received more frequently, such that precise touch sensing may be implemented. In contrast, as the pulse repetition frequency (PRF) increases, the amount of use of the memory and the power consumption increase. Therefore, it is necessary to adjust the pulse repetition frequency (PRF) depending on the presence or absence of a touch. For example, when the PRF is high, the reaction is made at a higher velocity, and a situation determination precision related to a touch may increase. The sensing based on a time difference between ultrasonic wave transmitting (Tx) and ultrasonic wave receiving (Rx) may be subjected to a small time error, but the error may be relatively reduced by averaging data by means of more sampling for the same period of time.

For example, in a standby state 1610, the electronic device 101, 200, or 400 controls the first ultrasonic sensor 481 and the second ultrasonic sensor 482 to operate at first pulse repetition frequency (e.g., low PRF or low-frequency pulse repetition frequency).

For example, in case that the touch signal is detected (1620), the electronic device 101, 200, or 400 controls the first ultrasonic sensor 481 and the second ultrasonic sensor 482 to operate at second pulse repetition frequency (e.g., high PRF or high-frequency pulse repetition frequency).

For example, the electronic device 101, 200, or 400 determines that no touch signal is when the touch signal is not detected for a predetermined time after the touch signal is detected (1630). In case that no touch signal is present, the electronic device 101, 200, or 400 may control the first ultrasonic sensor 481 and the second ultrasonic sensor 482 to operate at the first pulse repetition frequency (e.g., the low PRF or the low-frequency pulse repetition frequency).

According to the embodiment, a fine touch may be detected when the electronic device 101, 200, or 400 positioned in a pocket. In this case, there may occur an error in which a touch, which is unintentionally made by the user, is recognized as a touch. It is possible to perform an operation of preventing an erroneous touch that may occur when the electronic device 101, 200, or 400 is positioned in the pocket. For example, in case that a magnitude of a signal transmitted at the first pulse repetition frequency (e.g., the low PRF or the low-frequency pulse repetition frequency) and then received is small or does not reach a reference value, the ultrasonic sensor is controlled to operate at the second pulse repetition frequency (e.g., the high PRF or the high-frequency pulse repetition frequency). In this case, the reference value for determining the touch signal in the standby state 1610 and a reference value for determining the touch signal in a touch signal detection state 1620 may be differently applied. The reference value may be applied relatively loosely in the standby state 1610, and the reference value may be applied relatively precisely in the touch signal detection state 1620. For example, when the touch signal is recognized while the signal is transmitted and received once every about 33 ms (about 30 Hz) in the standby state 1610, the electronic device 101, 200, or 400 transmits and receive the signal once every about 8.3 ms (about 120 Hz). Thereafter, when the touch signal is not detected for a predetermined time, the signal may be transmitted and received once every about 33 ms again, and the operation is performed in the standby state 1610.

According to the embodiment, the electronic device 101, 200, or 400 may calculate the total time for which the touch signal is detected. The electronic device 101, 200, or 400 may determine whether a current touch is the short touch or the long touch on the basis of the total time for which the touch signal is detected.

For example, the electronic device 101, 200, or 400 configures a reference time and perform a designated operation (operation of executing or ending an application) in case that the time for which the touch signal is measured exceeds the reference time.

For example, because the electronic device 101, 200, or 400 determines the normal touch (e.g., the general touch) and the strong touch (e.g., the force touch), the electronic device 101, 200, or 400 performs the designated operation (the operation of executing or ending the application) on the basis of whether the currently recognized touch is the normal touch (e.g., the general touch) or the strong touch (e.g., the force touch).

For example, the electronic device 101, 200, or 400 distinguishes between the short touch made by the normal touch (e.g., the general touch) and the short touch made by the strong touch (e.g., the force touch). The electronic device 101, 200, or 400 may perform the designated operation (the operation of executing or ending the application) in accordance with the short touch made by the normal touch (e.g., the general touch) and the short touch made by the strong touch (e.g., the force touch).

For example, the electronic device 101, 200, or 400 distinguishes between the long touch made by the normal touch (e.g., the general touch) and the long touch made by the strong touch (e.g., the force touch). The electronic device 101, 200, or 400 may perform the designated operation (the operation of executing or ending the application) in accordance with the long touch made by the normal touch (e.g., the general touch) and the long touch made by the strong touch (e.g., the force touch).

Figure 17:
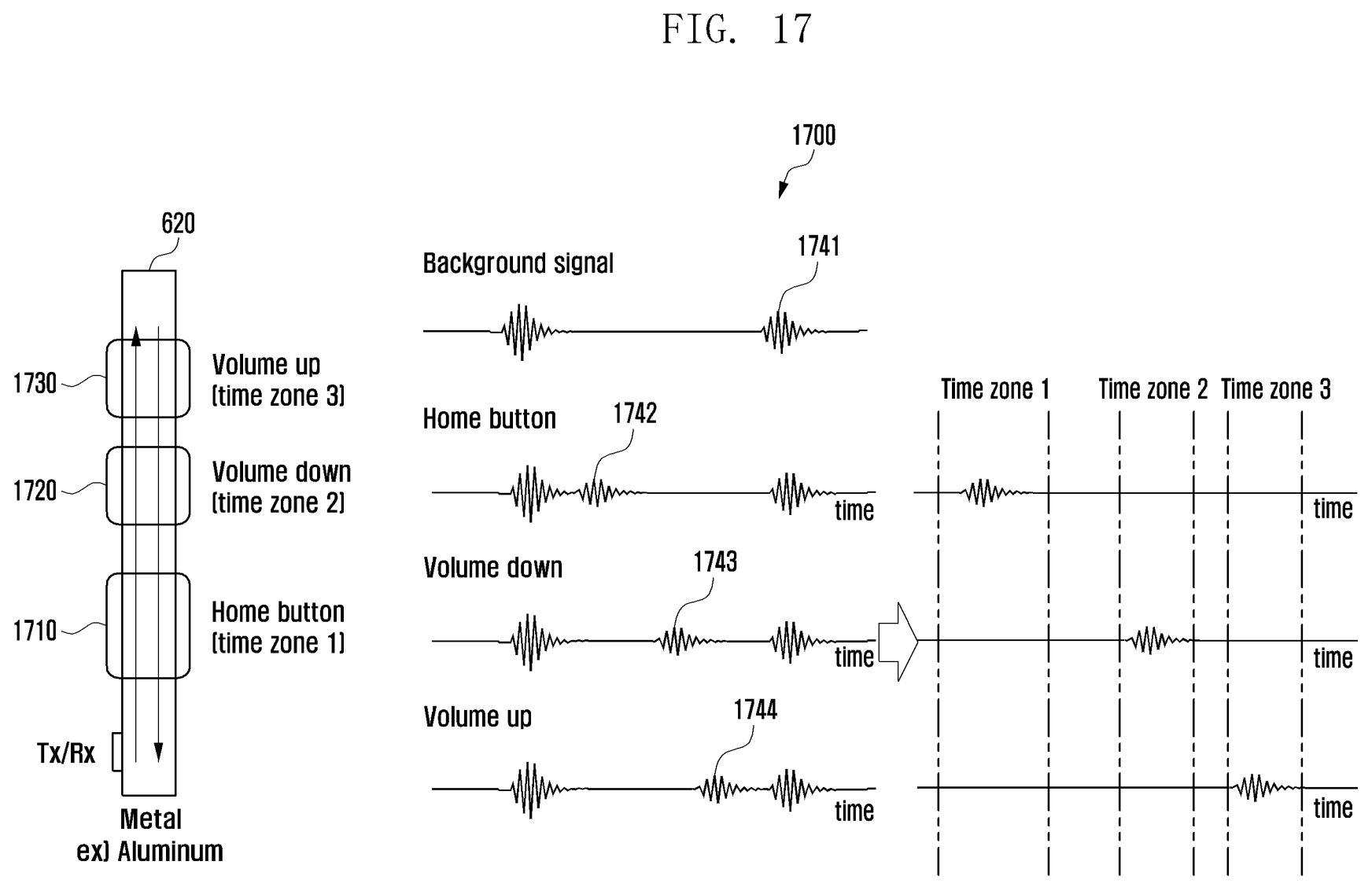

FIG. 17 is a view 1700 illustrating that the sensor area of the side surface bezel is divided and a plurality of touch keys (e.g., side keys, soft keys, or buttonless keys) is registered (e.g., customized) according to an embodiment of the disclosure.

Referring to FIG. 17, the electronic device (e.g., the electronic device 101 in FIG. 1, the electronic device 200 in FIG. 2, or the electronic device 400 in FIG. 4) according to the embodiment of the disclosure may divide the sensor area 620 (e.g., the sensor area 620 in FIGS. 6 and 8) of the side surface bezel (e.g., the side surface bezel 510 in FIGS. 6 and 9) into a plurality of areas and register (e.g., customize) the plurality of touch keys (e.g., the side keys, the soft keys, or the buttonless keys).

According to the embodiment, the electronic device 101, 200, or 400 may divide the sensor area 620 into the plurality of areas on the basis of a request to register (e.g., customize) the user's touch key (e.g., the side key, the soft key, or the buttonless key).

For example, the electronic device 101, 200, or 400 divides the sensor area 620 into a first sensor area, a second sensor area, and a third sensor area.

For example, the electronic device 101, 200, or 400 registers (e.g., customize) a first touch key 1710 (e.g., a first side key, a first soft key, or a first buttonless key) so that the first sensor area may be used as the first touch key 1710 (e.g., the first side key, the first soft key, or the first buttonless key). For example, when the user's finger touches the first touch key 1710 (e.g., the first side key, the first soft key, or the first buttonless key), a first touch signal 1742. The electronic device 101, 200, or 400 may determine the presence or absence of a touch by subtracting a background signal 1741 (e.g., the reference signal or the background signal) from the first touch signal 1742. The electronic device 101, 200, or 400 may configure a first time zone corresponding to the first touch key 1710 (e.g., the first side key, the first soft key, or the first buttonless key). When the first touch signal 1742 made by processing the background signal 1741 (e.g., the reference signal or the background signal) corresponds to the first time zone, the electronic device 101, 200, or 400 may determine that a touch is made on the first touch key 1710 (e.g., the first side key, the first soft key, or the first buttonless key). In case that a touch is made on the first touch key 1710 (e.g., the first side key, the first soft key, or the first buttonless key), the electronic device 101, 200, or 400 may perform the designated operation (e.g., the home button or the operation of executing or ending the application) based on the first touch key 1710.

For example, the electronic device 101, 200, or 400 registers (e.g., customize) a second touch key 1720 (e.g., a second side key, a second soft key, or a second buttonless key) so that the second sensor area may be used as the second touch key 1720 (e.g., the second side key, the second soft key, or the second buttonless key). For example, when the user's finger touches the second touch key 1720 (e.g., the second side key, the second soft key, or the second buttonless key), a second touch signal 1743 is generated. The electronic device 101, 200, or 400 may determine the presence or absence of a touch by subtracting the background signal 1741 (e.g., the reference signal or the background signal) from the second touch signal 1743. The electronic device 101, 200, or 400 may configure a second time zone corresponding to the second touch key 1720 (e.g., the second side key, the second soft key, or the second buttonless key). When the second touch signal 1743 made by processing the background signal 1741 (e.g., the reference signal or the background signal) corresponds to the second time zone, the electronic device 101, 200, or 400 may determine that a touch is made on the second touch key 1720 (e.g., the second side key, the second soft key, or the second buttonless key). In case that a touch is made on the second touch key 1720 (e.g., the second side key, the second soft key, or the second buttonless key), the electronic device 101, 200, or 400 may perform the designated operation (e.g., the volume-down or the operation of executing or ending the application) based on the second touch key 1720.

For example, the electronic device 101, 200, or 400 registers (e.g., customize) a third touch key 1730 (e.g., a third side key, a third soft key, or a third buttonless key) so that the third sensor area may be used as the third touch key 1730 (e.g., the third side key, the third soft key, or the third buttonless key). For example, when the user's finger touches the third touch key 1730 (e.g., the third side key, the third soft key, or the third buttonless key), a third touch signal 1744 is generated. The electronic device 101, 200, or 400 may determine the presence or absence of a touch by subtracting the background signal 1741 (e.g., the reference signal or the background signal) from the third touch signal 1744. The electronic device 101, 200, or 400 may configure a third time zone corresponding to the third touch key 1730 (e.g., the third side key, the third soft key, or the third buttonless key). When the third touch signal 1744 made by processing the background signal 1741 (e.g., the reference signal or the background signal) corresponds to the third time zone, the electronic device 101, 200, or 400 may determine that a touch is made on the third touch key 1730 (e.g., the third side key, the third soft key, or the third buttonless key). In case that a touch is made on the third touch key 1730 (e.g., the third side key, the third soft key, or the third buttonless key), the electronic device 101, 200, or 400 may perform the designated operation (e.g., the volume-up or the operation of executing or ending the application) based on the third touch key 1730.

Figure 18:
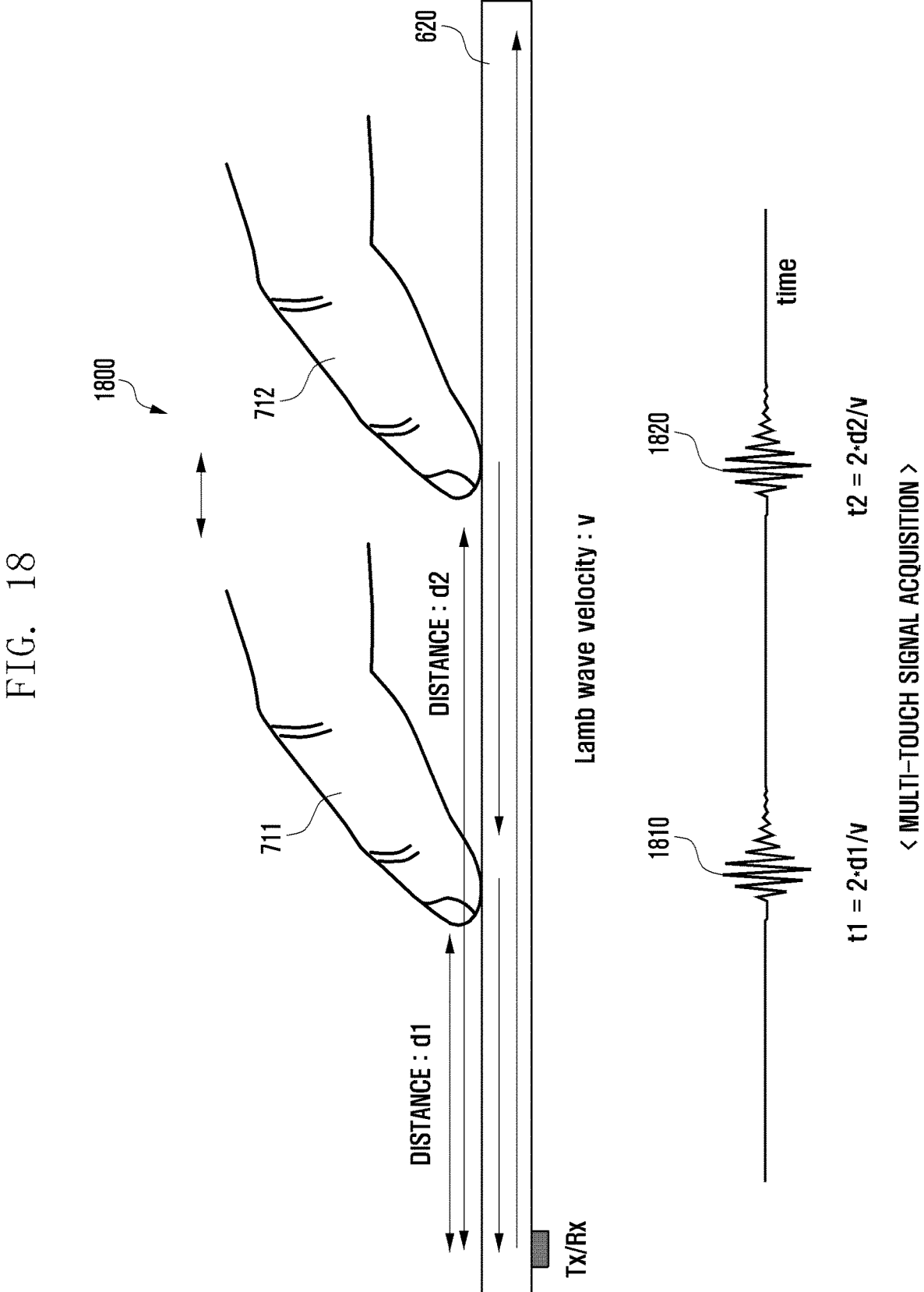
FIG. 18 is a view illustrating that a signal (e.g., a multi-touch signal) is acquired in response to a multi-touch according to an embodiment of the disclosure.

FIG. 18 is a view 1800 illustrating that a signal (e.g., a multi-touch signal) is acquired in response to a multi-touch according to an embodiment of the disclosure.

Referring to FIG. 18, the electronic device (e.g., the electronic device 101 in FIG. 1, the electronic device 200 in FIG. 2, or the electronic device 400 in FIG. 4) according to the embodiment of the disclosure may determine a single touch and a multi-touch of fingers 711 and 712 on the sensor area 620 (e.g., the sensor area 620 in FIGS. 6 and 8) of the side surface bezel (e.g., the side surface bezel 510 in FIGS. 6 and 9).

Figure 19:
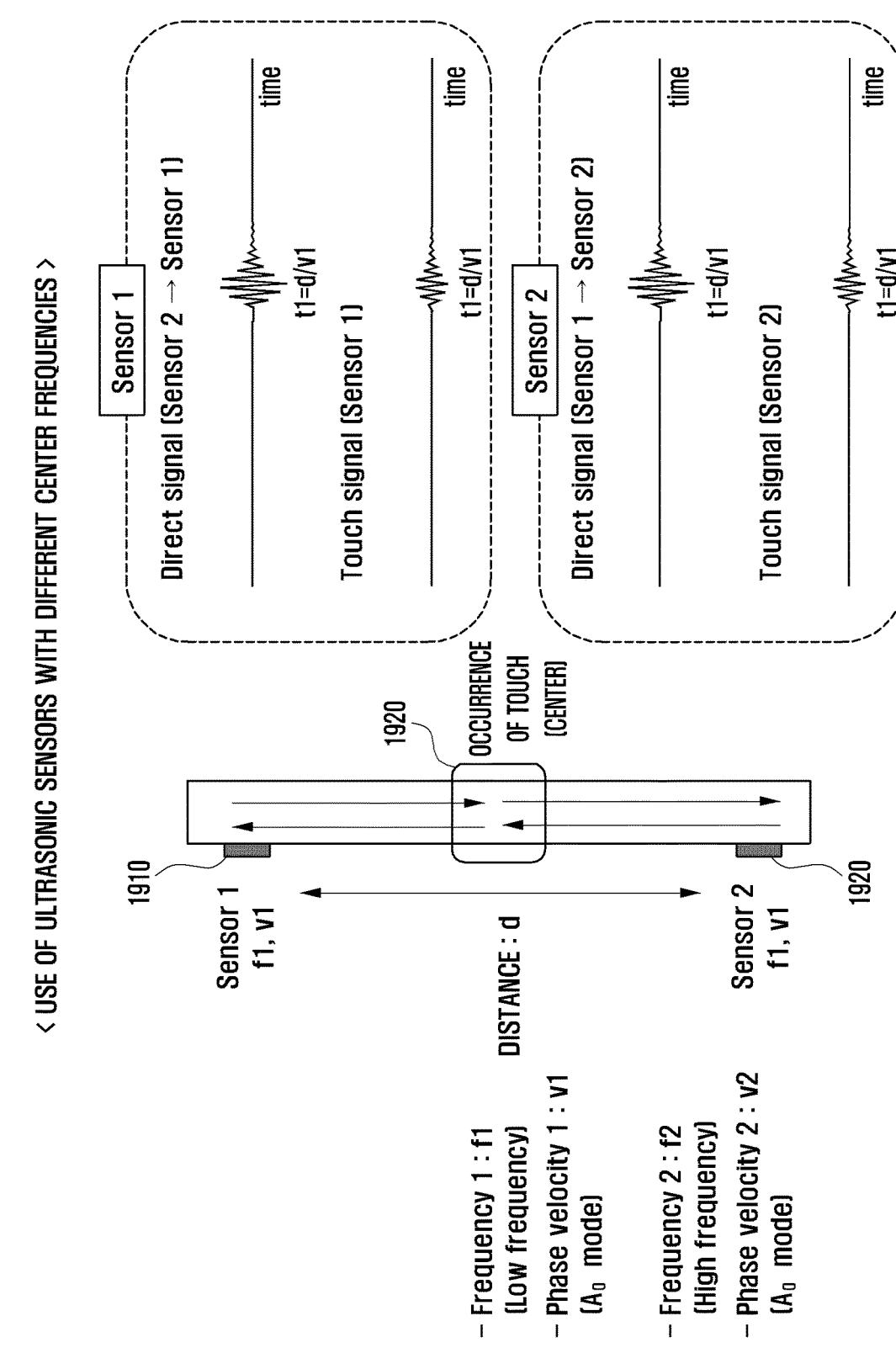
FIG. 19 is a view illustrating that interference occurs between signals when frequencies (e.g., center frequencies) of a plurality of ultrasonic sensors are equal to one another according to an embodiment of the disclosure.

According to the embodiment, the electronic device 101, 200, or 400 may determine the single touch and the multi-touch of the fingers 711 and 712 on the basis of the first reflected wave (e.g., the first reflected signal) received by the first ultrasonic sensor (e.g., the first ultrasonic sensor 481 in FIG. 14 or a first ultrasonic sensor 1910 in FIG. 19) and the second reflected wave (e.g., the second reflected signal) received by the second ultrasonic sensor (e.g., the second ultrasonic sensor 482 in FIG. 14 or a second ultrasonic sensor 1920 in FIG. 19).

For example, when the first ultrasonic sensor 481 or 1910 receives one first reflected wave (e.g., the first reflected signal) and the second ultrasonic sensor 482 or 1920 receives one second reflected wave (e.g., the second reflected signal), the electronic device 101, 200, or 400 determines that a touch is the single touch. The electronic device 101, 200, or 400 may determine a position of the single touch on the basis of the receiving time (e.g., the arrival time) of one first reflected wave (e.g., the first reflected signal) and the receiving time (e.g., the arrival time) of one second reflected wave (e.g., the second reflected signal).

For example, when the first ultrasonic sensor 481 or 1910 receives a plurality of first reflected waves (e.g., the first reflected signals) and the second ultrasonic sensor 482 or 1920 receives a plurality of second reflected waves (e.g., the second reflected signals), the electronic device 101, 200, or 400 determines that a touch is the multi-touch. The receiving times (e.g., the arrival times) of reflected signals 1810 and 1820 may vary depending on a distance d1 of a first position touched by the first finger 711 and a distance d2 of a second position touched by the second finger 712. The electronic device 101, 200, or 400 may determine the positions of the multi-touch on the basis of the receiving time (e.g., the arrival time) of each of the plurality of first reflected waves (e.g., the first reflected signals) and the receiving time (e.g., the arrival time) of each of the plurality of second reflected waves (e.g., the second reflected signals).

According to the embodiment, the electronic device 101, 200, or 400 may determine whether the fingers 711 and 712 move toward or away from each other on the basis of the positions of the fingers (e.g., the fingers 711 and 712 in FIG. 18) based on the multi-touch. The electronic device 101, 200, or 400 may recognize swipes of the fingers and pinch motions of the fingers on the basis of the situation in which the fingers 711 and 712 move toward or away from each other, and the electronic device 101, 200, or 400 may perform the corresponding operation.

FIG. 19 is a view illustrating that interference occurs between signals when frequencies (e.g., center frequencies) of the plurality of ultrasonic sensors are equal to one another according to an embodiment of the disclosure.

Referring to FIG. 19, in case that the first ultrasonic wave (e.g., the first lamb wave) generated by the first ultrasonic sensor 1910 (e.g., the first ultrasonic sensor 481 in FIG. 14) and the second ultrasonic wave (e.g., the second lamb wave) generated by the second ultrasonic sensor 1920 (e.g., the second ultrasonic sensor 482 in FIG. 14) are substantially identical in frequency (e.g., center frequency), interference may occur between the signals. For example, when the finger touches a center of the sensor area (e.g., the sensor area 620 in FIG. 18) in case that the frequency (e.g., the center frequency) of the first ultrasonic wave (e.g., the first lamb wave) and the frequency of the second ultrasonic sensor 482 are substantially identical to each other, the receiving time (e.g., the arrival time) of the first reflected wave and the receiving time (e.g., the arrival time) of the second reflected wave may be substantially identical to each other. Because both a reverberant signal of the first reflected wave and a reverberant signal of the second reflected wave are substantially identical to each other, noise may affect the first reflected wave and the second reflected wave. When the receiving time (e.g., the arrival time) of the first reflected wave and the receiving time (e.g., the arrival time) of the second reflected wave are substantially identical to each other, the presence or absence of a touch and the touch position may not be determined.

Figure 20:
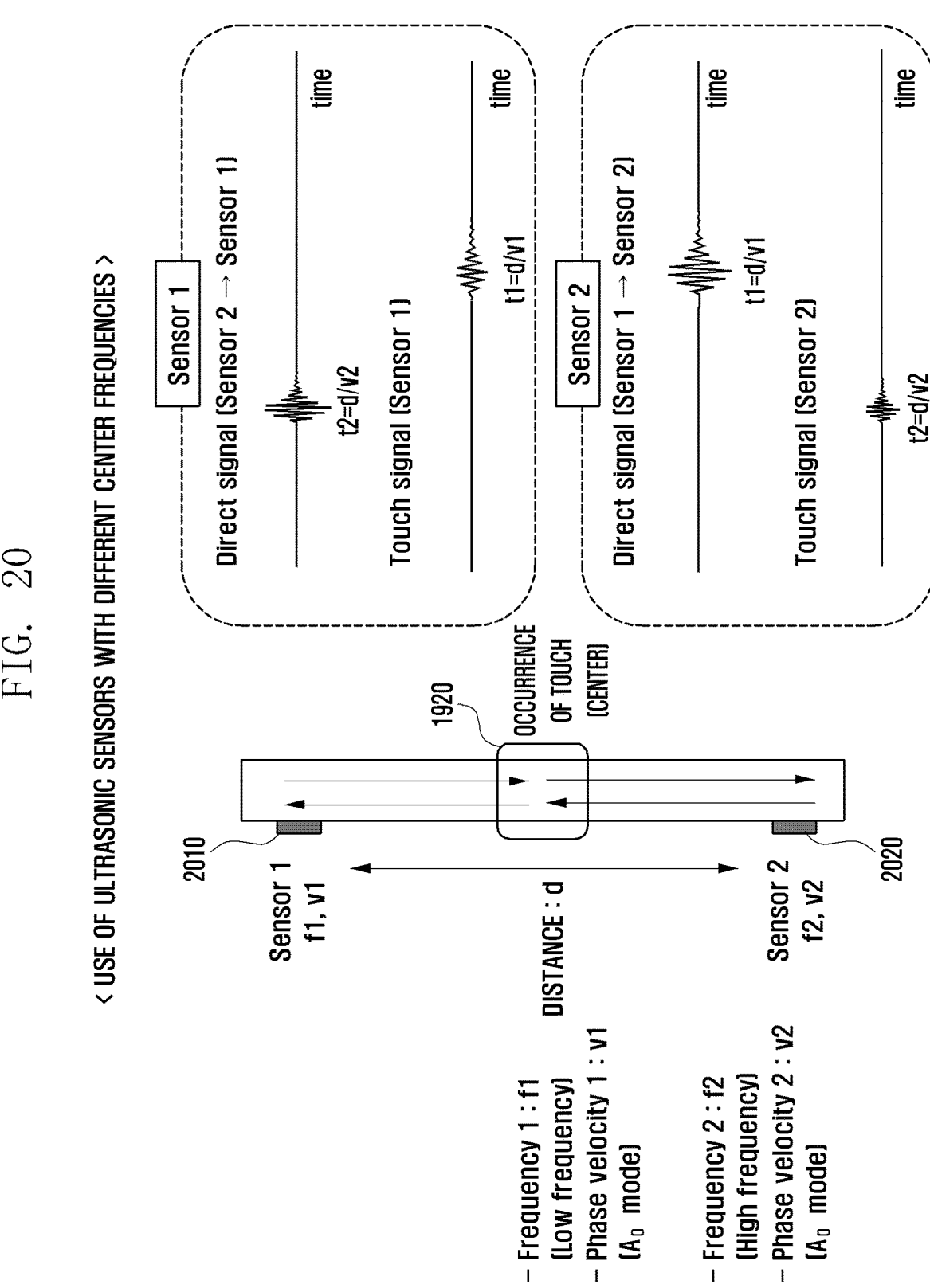
FIG. 20 is a view illustrating that interference between signals is prevented (e.g., interference is substantially prevented or interference is reduced) when frequencies (e.g., center frequencies) of the plurality of ultrasonic sensors are different from one another according to an embodiment of the disclosure.

FIG. 20 is a view illustrating that interference between the signals is prevented (e.g., interference is substantially prevented or interference is reduced) when frequencies (e.g., center frequencies) of the plurality of ultrasonic sensors are different from one another according to an embodiment of the disclosure.

Referring to FIG. 20, a first ultrasonic sensor 2010 (e.g., the first ultrasonic sensor 481 in FIG. 14) may generate the first ultrasonic wave (e.g., the first lamb wave) with the first frequency (e.g., the first center frequency or the low frequency). A second ultrasonic sensor 2020 (e.g., the second ultrasonic sensor 482 in FIG. 14) may generate the second ultrasonic wave (e.g., the second lamb wave) with the second frequency (e.g., the second center frequency or the high frequency) higher than the first frequency (e.g., the first center frequency or the low frequency). For example, the first ultrasonic sensor 481 generates the first ultrasonic wave (e.g., the first lamb wave) with the first frequency (e.g., the first center frequency or the low frequency), and the second ultrasonic sensor 482 generates the second ultrasonic wave (e.g., the second lamb wave) with the second frequency (e.g., the second center frequency or the high frequency), such that the interference therebetween is eliminated (e.g., substantially eliminated or the interference therebetween may be reduced). For example, when the finger touches the center of the sensor area (e.g., the sensor area 620 in FIG. 18) in case that the frequency (e.g., the center frequency) of the first ultrasonic wave (e.g., the first lamb wave) and the frequency of the second ultrasonic sensor 482 are substantially different from each other, the receiving time (e.g., the arrival time) of the first reflected wave and the receiving time (e.g., the arrival time) of the second reflected wave may be substantially different from each other. In addition, the effect of noise of the first reflected wave and the effect of noise of the second reflected wave are reduced. Because the receiving time (e.g., the arrival time) of the first reflected wave and the receiving time (e.g., the arrival time) of the second reflected wave are different from each other, the presence or absence of a touch and the touch position may be determined by using the difference.

FIG. 21 is a view 2100 illustrating a method of acquiring background signals (e.g., background signals) of the plurality of ultrasonic sensors according to an embodiment of the disclosure.

In the embodiment to be described below, the respective operations may be sequentially performed. However, the operations need not be necessarily performed sequentially. For example, the order of the respective operations is changed, and at least two operations are performed in parallel.

Referring to FIG. 21, the electronic device (e.g., the electronic device 101 in FIG. 1, the electronic device 200 in FIG. 2, or the electronic device 400 in FIG. 4) according to the embodiment of the disclosure may acquire the background signals (e.g., the background signal) of the plurality of ultrasonic sensors.

For example, the processor (e.g., the processor 120 in FIG. 1 or the processor 420 in FIG. 4) of the electronic device 101, 200, or 400 acquires the background signals (e.g., the background signals) of the plurality of ultrasonic sensors by operating the plurality of ultrasonic sensors (e.g., the sensor component 480 in FIGS. 6 and 8 (e.g., the plurality of ultrasonic sensors)) (e.g., the first ultrasonic sensor 2010 and the second ultrasonic sensor 2020 in FIG. 20).

For example, the operation of acquiring the background signals (e.g., the background signals) of the plurality of ultrasonic sensors are performed in a state in which the finger does not touch the sensor area (e.g., the sensor area 620 in FIGS. 6 and 8) of the side surface bezel (e.g., the side surface bezel 510 in FIGS. 6 and 9).

At operation 2110, according to the embodiment, the electronic device 101, 200, or 400 may operate the plurality of ultrasonic sensors (e.g., the first ultrasonic sensor 2010 and the second ultrasonic sensor 2020) in the state in which the finger does not touch the sensor area (e.g., the sensor area 620 in FIGS. 6 and 8) of the side surface bezel (e.g., the side surface bezel 510 in FIGS. 6 and 9).

For example, the processor 120 or 420 operates the plurality of ultrasonic sensors (e.g., the first ultrasonic sensor 2010 and the second ultrasonic sensor 2020) in the state in which the finger does not touch the sensor area (e.g., the sensor area 620 in FIGS. 6 and 8) of the side surface bezel (e.g., the side surface bezel 510 in FIGS. 6 and 9).

According to the embodiment, at operation 2120, the electronic device 101, 200, or 400 may operate the first ultrasonic sensor among the plurality of ultrasonic sensors. For example, the electronic device 101, 200, or 400 allows the first ultrasonic sensor, among the plurality of ultrasonic sensors, to generate the ultrasonic wave and then allow the first ultrasonic sensor to measure the first reflected wave (e.g., the reflected signal).

For example, the processor 120 or 420 operates the first ultrasonic sensor among the plurality of ultrasonic sensors. For example, the processor 120 or 420 allows the first ultrasonic sensor, among the plurality of ultrasonic sensors, to generate the ultrasonic wave and then allow the first ultrasonic sensor to measure the first reflected wave (e.g., the reflected signal).

According to the embodiment, at operation 2130, the electronic device 101, 200, or 400 may operate an N-th ultrasonic sensor among the plurality of ultrasonic sensors. For example, the electronic device 101, 200, or 400 allows the N-th ultrasonic sensor, among the plurality of ultrasonic sensors, to generate the ultrasonic wave and then allow the N-th ultrasonic sensor to measure an N-th reflected wave (e.g., the reflected signal).

For example, the processor 120 or 420 operates the N-th ultrasonic sensor among the plurality of ultrasonic sensors. For example, the processor 120 or 420 allows the N-th ultrasonic sensor, among the plurality of ultrasonic sensors, to generate the ultrasonic wave and then allow the N-th ultrasonic sensor to measure the N-th reflected wave (e.g., the reflected signal).

For example, operations 2120 and 2130 are performed simultaneously (or sequentially).

For example, between operations 2120 and 2130, the operations of the second to (N−1)th ultrasonic sensors are performed simultaneously (or sequentially).

According to the embodiment, the first ultrasonic sensor (e.g., the first ultrasonic sensor 481 in FIG. 5) may receive the first reflected wave based on the first lamb wave with the first frequency. The first ultrasonic sensor 481 may receive the second transmitted wave based on the second lamb wave with the second frequency. The second ultrasonic sensor (e.g., the second ultrasonic sensor 482 in FIG. 5) may receive the second reflected wave based on the second lamb wave with the second frequency. The second ultrasonic sensor 482 may receive the first transmitted wave based on the first lamb wave with the first frequency.

For example, when the second ultrasonic sensor 482 outputs the second lamb wave, the time (e.g., the arrival time of the signal or the receiving time of the signal) at which the first ultrasonic sensor 481 receives the second transmitted wave based on the second lamb wave is identified. It is possible to sense a position touched by the finger by using the first reflected wave and the second transmitted wave received by the first ultrasonic sensor 481. For example, when the first ultrasonic sensor 481 outputs the first lamb wave, the time (e.g., the arrival time of the signal or the receiving time of the signal) at which the second ultrasonic sensor 482 receives the first transmitted wave based on the first lamb wave may be identified. It is possible to sense a position touched by the finger by using the second reflected wave and the first transmitted wave received by the second ultrasonic sensor 482. For example, it is possible to sense the position touched by the finger by using the first reflected wave and the second transmitted wave received by the first ultrasonic sensor 481 and the second reflected wave and the first transmitted wave received by the second ultrasonic sensor 482. The sensing precision may increase as the signals received by the first ultrasonic sensor 481 and the signals received by the second ultrasonic sensor 482 increase.

According to the embodiment, at operation 2140, the electronic device 101, 200, or 400 may acquire the background signals (e.g., the background signals) of the plurality of ultrasonic sensors on the basis of the reflected waves (e.g., the reflected signals) measured in the state in which the finger does not touch the sensor area (e.g., the sensor area 620 in FIGS. 6 and 8) of the side surface bezel (e.g., the side surface bezel 510 in FIGS. 6 and 9). The electronic device 101, 200, or 400 may store the acquired background signal (e.g., the background signal) in the memory (e.g., the memory 130 in FIG. 1 or the memory 433 in FIG. 4).

For example, the processor 120 or 420 acquires the background signals (e.g., the background signals) of the plurality of ultrasonic sensors on the basis of the reflected waves (e.g., the reflected signals) measured in the state in which the finger does not touch the sensor area (e.g., the sensor area 620 in FIGS. 6 and 8) of the side surface bezel (e.g., the side surface bezel 510 in FIGS. 6 and 9). The processor 120 or 420 may store the acquired background signal (e.g., the background signal) in the memory (e.g., the memory 130 in FIG. 1 or the memory 433 in FIG. 4).

The memory 130 or 433 of the electronic device 101, 200, or 400 according to the embodiment of the disclosure may include instructions for operating operations in FIG. 21. At least some of the operations in FIG. 21 may be excluded. At least some of the operations in FIG. 21 may be performed simultaneously (e.g., in parallel).

Figure 22:
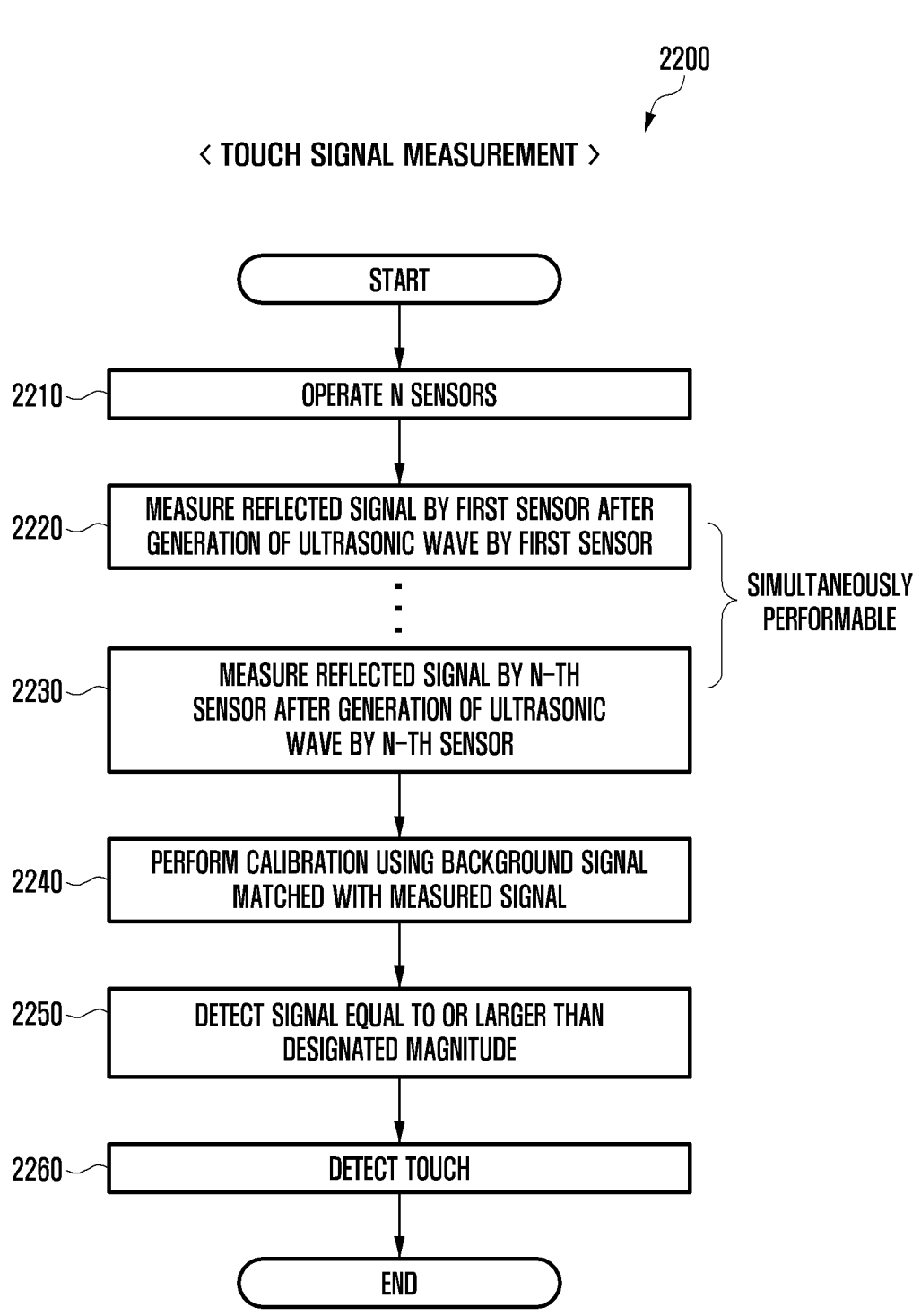
FIG. 22 is a view illustrating a method of acquiring touch signals by using a plurality of ultrasonic sensors according to an embodiment of the disclosure.

FIG. 22 is a view illustrating a method of acquiring touch signals by using the plurality of ultrasonic sensors according to an embodiment of the disclosure.

In the embodiment to be described below, the respective operations may be sequentially performed. However, the operations need not be necessarily performed sequentially. For example, the order of the respective operations are changed, and at least two operations are performed in parallel.

Referring to FIG. 22, the electronic device (e.g., the electronic device 101 in FIG. 1, the electronic device 200 in FIG. 2, or the electronic device 400 in FIG. 4) according to the embodiment of the disclosure may acquire a touch signal by operating the plurality of ultrasonic sensors and detect a touch on the basis of the acquired touch signal.

For example, the processor (e.g., the processor 120 in FIG. 1 or the processor 420 in FIG. 4) of the electronic device 101, 200, or 400 acquires a touch signal by operating the plurality of ultrasonic sensors and detect a touch on the basis of the acquired touch signal.

In a method 2200, at operation 2210, according to the embodiment, the electronic device 101, 200, or 400 may operate the plurality of ultrasonic sensors. For example, the processor 120 or 420 operates the plurality of ultrasonic sensors.

At operation 2220, according to the embodiment, the electronic device 101, 200, or 400 may operate the first ultrasonic sensor among the plurality of ultrasonic sensors. The first ultrasonic sensor may receive the first reflected wave (e.g., the first reflected signal) based on the first ultrasonic sensor. The electronic device 101, 200, or 400 may measure the received first reflected wave (e.g., the first reflected signal).

For example, the processor 120 or 420 operates the first ultrasonic sensor among the plurality of ultrasonic sensors. The first ultrasonic sensor may receive the first reflected wave (e.g., the first reflected signal) based on the first ultrasonic sensor. The processor 120 or 420 may measure the received first reflected wave (e.g., the first reflected signal).

At operation 2230, according to the embodiment, the electronic device 101, 200, or 400 may operate the N-th ultrasonic sensor among the plurality of ultrasonic sensors. The N-th ultrasonic sensor may receive the N-th reflected wave (e.g., the N-th reflected signal) based on the N-th ultrasonic sensor. The electronic device 101, 200, or 400 may measure the received N-th reflected wave (e.g., the N-th reflected signal).

For example, the processor 120 or 420 operates the N-th ultrasonic sensor among the plurality of ultrasonic sensors. The N-th ultrasonic sensor may receive the N-th reflected wave (e.g., the N-th reflected signal) based on the N-th ultrasonic sensor. The processor 120 or 420 may measure the received N-th reflected wave (e.g., the N-th reflected signal).

For example, operations 2220 and 2230 is performed simultaneously (or sequentially).

For example, between operations 2220 and 2230, the operations of the second to (N−1)th ultrasonic sensors are performed simultaneously (or sequentially).

At operation 2240, according to the embodiment, the electronic device 101, 200, or 400 may perform calibration (e.g., subtract the background signal from the measured reflected wave) by using the background signal (e.g., the background signal) matched with the measured reflected wave (e.g., the reflected signal). The electronic device 101, 200, or 400 may acquire signal data (e.g., a measured data value) by performing the calibration (e.g., subtracting the background signal from the measured reflected wave) by using the background signal (e.g., the background signal) matched with the measured reflected wave (e.g., the reflected signal).

For example, the processor 120 or 420 performs the calibration (e.g., subtract the background signal from the measured reflected wave) by using the background signal (e.g., the background signal) matched with the measured reflected wave (e.g., the reflected signal). The processor 120 or 420 may acquire the signal data (e.g., the measured data value) by performing the calibration (e.g., subtracting the background signal from the measured reflected wave) by using the background signal (e.g., the background signal) matched with the measured reflected wave (e.g., the reflected signal).

At operation 2250, according to the embodiment, the electronic device 101, 200, or 400 may compare the signal data (e.g., the measured data value) with a preset reference value and determine whether a signal equal to or larger than a designated magnitude is detected.

For example, the processor 120 or 420 compares the signal data (e.g., the measured data value) with the preset reference value and determine whether a signal equal to or larger than the designated magnitude is detected.

At operation 2260, according to the embodiment, when the result of comparing the signal data (e.g., the measured data value) with the preset reference value indicates that a signal equal to or larger than the designated magnitude is detected, the electronic device 101, 200, or 400 may determine that a touch is made on the sensor area (e.g., the sensor area 620 in FIGS. 6 and 8) of the side surface bezel (e.g., the side surface bezel 510 in FIGS. 6 and 9). For example, when the result of comparing the signal data (e.g., the measured data value) with the preset reference value indicates that a signal equal to or larger than the designated magnitude is not detected, the electronic device 101, 200, or 400 determines that no touch is made.

For example, when the result of comparing the signal data (e.g., the measured data value) with the preset reference value indicates that a signal equal to or larger than the designated magnitude is detected, the processor 120 or 420 determines that a touch is made on the sensor area 620 of the side surface bezel 510. For example, when the result of comparing the signal data (e.g., the measured data value) with the preset reference value indicates that a signal equal to or larger than the designated magnitude is not detected, the processor 120 or 420 determines that no touch is made.

The memory 130 or 433 of the electronic device 101, 200, or 400 according to the embodiment of the disclosure may include instructions for operating operations in FIG. 22. At least some of the operations in FIG. 22 may be excluded. At least some of the operations in FIG. 22 may be performed simultaneously (e.g., in parallel).

FIG. 23 is a view illustrating a method of dividing the sensor area of the side surface bezel and registering (e.g., customizing) the plurality of touch keys (e.g., the side keys, the soft keys, or the buttonless keys) according to an embodiment of the disclosure.

In the embodiment to be described below, the respective operations may be sequentially performed. However, the operations need not be necessarily performed sequentially. For example, the order of the respective operations may be changed, and at least two operations is performed in parallel.

Referring to FIG. 23, the electronic device (e.g., the electronic device 101 in FIG. 1, the electronic device 200 in FIG. 2, or the electronic device 400 in FIG. 4) according to the embodiment of the disclosure may acquire a touch signal by operating the plurality of ultrasonic sensors and register (e.g., customize) the touch key (e.g., the side key, the soft key, or the buttonless key) on the basis of the acquired touch signal.

For example, the processor (e.g., the processor 120 in FIG. 1 or the processor 420 in FIG. 4) of the electronic device 101, 200, or 400 acquires a touch signal by operating the plurality of ultrasonic sensors and register (e.g., customize) the touch key (e.g., the side key, the soft key, or the buttonless key) on the basis of the acquired touch signal.

In a method 2300, at operation 2310, according to the embodiment, the electronic device 101, 200, or 400 may operate the plurality of ultrasonic sensors in the standby state. For example, the processor 120 or 420 operates the plurality of ultrasonic sensors in the standby state.

Figure 24:
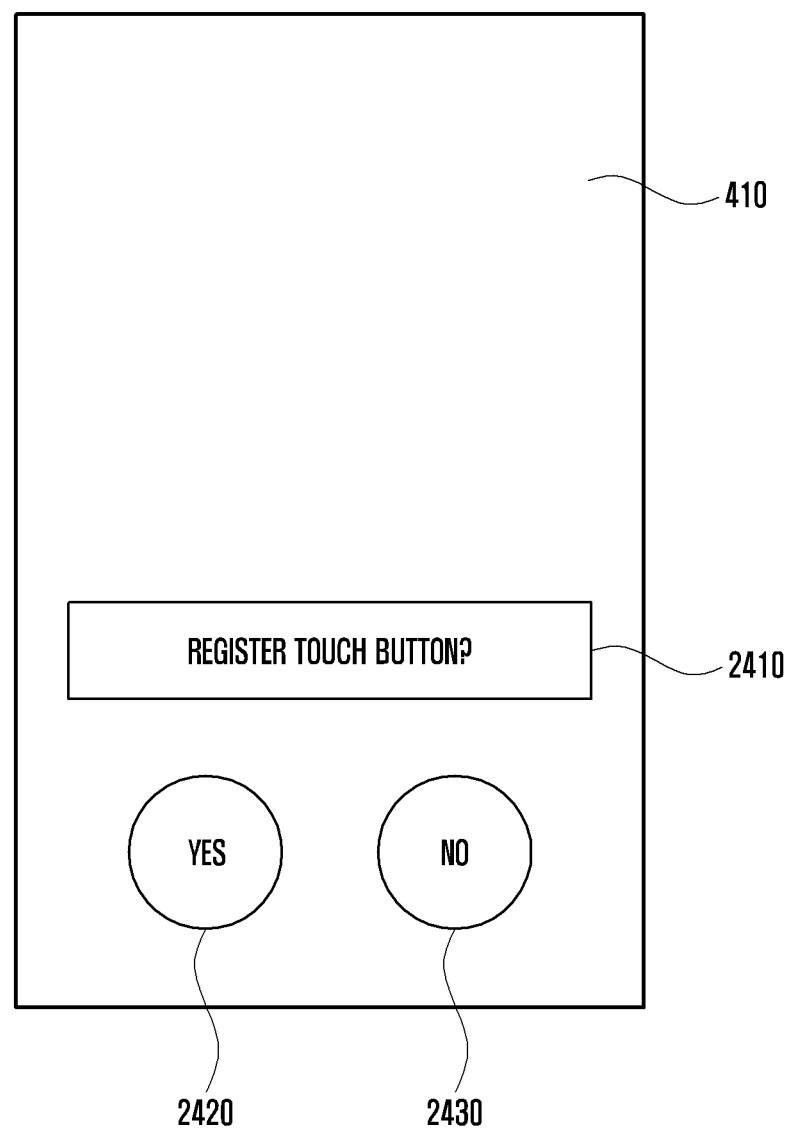
FIGS. 24, 25, 26, 27, 28, and 29 are views illustrating user interfaces (UIs) for dividing a sensor area of a side surface bezel and registering (e.g., customizing) a plurality of touch keys (e.g., side keys, soft keys, or buttonless keys) according to various embodiments of the disclosure.

FIG. 24 is a view 2400 illustrating a user interface (UI) for dividing the sensor area of the side surface bezel and registering (e.g., customizing) the plurality of touch keys (e.g., the side keys, the soft keys, or the buttonless keys) according to an embodiment of the disclosure.

Referring to FIGS. 23 and 24, at operation 2320, according to the embodiment, the electronic device 101, 200, or 400 may enter a registration menu related to the touch key (e.g., the side key, the soft key, or the buttonless key) by operating an application for registering (e.g., customizing) the touch key (e.g., the side key, the soft key, or the buttonless key). For example, the electronic device 101, 200, or 400 displays, on the display 410, a user interface 2410 for registering the touch key (e.g., the side key, the soft key, or the buttonless key).

For example, the electronic device 101, 200, or 400 displays, on the display 410, selection menus 2420 and 2430 for registering (e.g., customizing) the touch key (e.g., the side key, the soft key, or the buttonless key). The electronic device 101, 200, or 400 may register (e.g., customize) the touch key (e.g., the side key, the soft key, or the buttonless key) on the basis of the user's selection of the selection menus 2420 and 2430 for registering (e.g., customizing) the touch key (e.g., the side key, the soft key, or the buttonless key).

For example, the processor 120 or 420 enters the registration menu related to the touch key (e.g., the side key, the soft key, or the buttonless key) by operating the application for registering (e.g., customizing) the touch key (e.g., the side key, the soft key, or the buttonless key). For example, the processor 120 or 420 displays, on the display 410, the user interface 2410 for registering the touch key (e.g., the side key, the soft key, or the buttonless key).

For example, the processor 120 or 420 displays, on the display 410, the selection menus 2420 and 2430 for registering (e.g., customizing) the touch key (e.g., the side key, the soft key, or the buttonless key). The processor 120 or 420 may register (e.g., customize) the touch key (e.g., the side key, the soft key, or the buttonless key) on the basis of the user's selection of the selection menus 2420 and 2430 for registering (e.g., customizing) the touch key (e.g., the side key, the soft key, or the buttonless key). The side surface bezel (e.g., the side surface bezel 510 in FIGS. 6 and 9) may divide the sensor area (e.g., the sensor area 620 in FIGS. 6 and 8) into the plurality of areas. The electronic device 101, 200, or 400 may divide the sensor area 620 of the side surface bezel 510 into a first sensor area, a second sensor area, and a third sensor area. For example, the processor 120 or 420 divides the sensor area 620 of the side surface bezel 510 into the plurality of areas. The processor 120 or 420 may divide the sensor area 620 of the side surface bezel 510 into the first sensor area, the second sensor area, and the third sensor area.

At operation 2330, the electronic device 101, 200, or 400 may acquire a normal touch signal based on a position.

Figure 25:
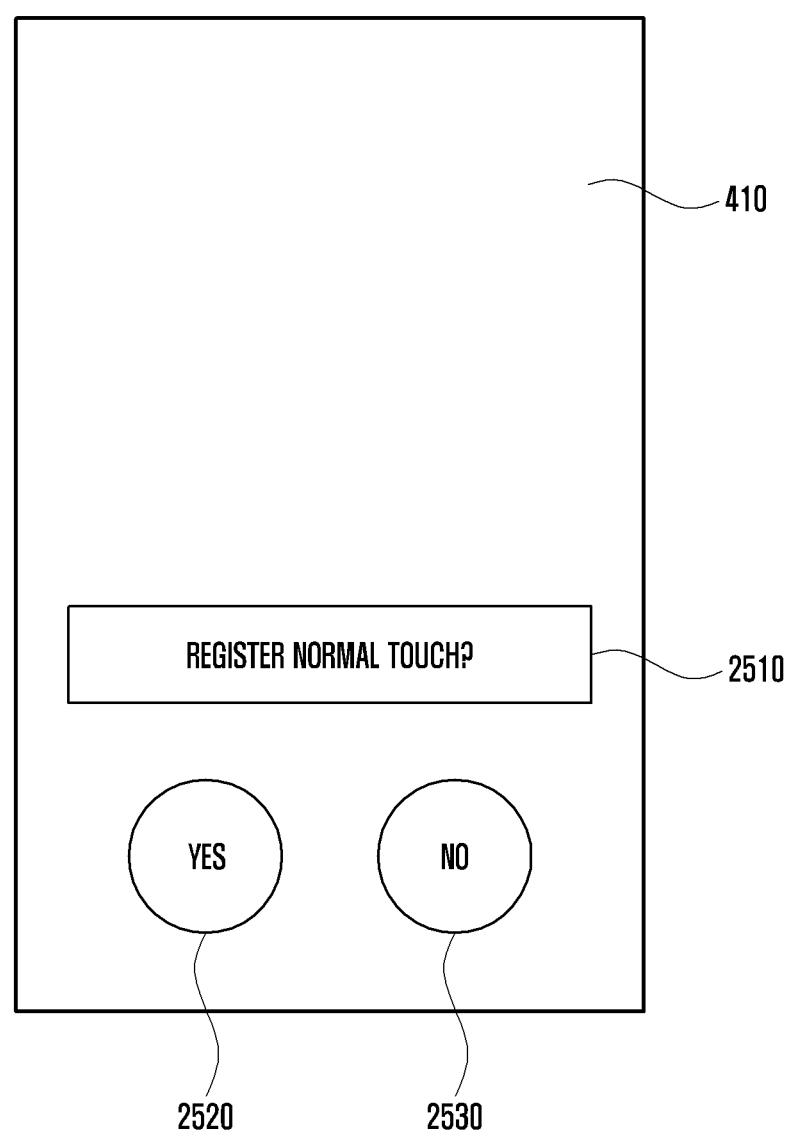

FIG. 25 is a view 2500 illustrating a user interface (UI) for dividing the sensor area of the side surface bezel and registering (e.g., customizing) the plurality of touch keys (e.g., the side keys, the soft keys, or the buttonless keys) according to an embodiment of the disclosure.

Referring to FIGS. 23 and 25, the electronic device 101, 200, or 400 may display, on the display 410, a user interface 2510 for registering the normal touch (e.g., the general touch). For example, the electronic device 101, 200, or 400 displays, on the display 410, selection menus 2520 and 2530 for registering (e.g., customizing) the normal touch (e.g., the general touch) of the touch key (e.g., the side key, the soft key, or the buttonless key). The electronic device 101, 200, or 400 may register (e.g., customize) the normal touch (e.g., the general touch) of the touch key (e.g., the side key, the soft key, or the buttonless key) on the basis of the user's selection of the selection menus 2520 and 2530 for registering (e.g., customizing) the normal touch (e.g., the general touch) of the touch key (e.g., the side key, the soft key, or the buttonless key).

For example, the processor 120 or 420 displays, on the display 410, the user interface 2510 for registering the normal touch (e.g., the general touch). For example, the processor 120 or 420 displays, on the display 410, the selection menus 2520 and 2530 for registering (e.g., customizing) the normal touch (e.g., the general touch) of the touch key (e.g., the side key, the soft key, or the buttonless key). The processor 120 or 420 may register (e.g., customize) the normal touch (e.g., the general touch) of the touch key (e.g., the side key, the soft key, or the buttonless key) on the basis of the user's selection of the selection menus 2520 and 2530 for registering (e.g., customizing) the normal touch (e.g., the general touch) of the touch key (e.g., the side key, the soft key, or the buttonless key).

For example, the electronic device 101, 200, or 400 acquires a touch signal based on the normal touch (e.g., the general touch) for each of the first sensor area, the second sensor area, and the third sensor area of the sensor area 620.

For example, the processor 120 or 420 acquires a touch signal based on the normal touch (e.g., the general touch) for each of the first sensor area, the second sensor area, and the third sensor area of the sensor area 620.

Figure 26:
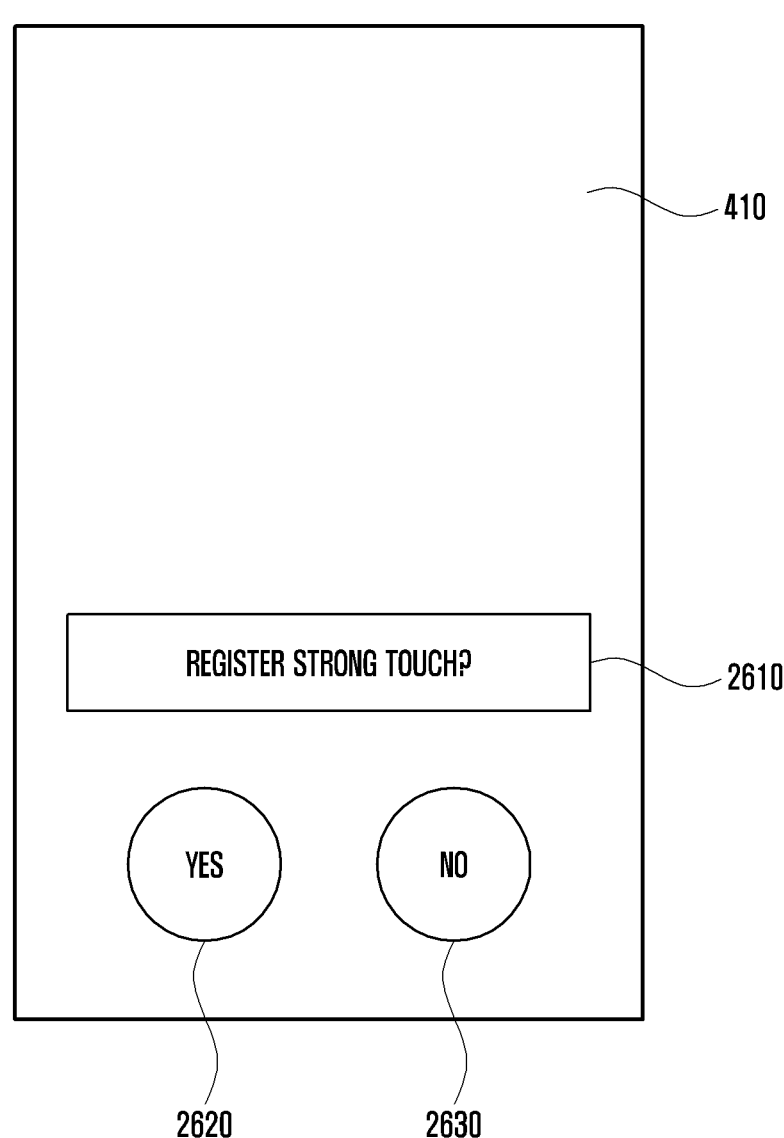

FIG. 26 is a view 2600 illustrating a user interface (UI) for dividing the sensor area of the side surface bezel and registering (e.g., customizing) the plurality of touch keys (e.g., the side keys, the soft keys, or the buttonless keys) according to an embodiment of the disclosure.

Referring to FIGS. 23 and 26, the electronic device 101, 200, or 400 may display, on the display 410, a user interface 2610 for registering the strong touch (e.g., the force touch).

For example, the processor 120 or 420 displays, on the display 410, the user interface 2610 for registering the strong touch (e.g., the force touch). For example, the electronic device 101, 200, or 400 displays, on the display 410, selection menus 2620 and 2630 for registering (e.g., customizing) the strong touch (e.g., the force touch) of the touch key (e.g., the side key, the soft key, or the buttonless key). The electronic device 101, 200, or 400 may register (e.g., customize) the strong touch (e.g., the force touch) of the touch key (e.g., the side key, the soft key, or the buttonless key) on the basis of the user's selection of the selection menus 2620 and 2630 for registering (e.g., customizing) the strong touch (e.g., the force touch) of the touch key (e.g., the side key, the soft key, or the buttonless key).

At operation 2340, the electronic device 101, 200, or 400 may acquire a touch signal based on the strong touch (e.g., the force touch) for each of the first sensor area, the second sensor area, and the third sensor area of the sensor area 620.

For example, the processor 120 or 420 acquires a touch signal based on the strong touch (e.g., the force touch) for each of the first sensor area, the second sensor area, and the third sensor area of the sensor area 620. For example, the processor 120 or 420 displays, on the display 410, the selection menus 2620 and 2630 for registering (e.g., customizing) the strong touch (e.g., the force touch) of the touch key (e.g., the side key, the soft key, or the buttonless key). The processor 120 or 420 may register (e.g., customize) the strong touch (e.g., the force touch) of the touch key (e.g., the side key, the soft key, or the buttonless key) on the basis of the user's selection of the selection menus 2620 and 2630 for registering (e.g., customizing) the strong touch (e.g., the force touch) of the touch key (e.g., the side key, the soft key, or the buttonless key).

At operation 2350, the electronic device 101, 200, or 400 may determine a reference value (e.g., a threshold value) of the strong touch (e.g., the force touch) in order to distinguish between the normal touch (e.g., the general touch) and the strong touch (e.g., the force touch).

For example, the processor 120 or 420 may determine the reference value (e.g., the threshold value) of the strong touch (e.g., the force touch) in order to distinguish between the normal touch (e.g., the general touch) and the strong touch (e.g., the force touch).

At operation 2360, the electronic device 101, 200, or 400 may designate an area desired by the user among the first sensor area, the second sensor area, and the third sensor area of the sensor area 620.

For example, the processor 120 or 420 designates an area desired by the user among the first sensor area, the second sensor area, and the third sensor area of the sensor area 620.

At operation 2370, the electronic device 101, 200, or 400 may calculate the arrival time (e.g., the receiving time) of the reflected wave (e.g., the reflected signal) of each of the plurality of ultrasonic sensors and designate a time zone for dividing the touch key area.

For example, the processor 120 or 420 calculates the arrival time (e.g., the receiving time) of the reflected wave (e.g., the reflected signal) of each of the plurality of ultrasonic sensors and designate the time zone for dividing the touch key area.

At operation 2380, the electronic device 101, 200, or 400 may designate the first sensor area to the first touch key, designate the second sensor area to the second touch key, and designate the third sensor area to the third touch key. The electronic device 101, 200, or 400 may store the time zone of the first touch key, the time zone of the second touch key, and the time zone of the third touch key.

For example, the processor 120 or 420 designates the first sensor area to the first touch key, designate the second sensor area to the second touch key, and designate the third sensor area to the third touch key. The processor 120 or 420 may store the time zone of the first touch key, the time zone of the second touch key, and the time zone of the third touch key.

Figure 27:
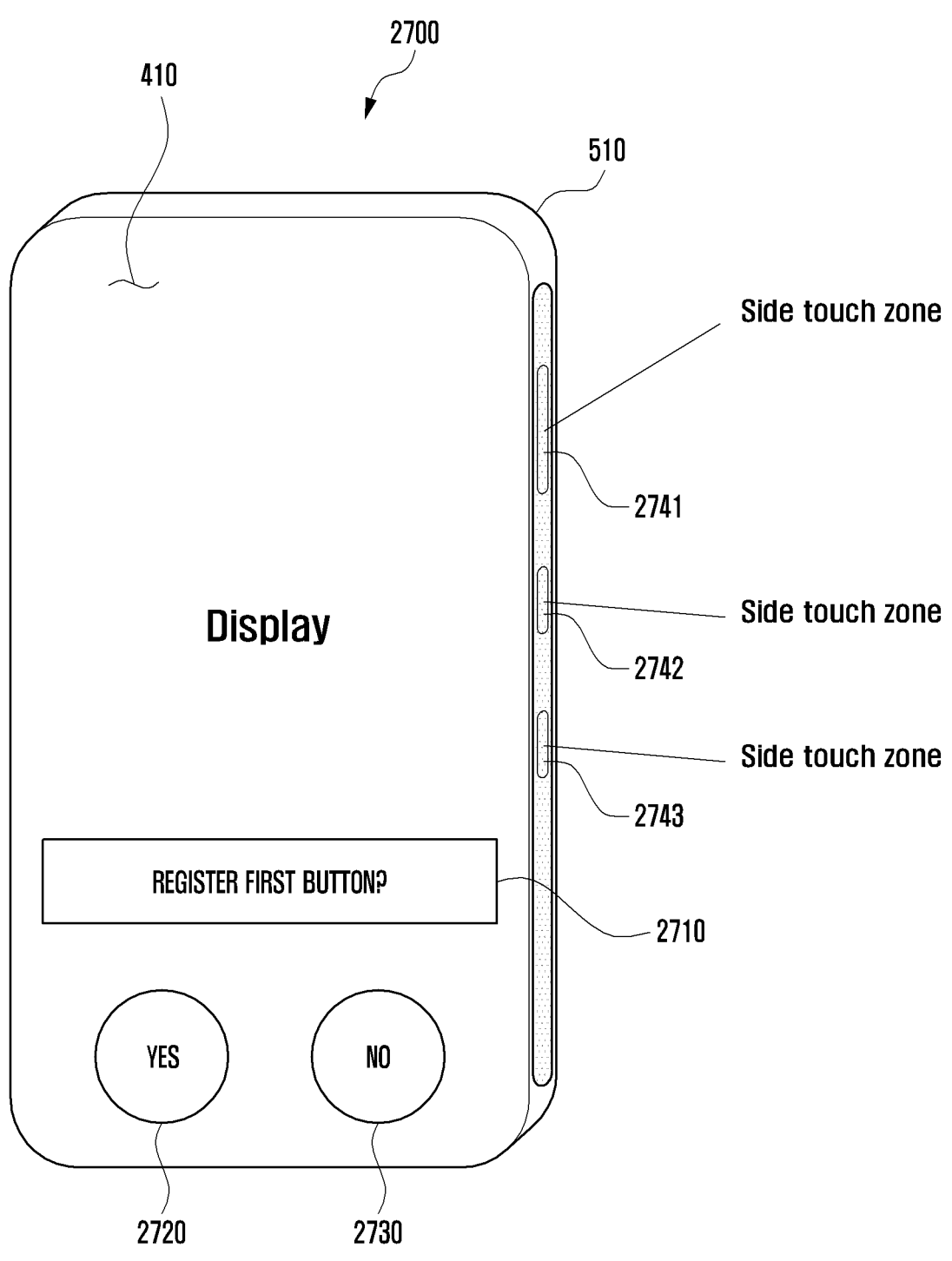

FIG. 27 is a view 2700 illustrating a user interface (UI) for dividing the sensor area of the side surface bezel and registering (e.g., customizing) the plurality of touch keys (e.g., the side keys, the soft keys, or the buttonless keys) according to an embodiment of the disclosure.

Referring to FIGS. 23 and 27, the electronic device 101, 200, or 400 may display, on the display 410, a user interface 2710 for registering the first touch key (e.g., the first button).

For example, the electronic device 101, 200, or 400 registers the first touch key (e.g., the first button) on the basis of the user's selection inputted through the user interface 2710 for registering the first touch key (e.g., the first button). For example, the electronic device 101, 200, or 400 displays, on the display 410, selection menus 2720 and 2730 for registering (e.g., customizing) the first touch key (e.g., the side key, the soft key, or the buttonless key). The user interface may be displayed to register (e.g., customize) one of a plurality of areas 2741, 2742, and 2743 of the side surface bezel 510 of the housing 210 as the first touch key (e.g., the side key, the soft key, or the buttonless key). The user may select one of the plurality of areas 2741, 2742, and 2743 of the side surface bezel 510 of the housing 210 as the first touch key (e.g., the side key, the soft key, or the buttonless key) and register the first touch key (e.g., the side key, the soft key, or the buttonless key) by touching the selected area. The electronic device 101, 200, or 400 may register (e.g., customize) one of the plurality of areas 2741, 2742, and 2743 of the side surface bezel as the first touch key (e.g., the side key, the soft key, or the buttonless key) on the basis of the user's selection of the selection menus 2720 and 2730 for registering (e.g., customizing) the first touch key (e.g., the side key, the soft key, or the buttonless key).

Figure 28:
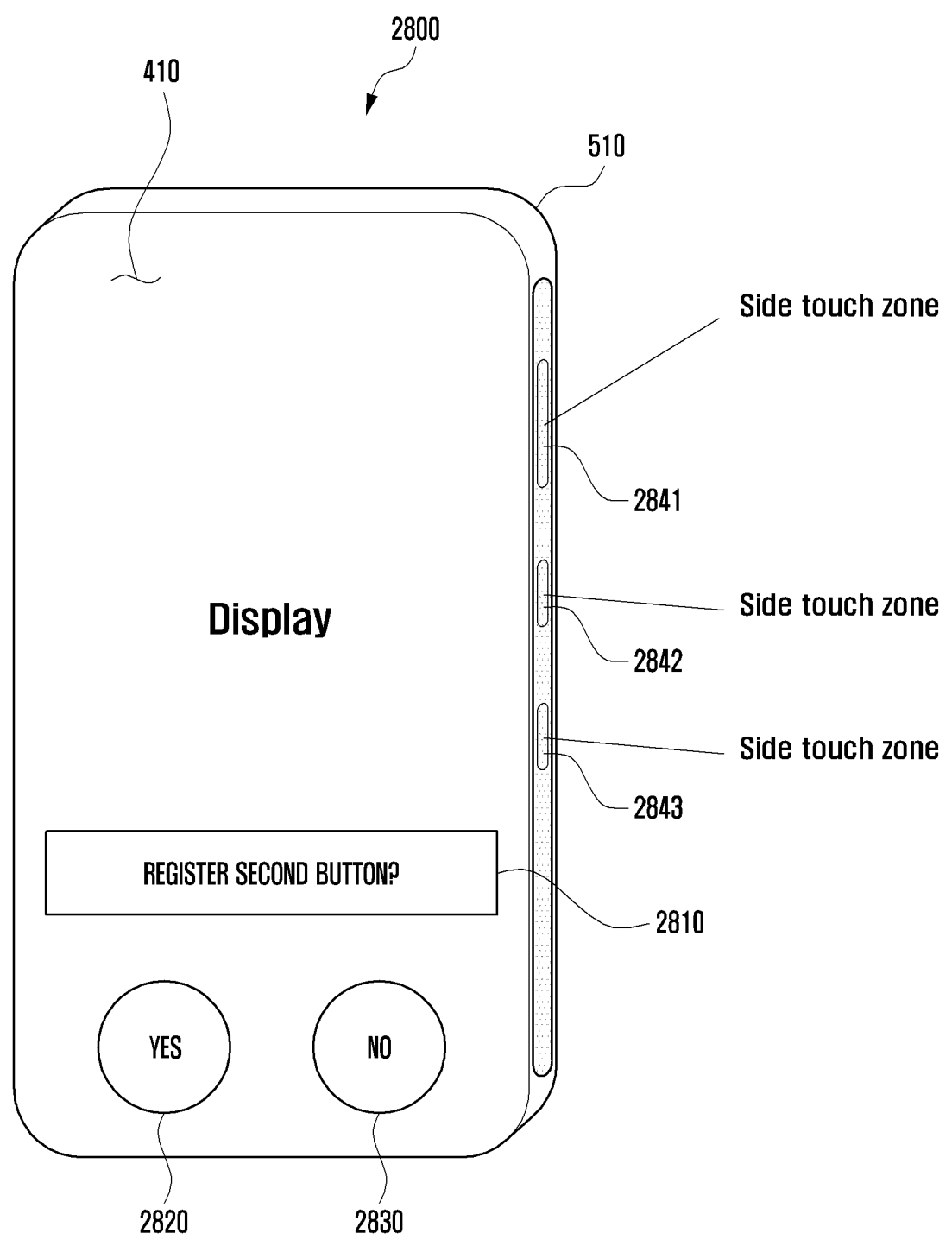

For example, the processor 120 or 420 displays, on the display 410, the user interface 2710 for registering the first touch key (e.g., the first button). The processor 120 or 420 may register the first touch key (e.g., the first button) on the basis of the user's selection inputted through the user interface 2710 for registering the first touch key (e.g., the first button). For example, the processor 120 or 420 displays, on the display 410, the selection menus 2720 and 2730 for registering (e.g., customizing) the first touch key (e.g., the side key, the soft key, or the buttonless key). The user interface may be displayed to register (e.g., customize) one of a plurality of areas 2741, 2742, and 2743 of the side surface bezel 510 of the housing 210 as the first touch key (e.g., the side key, the soft key, or the buttonless key). The user may select one of the plurality of areas 2741, 2742, and 2743 of the side surface bezel 510 of the housing 210 as the first touch key (e.g., the side key, the soft key, or the buttonless key) and register the first touch key (e.g., the side key, the soft key, or the buttonless key) by touching the selected area. The processor 120 or 420 may register (e.g., customize) one of the plurality of areas 2741, 2742, and 2743 of the side surface bezel as the first touch key (e.g., the side key, the soft key, or the buttonless key) on the basis of the user's selection of the selection menus 2720 and 2730 for registering (e.g., customizing) the first touch key (e.g., the side key, the soft key, or the buttonless key). FIG. 28 is a view 2800 illustrating a user interface (UI) for dividing the sensor area of the side surface bezel and registering (e.g., customizing) the plurality of touch keys (e.g., the side keys, the soft keys, or the buttonless keys) according to an embodiment of the disclosure.

With reference to FIGS. 23 and 28, the electronic device 101, 200, or 400 may display, on the display 410, a user interface 2810 for registering the second touch key (e.g., the second button). The electronic device 101, 200, or 400 may register the second touch key (e.g., the second button) on the basis of the user's selection inputted through the user interface 2810 for registering the second touch key (e.g., the second button). For example, the electronic device 101, 200, or 400 displays, on the display 410, selection menus 2820 and 2830 for registering (e.g., customizing) the second touch key (e.g., the side key, the soft key, or the buttonless key). The user interface may be displayed to register (e.g., customize) one of a plurality of areas 2841, 2842, and 2843 of the side surface bezel 510 of the housing 210 as the second touch key (e.g., the side key, the soft key, or the buttonless key). The user may select one of the plurality of areas 2841, 2842, and 2843 of the side surface bezel 510 of the housing 210 as the second touch key (e.g., the side key, the soft key, or the buttonless key) and register the second touch key (e.g., the side key, the soft key, or the buttonless key) by touching the selected area. The electronic device 101, 200, or 400 may register (e.g., customize) one of the plurality of areas 2841, 2842, and 2843 of the side surface bezel as the second touch key (e.g., the side key, the soft key, or the buttonless key) on the basis of the user's selection of the selection menus 2820 and 2830 for registering (e.g., customizing) the second touch key (e.g., the side key, the soft key, or the buttonless key).

For example, the processor 120 or 420 displays, on the display 410, the user interface 2810 for registering the second touch key (e.g., the second button). The processor 120 or 420 may register the second touch key (e.g., the second button) on the basis of the user's selection inputted through the user interface 2810 for registering the second touch key (e.g., the second button). For example, the processor 120 or 420 displays, on the display 410, the selection menus 2820 and 2830 for registering (e.g., customizing) the second touch key (e.g., the side key, the soft key, or the buttonless key). The user interface may be displayed to register (e.g., customize) one of a plurality of areas 2841, 2842, and 2843 of the side surface bezel 510 of the housing 210 as the second touch key (e.g., the side key, the soft key, or the buttonless key). The user may select one of the plurality of areas 2841, 2842, and 2843 of the side surface bezel 510 of the housing 210 as the second touch key (e.g., the side key, the soft key, or the buttonless key) and register the second touch key (e.g., the side key, the soft key, or the buttonless key) by touching the selected area. The processor 120 or 420 may register (e.g., customize) one of the plurality of areas 2841, 2842, and 2843 of the side surface bezel as the second touch key (e.g., the side key, the soft key, or the buttonless key) on the basis of the user's selection of the selection menus 2820 and 2830 for registering (e.g., customizing) the second touch key (e.g., the side key, the soft key, or the buttonless key).

Figure 29:
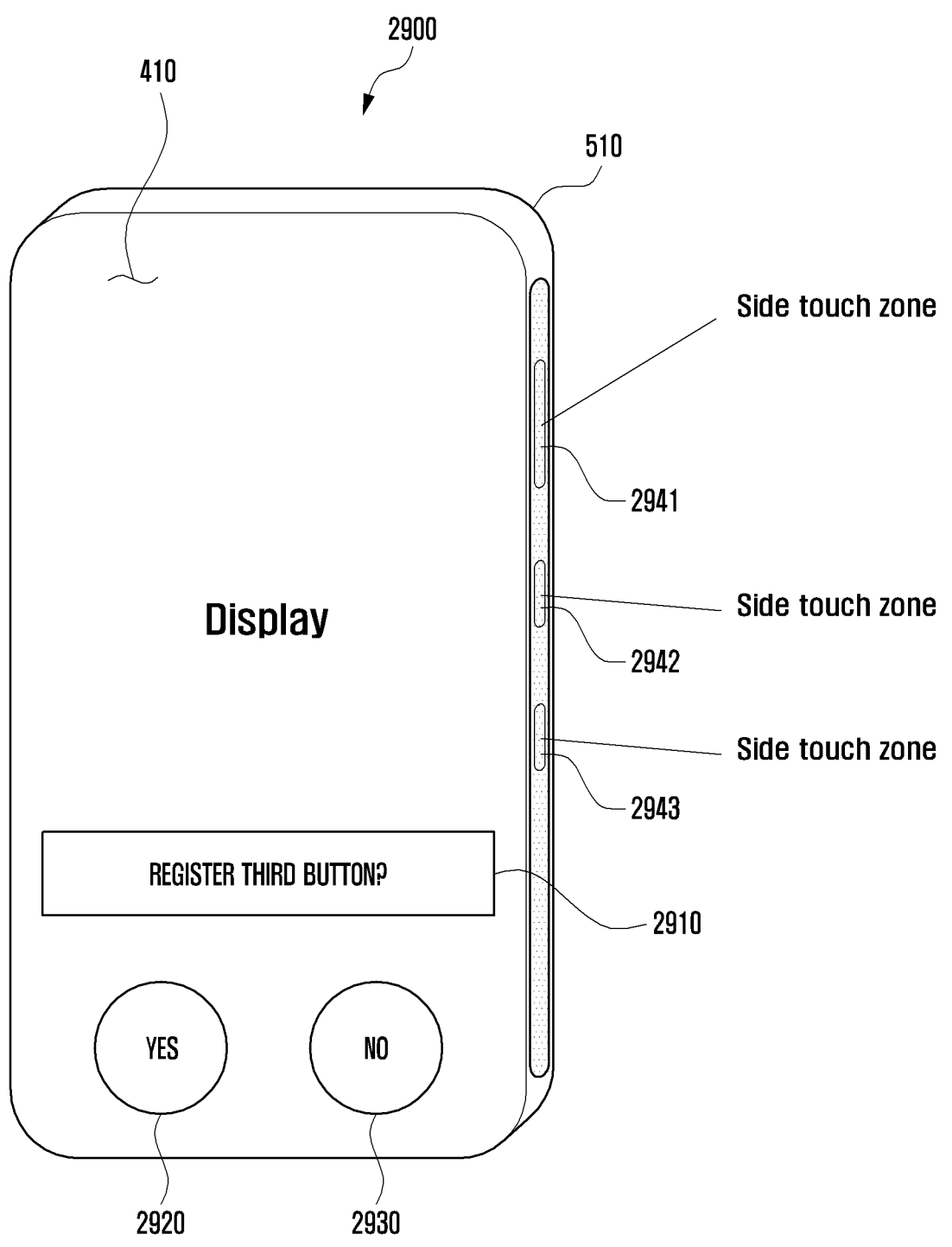

FIG. 29 is a view 2900 illustrating a user interface (UI) for dividing the sensor area of the side surface bezel and registering (e.g., customizing) the plurality of touch keys (e.g., the side keys, the soft keys, or the buttonless keys) according to an embodiment of the disclosure.

Referring to FIGS. 23 and 29, the electronic device 101, 200, or 400 may display, on the display 410, a user interface 2910 for registering the third touch key (e.g., the third button). The electronic device 101, 200, or 400 may register the third touch key (e.g., the third button) on the basis of the user's selection inputted through the user interface 2910 for registering the third touch key (e.g., the third button). For example, the electronic device 101, 200, or 400 displays, on the display 410, selection menus 2920 and 2930 for registering (e.g., customizing) the third touch key (e.g., the side key, the soft key, or the buttonless key). The user interface may be displayed to register (e.g., customize) one of a plurality of areas 2941, 2942, and 2943 of the side surface bezel 510 of the housing 210 as the third touch key (e.g., the side key, the soft key, or the buttonless key). The user may select one of the plurality of areas 2941, 2942, and 2943 of the side surface bezel 510 of the housing 210 as the third touch key (e.g., the side key, the soft key, or the buttonless key) and register the third touch key (e.g., the side key, the soft key, or the buttonless key) by touching the selected area. The electronic device 101, 200, or 400 may register (e.g., customize) one of the plurality of areas 2941, 2942, and 2943 of the side surface bezel as the third touch key (e.g., the side key, the soft key, or the buttonless key) on the basis of the user's selection of the selection menus 2920 and 2930 for registering (e.g., customizing) the third touch key (e.g., the side key, the soft key, or the buttonless key).

For example, the processor 120 or 420 displays, on the display 410, the user interface 2910 for registering the third touch key (e.g., the third button). The processor 120 or 420 may register the third touch key (e.g., the third button) on the basis of the user's selection inputted through the user interface 2910 for registering the third touch key (e.g., the third button). For example, the processor 120 or 420 displays, on the display 410, the selection menus 2920 and 2930 for registering (e.g., customizing) the third touch key (e.g., the side key, the soft key, or the buttonless key). The user interface may be displayed to register (e.g., customize) one of a plurality of areas 2941, 2942, and 2943 of the side surface bezel 510 of the housing 210 as the third touch key (e.g., the side key, the soft key, or the buttonless key). The user may select one of the plurality of areas 2941, 2942, and 2943 of the side surface bezel 510 of the housing 210 as the third touch key (e.g., the side key, the soft key, or the buttonless key) and register the third touch key (e.g., the side key, the soft key, or the buttonless key) by touching the selected area. The processor 120 or 420 may register (e.g., customize) one of the plurality of areas 2941, 2942, and 2943 of the side surface bezel as the third touch key (e.g., the side key, the soft key, or the buttonless key) on the basis of the user's selection of the selection menus 2920 and 2930 for registering (e.g., customizing) the third touch key (e.g., the side key, the soft key, or the buttonless key).

At operation 2390, the electronic device 101, 200, or 400 may identify whether the user wants to designate an additional touch key. In case that the identification result at operation 2390 indicates that the user wants to designate an additional touch key, the electronic device 101, 200, or 400 may return to operation 2360 and perform the operation.

For example, the processor 120 or 420 identifies whether the user wants to designate an additional touch key. In case that the identification result at operation 2390 indicates that the user wants to designate an additional touch key, the processor 120 or 420 may return to operation 2360 and perform the operation.

The memory 130 or 433 of the electronic device 101, 200, or 400 according to the embodiment of the disclosure may include instructions for operating operations in FIG. 23. At least some of the operations in FIG. 23 may be excluded. At least some of the operations in FIG. 23 may be performed simultaneously (e.g., in parallel).

FIG. 30 is a view illustrating a method of recognizing a touch by dividing the sensor area and using the plurality of touch keys (e.g., the side keys, the soft keys, or the buttonless keys) according to an embodiment of the disclosure.

Referring to FIG. 30, the electronic device (e.g., the electronic device 101 in FIG. 1, the electronic device 200 in FIG. 2, or the electronic device 400 in FIG. 4) according to the embodiment of the disclosure may perform touch recognition of the plurality of touch keys (e.g., the side keys, the soft keys, or the buttonless keys) designated to the sensor area (e.g., the sensor area 620 in FIGS. 6 and 8) of the side surface bezel (e.g., the side surface bezel 510 in FIGS. 6 and 9).

At operation 3005, the electronic device 101, 200, or 400 may generate the ultrasonic wave (e.g., the lamb wave) by operating the plurality of ultrasonic sensors. The electronic device 101, 200, or 400 may receive the reflected wave (e.g., the reflected signal) of the ultrasonic wave (e.g., the lamb wave). The electronic device 101, 200, or 400 may periodically or aperiodically measure the signal of the received reflected wave (e.g., the reflected signal).

For example, the processor 120 or 420 generates the ultrasonic wave (e.g., the lamb wave) by operating the plurality of ultrasonic sensors. The processor 120 or 420 may receive the reflected wave (e.g., the reflected signal) of the ultrasonic wave (e.g., the lamb wave). The processor 120 or 420 may periodically measure the signal of the received reflected wave (e.g., the reflected signal).

At operation 3010, the electronic device 101, 200, or 400 may acquire the background signal (e.g., the reference signal or the background signal) of the ultrasonic sensor in the standby state and store the background signal (e.g., the reference signal or the background signal) in the memory (e.g., the memory 130 in FIG. 1 or the memory 433 in FIG. 4).

For example, the processor 120 or 420 acquires the background signal (e.g., the reference signal or the background signal) of the ultrasonic sensor in the standby state and store the background signal (e.g., the reference signal or the background signal) in the memory (e.g., the memory 130 in FIG. 1 or the memory 433 in FIG. 4).

At operation 3015, the electronic device 101, 200, or 400 may acquire the reflected wave (e.g., the reflected signal) based on the touch of the finger and calibrate the reflected wave (e.g., the reflected signal) by applying the background signal (e.g., the reference signal or the background signal).

For example, the processor 120 or 420 acquires the reflected wave (e.g., the reflected signal) based on the touch of the finger and calibrate the reflected wave (e.g., the reflected signal) by applying the background signal (e.g., the reference signal or the background signal).

At operation 3020, the electronic device 101, 200, or 400 may analyze a magnitude (e.g., intensity or strength) of the reflected wave (e.g., the reflected signal) that has been subjected to the calibration.

For example, the processor 120 or 420 analyzes the magnitude (e.g., the intensity or the strength) of the reflected wave (e.g., the reflected signal) that has been subjected to the calibration.

At operation 3025, the electronic device 101, 200, or 400 may determine whether the magnitude (e.g., the intensity or the strength) of the reflected wave (e.g., the reflected signal), which has been subjected to the calibration, corresponds to the normal touch (e.g., the general touch).

For example, the processor 120 or 420 determines whether the magnitude (e.g., the intensity or the strength) of the reflected wave (e.g., the reflected signal), which has been subjected to the calibration, corresponds to the normal touch (e.g., the general touch).

When the determination result at operation 3025 indicates that the magnitude (e.g., the intensity or the strength) of the reflected wave (e.g., the reflected signal), which has been subjected to the calibration, does not correspond to the normal touch (e.g., the general touch), the processor may return to operation 3010 and perform the operation.

The determination result at operation 3025 indicates that the magnitude (e.g., the intensity or the strength) of the reflected wave (e.g., the reflected signal), which has been subjected to the calibration, corresponds to the normal touch (e.g., the general touch), the processor may perform operation 3030.

At operation 3030, the electronic device 101, 200, or 400 may determine whether the magnitude (e.g., the intensity or the strength) of the reflected wave (e.g., the reflected signal), which has been subjected to the calibration, corresponds to the strong touch (e.g., the force touch).

For example, the processor 120 or 420 determines whether the magnitude (e.g., the intensity or the strength) of the reflected wave (e.g., the reflected signal), which has been subjected to the calibration, corresponds to the strong touch (e.g., the force touch).

At operation 3035, the electronic device 101, 200, or 400 may recognize the strong touch (e.g., the force touch) when the magnitude (e.g., the intensity or the strength) of the reflected wave (e.g., the reflected signal), which has been subjected to the calibration, corresponds to the strong touch (e.g., the force touch).

For example, the processor 120 or 420 recognizes the strong touch (e.g., the force touch) when the magnitude (e.g., the intensity or the strength) of the reflected wave (e.g., the reflected signal), which has been subjected to the calibration, corresponds to the strong touch (e.g., the force touch).

At operation 3040, the electronic device 101, 200, or 400 may recognize the normal touch (e.g., the general touch) when the magnitude (e.g., the intensity or the strength) of the reflected wave (e.g., the reflected signal), which has been subjected to the calibration, does not correspond to the strong touch (e.g., the force touch).

For example, the processor 120 or 420 recognizes the normal touch (e.g., the general touch) when the magnitude (e.g., the intensity or the strength) of the reflected wave (e.g., the reflected signal), which has been subjected to the calibration, does not correspond to the strong touch (e.g., the force touch).

At operation 3045, the electronic device 101, 200, or 400 may control the first ultrasonic sensor 481 and the second ultrasonic sensor 482 in the pulse repetition frequency (PRF) manner on the basis of the presence or absence of a touch.

For example, in the standby state (e.g., the standby state 1610 in FIG. 16), the electronic device 101, 200, or 400 controls the plurality of ultrasonic sensors to operate at the first pulse repetition frequency (e.g., the low PRF or the low-frequency pulse repetition frequency). For example, in the standby state (e.g., the standby state 1610 in FIG. 16), the processor 120 or 420 controls the plurality of ultrasonic sensors to operate at the first pulse repetition frequency (e.g., the low PRF or the low-frequency pulse repetition frequency).

For example, in case that the touch signal is detected (e.g., '1620' in FIG. 16), the electronic device 101, 200, or 400 controls the plurality of ultrasonic sensors to operate at the second pulse repetition frequency (e.g., the high PRF or the high-frequency pulse repetition frequency). For example, in case that the touch signal is detected (e.g., '1620' in FIG. 16), the processor 120 or 420 controls the plurality of ultrasonic sensors to operate at the second pulse repetition frequency (e.g., the high PRF or the high-frequency pulse repetition frequency).

For example, the electronic device 101, 200, or 400 determines that no touch signal is present when the touch signal is not detected for a predetermined time after the touch signal is detected (e.g., '1630' in FIG. 16). In case that no touch signal is present, the electronic device 101, 200, or 400 may control the plurality of ultrasonic sensors to operate at the first pulse repetition frequency (e.g., the low PRF or the low-frequency pulse repetition frequency). For example, the processor 120 or 420 determines that no touch signal is present when the touch signal is not detected for a predetermined time after the touch signal is detected (e.g., '1630' in FIG. 16). In case that no touch signal is present, the electronic device 101, 200, or 400 may control the plurality of ultrasonic sensors to operate at the first pulse repetition frequency (e.g., the low PRF or the low-frequency pulse repetition frequency).

At operation 3050, the electronic device 101, 200, or 400 may calculate the touch position in the sensor area (e.g., the sensor area 620 in FIGS. 6 and 8) of the side surface bezel (e.g., the side surface bezel 510 in FIGS. 6 and 9) on the basis of the received reflected waves (e.g., the reflected signals). The electronic device 101, 200, or 400 may calculate the position at which a touch is made in the plurality of touch keys (e.g., the side keys, the soft keys, or the buttonless keys).

For example, the processor 120 or 420 calculates the touch position in the sensor area (e.g., the sensor area 620 in FIGS. 6 and 8) of the side surface bezel (e.g., the side surface bezel 510 in FIGS. 6 and 9) on the basis of the received reflected waves (e.g., the reflected signals). The processor 120 or 420 may calculate the position at which a touch is made in the plurality of touch keys (e.g., the side keys, the soft keys, or the buttonless keys).

At operation 3055, the electronic device 101, 200, or 400 may determine whether the recognized touch is made on the designated plurality of touch keys (e.g., the side keys, the soft keys, or the buttonless keys).

For example, the processor 120 or 420 determines whether the recognized touch is made on the designated plurality of touch keys (e.g., the side keys, the soft keys, or the buttonless keys).

At operation 3060, in case that the touch is normally recognized int designated plurality of touch keys (e.g., the side keys, the soft keys, or the buttonless keys), the electronic device 101, 200, or 400 may recognize the touch of the designated touch key (e.g., the side key, the soft key, or the buttonless key). The electronic device 101, 200, or 400 may perform the operation in accordance with the designated touch key (e.g., the side key, the soft key, or the buttonless key).

For example, in case that the touch is normally recognized int designated plurality of touch keys (e.g., the side keys, the soft keys, or the buttonless keys), the processor 120 or 420 recognizes the touch of the designated touch key (e.g., the side key, the soft key, or the buttonless key). The processor 120 or 420 may perform the operation in accordance with the designated touch key (e.g., the side key, the soft key, or the buttonless key).

The electronic device (e.g., the electronic device 200 in FIGS. 2 and 3 or the electronic device 400 in FIG. 4) according to the disclosed embodiment may include the housing (e.g., the housing 210 in FIG. 2), the sensor component (e.g., the sensor component 480 in FIGS. 4 and 5), the processor (e.g., the processor 420 in FIG. 4), and the memory (e.g., the memory 433 in FIG. 4) configured to store the instructions for operating the electronic device 200 or 400 when executed by the processor 420. The housing 210 may include the wall (e.g., the side surface bezel 218 in FIG. 2 or the side surface bezel 510 in FIG. 6) configured to define the outer surface of the electronic device 200 or 400. The sensor component 480 may include the first sensor (e.g., the first ultrasonic sensor 481 in FIG. 5) and the second sensor (e.g., the second ultrasonic sensor 482 in FIG. 5). The first sensor 481 and the second sensor 482 may be disposed to be in contact with the inner surface of the wall 218 or 510. The first sensor 481 may transmit the first wave so that the first wave propagates toward the second sensor 482 through the wall 218 or 510. The second sensor 482 may transmit the second wave so that the second wave propagates toward the first sensor 481 through the wall 218 or 510. The first sensor

481 may receive the second wave transmitted from the second sensor 482. The first sensor 481 may receive the first reflected wave corresponding to the first wave generated by the touch applied to the outer surface of the wall 218 or 510. The second sensor 482 may receive the first wave transmitted from the first sensor 481. The second sensor 482 may receive the second reflected wave corresponding to the second wave generated by the touch applied to the outer surface of the wall 218 or 510. When the instructions are executed by the processor 420, the electronic device 200 or 400 may identify the touch position on the basis of the first reflected wave and the second reflected wave based on the touch applied to the outer surface of the wall 218 or 510.

According to the embodiment, when the instructions are executed by the processor 420, the electronic device 200 or 400 may identify the touch pressure on the basis of the first reflected wave and the second reflected wave based on the touch applied to the outer surface of the wall 218 or 510.

According to the embodiment, when the instructions are executed by the processor 420, the electronic device 200 or 400 may identify the touch gesture and the touch input time on the basis of the first reflected wave and the second reflected wave according to the touch applied to the outer surface of the wall 218 or 510.

According to the embodiment, the first wave may be transmitted at the first frequency. The second wave may be transmitted at the second frequency different from the first frequency.

According to the embodiment, the sensor component 480 may include the processor (e.g., the processor 491 in FIG. 5) configured to operate the first sensor 481 and the second sensor 482.

According to the embodiment, at least a part of the housing 210 may be used as the sensor area 620 for sensing a touch.

According to the embodiment, when the instructions are executed by the processor 420, the electronic device 200 or 400 may acquire the first background signal of the first sensor 481 in the state in which no touch is made on at least a part of the housing 210. When the instructions are executed by the processor 420, the electronic device 200 or 400 may acquire the second background signal of the second sensor 482 in the state in which no touch is made on at least a part of the housing 210. When the instructions are executed by the processor 420, the electronic device 200 or 400 may identify the touch position on the housing 210 by applying the first background signal to the first reflected wave and applying the second background signal to the second reflected wave.

According to the embodiment, when the instructions are executed by the processor 420, the electronic device 200 or 400 may divide at least a part of the housing 210 into the plurality of touch key portions. When the instructions are executed by the processor 420, the electronic device 200 or 400 may register the first touch key on the basis of the first reflected wave and the second reflected wave in the state in which the user's finger touches the first touch key portion among the plurality of touch key portions. When the instructions are executed by the processor 420, the electronic device 200 or 400 may register the second touch key on the basis of the first reflected wave and the second reflected wave in the state in which the user's finger touches the second touch key portion, which is different from the first touch key portion, among the plurality of touch key portions.

According to the embodiment, when the instructions are executed by the processor 420, the electronic device 200 or 400 may acquire the first time for which the first reflected wave is received by the first sensor 481 after the first sensor 481 transmits the first lamb wave. When the instructions are executed by the processor 420, the electronic device 200 or 400 may acquire the second time for which the second reflected wave is received by the second sensor 482 after the second sensor 482 transmits the second lamb wave. When the instructions are executed by the processor 420, the electronic device 200 or 400 may determine the touch position on at least a part of the housing 210 by comparing the first time and the second time.

According to the embodiment, when the instructions are executed by the processor 420, the electronic device 200 or 400 may determine the touch length on at least a part of the housing 210 on the basis of the number of first reflected waves received by the first sensor 481 and the number of second reflected waves received by the second sensor 482.

According to the embodiment, when the instructions are executed by the processor 420, the electronic device 200 or 400 may acquire the first strength of the first reflected wave and the second strength of the second reflected wave. When the instructions are executed by the processor 420, the electronic device 200 or 400 may determine touch strength on at least a part of the housing 210 on the basis of the first strength of the first reflected wave and the second strength of the second reflected wave.

According to the embodiment, when the instructions are executed by the processor 420, the electronic device 200 or 400 may acquire the first strength of the first reflected wave and the second strength of the second reflected wave. When the instructions are executed by the processor 420, the electronic device 200 or 400 may determine the normal touch when the first strength of the first reflected wave and the second strength of the second reflected wave are equal to or less than the reference value. When the instructions are executed by the processor 420, the electronic device 200 or 400 may determine the strong touch when the first strength of the first reflected wave and the second strength of the second reflected wave exceed the reference value.

According to the embodiment, when the instructions are executed by the processor 420, the electronic device 200 or 400 may determine the single touch or the multi-touch on at least a part of the housing 210 on the basis of the number of first reflected waves received by the sensor 481 and the number of second reflected waves received by the sensor 482.

According to the embodiment, when the instructions are executed by the processor 420, the electronic device 200 or 400 may determine the single touch when one reflected wave of the first lamb wave is received and one reflected wave of the second lamb wave is received. when the instructions are executed by the processor 420, the electronic device 200 or 400 may determine the multi-touch when the plurality of reflected waves of the first lamb wave is received and the plurality of reflected waves of the second lamb wave is received.

According to the embodiment, the first sensor 481 and the second sensor 482 may be disposed to adjoin the interior 511 of the side surface 218 or 510 of the housing 210.

According to the embodiment, the first sensor 481 and the second sensor 482 may be disposed to adjoin the inner side of the bottom surface of the housing 210.

In the operation method of operating the electronic device (e.g., the electronic device 200 in FIGS. 2 and 3 or the electronic device 400 in FIG. 4) according to the embodiment of the disclosure, the electronic device 200 or 400 may include the housing (e.g., the housing 210 in FIG. 2) including the wall (e.g., the side surface bezel 218 in FIG.

2 or the side surface bezel 510 in FIG. 6) configured to define the outer surface of the electronic device 200 or 400, the sensor component (e.g., the sensor component 480 in FIGS. 4 and 5) including the first sensor (e.g., the first ultrasonic sensor 481 in FIG. 5) and the second sensor (e.g., the second ultrasonic sensor 482 in FIG. 5), the processor (e.g., the processor 420 in FIG. 4), and the memory (e.g., the memory 433 in FIG. 4) configured to store the instructions for operating the electronic device 200 or 400 when executed by the processor 420. The first sensor 481 and the second sensor 482 may be disposed to be in contact with the inner surface of the wall 218 or 510. In the operation method, the first sensor 481 may transmit the first wave so that the first wave propagates toward the second sensor 482 through the wall 218 or 510. In the operation method, the second sensor 482 may transmit the second wave so that the second wave propagates toward the first sensor 481 through the wall 218 or 510. In the operation method, the first sensor 481 may receive the second wave transmitted from the second sensor 482. The first sensor 481 may receive the first reflected wave corresponding to the first wave generated by the touch applied to the outer surface of the wall 218 or 510. In the operation method, the second sensor 482 may receive the first wave transmitted from the first sensor 481. The second sensor 482 may receive the second reflected wave corresponding to the second wave generated by the touch applied to the outer surface of the wall 218 or 510. The operation method may identify the touch position on the basis of the first reflected wave and the second reflected wave based on the touch applied to the outer surface of the wall 218 or 510.

According to the embodiment, the operation method may identify the touch pressure on the basis of the first reflected wave and the second reflected wave based on the touch applied to the outer surface of the wall 218 or 510.

According to the embodiment, the operation method may identify the touch gesture and the touch input time on the basis of the first reflected wave and the second reflected wave according to the touch applied to the outer surface of the wall 218 or 510.

According to the embodiment, in the operation method, the first wave may be transmitted at the first frequency. The second wave may be transmitted at the second frequency different from the first frequency.

According to the embodiment, in the operation method, at least a part of the housing 210 may be used as the sensor area 620 for sensing a touch.

According to the embodiment, the operation method may acquire the first background signal of the first sensor 481 in the state in which no touch is made on at least a part of the housing 210. The operation method may acquire the second background signal of the second sensor 482 in the state in which no touch is made on at least a part of the housing 210. The operation method may identify the touch position on the housing 210 by applying the first background signal to the first reflected wave and applying the second background signal to the second reflected wave.

According to the embodiment, the operation method may divide at least a part of the housing 210 into the plurality of touch key portions. The operation method may register the first touch key on the basis of the first reflected wave and the second reflected wave in the state in which the user's finger touches the first touch key portion among the plurality of touch key portions. The operation method may register the second touch key on the basis of the first reflected wave and the second reflected wave in the state in which the user's finger touches the second touch key portion, which is different from the first touch key portion, among the plurality of touch key portions.

According to the embodiment, the operation method may acquire the first time for which the first reflected wave is received by the first sensor 481 after the first sensor 481 transmits the first lamb wave. The operation method may acquire the second time for which the second reflected wave is received by the second sensor 482 after the second sensor 482 transmits the second lamb wave. The operation method may determine the touch position on at least a part of the housing 210 by comparing the first time and the second time.

According to the embodiment, the operation method may determine the touch length on at least a part of the housing 210 on the basis of the number of first reflected waves received by the first sensor 481 and the number of second reflected waves received by the second sensor 482.

According to the embodiment, the operation method may acquire the first strength of the first reflected wave and the second strength of the second reflected wave. The operation method may determine touch strength on at least a part of the housing 210 on the basis of the first strength of the first reflected wave and the second strength of the second reflected wave.

According to the embodiment, the operation method may acquire the first strength of the first reflected wave and the second strength of the second reflected wave. The operation method may determine the normal touch when the first strength of the first reflected wave and the second strength of the second reflected wave are equal to or more than the first reference value and less than the second reference value. The operation method may determine the strong touch when the first strength of the first reflected wave and the second strength of the second reflected wave are equal to or more than the second reference value.

According to the embodiment, the operation method may determine the single touch or the multi-touch on at least a part of the housing 210 on the basis of the number of first reflected waves received by the first sensor 481 and the number of second reflected waves received by the second sensor 482.

According to the embodiment, the operation method may determine the single touch when one reflected wave of the first lamb wave is received and one reflected wave of the second lamb wave is received. The operation method may determine the multi-touch when the plurality of first reflects waves of the first lamb wave is received, and the plurality of second reflected waves of the second lamb wave is received.

In the recording medium that stores instructions readable by the processor (e.g., the processor 420 in FIG. 4) of the electronic device (e.g., the electronic device 200 in FIGS. 2 and 3 or the electronic device 400 in FIG. 4) according to the embodiment of the disclosure, the electronic device 200 or 400 may include the housing (e.g., the housing 210 in FIG. 2) including the wall (e.g., the side surface bezel 218 in FIG. 2 or the side surface bezel 510 in FIG. 6) configured to define the outer surface of the electronic device 200 or 400, the sensor component (e.g., the sensor component 480 in FIGS. 4 and 5) including the first sensor (e.g., the first ultrasonic sensor 481 in FIG. 5) and the second sensor (e.g., the second ultrasonic sensor 482 in FIG. 5), the processor (e.g., the processor 420 in FIG. 4), and the memory (e.g., the memory 433 in FIG. 4) configured to store the instructions for operating the electronic device 200 or 400 when executed by the processor 420. The first sensor 481 and the second sensor 482 may be disposed to be in contact with the inner surface of the wall 218 or 510. When the instructions are executed by the processor 420, the electronic device 200 or 400 may allow the first sensor 481 to transmit the first wave so that the first wave propagates toward the second sensor 482 through the wall 218 or 510. When the instructions are executed by the processor 420, the electronic device 200 or 400 may allow the second sensor 482 to transmit the second wave so that the second wave propagates toward the first sensor 481 through the wall 218 or 510. When the instructions are executed by the processor 420, the electronic device 200 or 400 may allow the first sensor 481 to receive the second wave transmitted from the second sensor 482 and receive the first reflected wave corresponding to the first wave generated by the touch applied to the outer surface of the wall 218 or 510. When the instructions are executed by the processor 420, the electronic device 200 or 400 may allow the second sensor 482 to receive the first wave transmitted from the first sensor 481 and receive the second reflected wave corresponding to the second wave generated by the touch applied to the outer surface of the wall 218 or 510. When executed by the processor 420, the instructions may allow the electronic device 200 or 400 to identify the touch position on the basis of the first reflected wave and the second reflected wave based on the touch applied to the outer surface of the wall 218 or 510.

The electronic device and the method of operating the same according to the embodiment of the disclosure may sense a touch of the user's finger by using the plurality of ultrasonic sensors.

In the electronic device and the method of operating the same according to the embodiment of the disclosure, the plurality of ultrasonic sensors may be disposed inside the side surface bezel of the housing to define the plurality of touch keys (e.g., the soft keys or the buttonless keys).

In the electronic device and the method of operating the same according to the embodiment of the disclosure, the plurality of ultrasonic sensors may recognize touches on the plurality of touch keys (e.g., the soft keys or the buttonless keys) by generating the ultrasonic waves (e.g., the lamb waves) with different frequencies (e.g., the center frequencies) and receiving the reflected waves (e.g., the reflected signals) based on the ultrasonic waves (e.g., the lamb waves).

The electronic device and the method of operating the same according to the embodiment of the disclosure may determine at least one of the presence or absence of a touch, a touch length, touch strength, a single touch, and a multitouch by using the plurality of touch keys (e.g., the soft keys or the buttonless keys).

The electronic device and the method of operating the same according to the embodiment of the disclosure may register (e.g., customize) the plurality of touch keys (e.g., the soft keys and the buttonless keys) at the positions desired by the user.

The effects obtained by the disclosure are not limited to the aforementioned effects, and other effects, which are not mentioned above, will be clearly understood by those skilled in the art from the following description.

The electronic device according to various embodiments may be one of various types of electronic devices. The electronic devices includes, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module is implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) invokes at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:

a housing including a wall configured to define an outer surface of the electronic device;

a sensor component including a first sensor and a second sensor;

memory storing one or more computer programs; and one or more processors communicatively coupled to the sensor component, and the memory, wherein the first sensor and the second sensor are disposed to be in contact with an inner surface of the wall, and wherein the one or more computer programs include computer-executable instructions that, when executed by the one or more processors individually or collectively, cause the electronic device to:

transmit, via the first sensor, a first wave so that the first wave propagates toward the second sensor through the wall, transmit, via the second sensor, a second wave so that the second wave propagates toward the first sensor through the wall, receive, via the first sensor, the second wave transmitted from the second sensor and a first reflected wave corresponding to the first wave generated by a touch applied to an outer surface of the wall, receive, via the second sensor, the first wave transmitted from the first sensor and a second reflected wave corresponding to the second wave generated by a touch applied to the outer surface of the wall, and identify a touch position on a basis of the first reflected wave and the second reflected wave based on the touch applied to the outer surface of the wall.

2. The electronic device of claim 1, wherein the one or more computer programs further include computer-executable instructions that, when executed by the one or more processors individually or collectively, cause the electronic device to identify a touch pressure on the basis of the first reflected wave and the second reflected wave based on the touch applied to the outer surface of the wall.

3. The electronic device of claim 2, wherein the one or more computer programs further include computer-executable instructions that, when executed by the one or more processors individually or collectively, cause the electronic device to:

acquire a first background signal of the first sensor in a state in which no touch is made on at least a part of the housing, acquire a second background signal of the second sensor in a state in which no touch is made on at least a part of the housing, and identify a touch position on the housing by applying the first background signal to the first reflected wave and applying the second background signal to the second reflected wave.

4. The electronic device of claim 3, wherein the one or more computer programs further include computer-executable instructions that, when executed by the one or more processors individually or collectively, cause the electronic device to:

divide at least a part of the housing into a plurality of touch key portions, register a first touch key on the basis of the first reflected wave and the second reflected wave in a state in which a user's finger touches a first touch key portion among the plurality of touch key portions, and register a second touch key on the basis of the first reflected wave and the second reflected wave in a state in which the user's finger touches a second touch key portion different from the first touch key portion among the plurality of touch key portions.

5. The electronic device of claim 3, wherein the one or more computer programs further include computer-executable instructions that, when executed by the one or more processors individually or collectively, cause the electronic device to:

acquire a first time for which the first reflected wave is received by the first sensor after the first sensor transmits a first lamb wave, acquire a second time for which the second reflected wave is received by the second sensor after the second sensor transmits a second lamb wave, and determine a touch position on at least a part of the housing by comparing the first time and the second time.

6. The electronic device of claim 3, wherein the one or more computer programs further include computer-executable instructions that, when executed by the one or more processors individually or collectively, cause the electronic device to determine a touch length on at least a part of the housing on a basis of a number of first reflected waves received by the first sensor and a number of second reflected waves received by the second sensor.

7. The electronic device of claim 3, wherein the one or more computer programs further include computer-executable instructions that, when executed by the one or more processors individually or collectively, cause the electronic device to:

acquire first strength of the first reflected wave and second strength of the second reflected wave, and determines touch strength on at least a part of the housing on a basis of the first strength of the first reflected wave and the second strength of the second reflected wave.

8. The electronic device of claim 3, wherein the one or more computer programs further include computer-executable instructions that, when executed by the one or more processors individually or collectively, cause the electronic device to:

acquire first strength of the first reflected wave and second strength of the second reflected wave, determine a normal touch when the first strength of the first reflected wave and the second strength of the second reflected wave are equal to or less than a reference value, and determine a strong touch when the first strength of the first reflected wave and the second strength of the second reflected wave exceeds the reference value.

9. The electronic device of claim 3, wherein the one or more computer programs further include computer-executable instructions that, when executed by the one or more processors individually or collectively, cause the electronic device to determine a single touch or a multi-touch on at least a part of the housing on a basis of a number of first reflected waves received by the first sensor and a number of second reflected waves received by the second sensor.

10. The electronic device of claim 9, wherein the one or more computer programs further include computer-executable instructions that, when executed by the one or more processors individually or collectively, cause the electronic device to:

determine the single touch when one reflected wave of a first lamb wave is received and one reflected wave of a second lamb wave is received, and determine the multi-touch when a plurality of reflected waves of the first lamb wave is received and a plurality of reflected waves of the second lamb wave is received.

11. The electronic device of claim 1, the one or more computer programs further include computer-executable instructions that, when executed by the one or more processors individually or collectively, cause the electronic device to identify a touch gesture and a touch input time on the basis of the first reflected wave and the second reflected wave based on the touch applied to the outer surface of the wall.

12. The electronic device of claim 1, wherein the first wave is transmitted at a first frequency, and the second wave is transmitted at a second frequency different from the first frequency.

13. The electronic device of claim 1, wherein the sensor component comprises a processor configured to operate the first sensor and the second sensor.

14. The electronic device of claim 1, wherein at least a part of the housing is used as a sensor area for sensing a touch.

15. The electronic device of claim 1, wherein the first sensor and the second sensor are disposed to adjoin an interior of a side surface or of the housing.

16. The electronic device of claim 1, wherein the first sensor and the second sensor are disposed to adjoin an inner side of a bottom surface of the housing.

17. A method performed by an electronic device the method comprising:

transmitting, by the electronic device via a first sensor of a sensor component, a first wave so that the first wave propagates toward a second sensor of the sensor component through a wall of a housing of the electronic device;

transmitting, by the electronic device via the second sensor, a second wave so that the second wave propagates toward the first sensor through the wall;

receiving, by the electronic device via the first sensor, the second wave transmitted from the second sensor and a first reflected wave corresponding to the first wave generated by a touch applied to an outer surface of the wall;

receiving, by the electronic device via the second sensor, the first wave transmitted from the first sensor and a second reflected wave corresponding to the second wave generated by a touch applied to the outer surface of the wall; and identifying, by the electronic device, a touch position on a basis of the first reflected wave and the second reflected wave based on the touch applied to the outer surface of the wall.

18. The method of claim 17, further comprising:

identifying a touch pressure on the basis of the first reflected wave and the second reflected wave based on the touch applied to the outer surface of the wall.

19. The method of claim 17, further comprising:

identifying a touch gesture and a touch input time on the basis of the first reflected wave and the second reflected wave based on the touch applied to the outer surface of the wall.

20. The method of claim 17, wherein the first wave is transmitted at a first frequency, and the second wave is transmitted at a second frequency different from the first frequency.

\* \* \* \* \*